(12) United States Patent
Okumura et al.

(10) Patent No.: US 11,719,974 B2
(45) Date of Patent: Aug. 8, 2023

(54) SELF-LUMINOUS BODY FOR DISPLAY APPARATUS, SELF-LUMINOUS DISPLAY APPARATUS, BACKLIGHT, LIQUID CRYSTAL DISPLAY APPARATUS, AND METHOD FOR MANUFACTURING SELF-LUMINOUS BODY FOR DISPLAY APPARATUS

(71) Applicant: Mitsubishi Electric Corporation, Tokyo (JP)

(72) Inventors: Takanori Okumura, Tokyo (JP); Kazumasa Katayama, Tokyo (JP); Hidetada Tokioka, Tokyo (JP); Masami Hayashi, Tokyo (JP); Manabu Iwakawa, Tokyo (JP); Shinsaku Yamaguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/791,543

(22) PCT Filed: Feb. 3, 2020

(86) PCT No.: PCT/JP2020/003873
§ 371 (c)(1),
(2) Date: Jul. 8, 2022

(87) PCT Pub. No.: WO2021/156902
PCT Pub. Date: Aug. 12, 2021

(65) Prior Publication Data
US 2023/0033925 A1    Feb. 2, 2023

(51) Int. Cl.
*G02F 1/13357*    (2006.01)

(52) U.S. Cl.
CPC .............. *G02F 1/133603* (2013.01); *G02F 1/133609* (2013.01)

(58) Field of Classification Search
CPC .................. G02F 1/133603; G02F 1/133609
See application file for complete search history.

(56) References Cited

U.S. PATENT DOCUMENTS

| 5,767,837 A | 6/1998 | Hara |
| 2010/0118045 A1* | 5/2010 | Brown Elliott et al. ................. H04N 13/302 345/589 |

(Continued)

FOREIGN PATENT DOCUMENTS

| JP | 2-304843 A | 12/1990 |
| JP | 2011-505017 A | 2/2011 |

(Continued)

OTHER PUBLICATIONS

Biwa et al, "Technologies for the Crystal LED Display System", SID 2019 Digest, Invited Paper, 2019, pp. 121-124.

(Continued)

*Primary Examiner* — Mary Ellen Bowman
(74) *Attorney, Agent, or Firm* — XSENSUS LLP

(57) ABSTRACT

A time required to manufacture a self-luminous body for a display apparatus is shortened. A self-luminous body for a display apparatus includes a backplane and a plurality of stacks. The plurality of stacks are arranged on a backplane. Each stack includes a plurality of integrated self-luminous elements. The plurality of self-luminous elements in each stack include at least two self-luminous elements that are arranged at a first pitch and emit light of the same color. The plurality of stacks include a first stack and a second stack adjacent to each other. The self-luminous element of the first stack and the self-luminous element of the second stack that emits light of the same color as a color of light emitted by the self-luminous element of the first stack are arranged at a second pitch larger than the first pitch.

26 Claims, 47 Drawing Sheets

(56) References Cited

U.S. PATENT DOCUMENTS

| | | | |
|---|---|---|---|
| 2017/0307937 A1* | 10/2017 | Matsuura | G02F 1/133603 |
| 2018/0025945 A1 | 1/2018 | Chevalier et al. | |
| 2019/0103516 A1* | 4/2019 | Moosburger et al. | H01L 33/502 |
| 2019/0339570 A1 | 11/2019 | Chen et al. | |

FOREIGN PATENT DOCUMENTS

| | | | |
|---|---|---|---|
| JP | 2016-81906 A | 5/2016 | |
| JP | 2018-197781 A | 12/2018 | |
| JP | 2019-512878 A | 5/2019 | |
| WO | 2008/100826 A1 | 8/2008 | |

OTHER PUBLICATIONS

Office Action mailed on Apr. 30, 2021, received for Taiwanese Application No. 109140737, 16 pages including English Translation.

International Search Report and Written Opinion mailed on Apr. 14, 2020, received for PCT Application PCT/JP2020/003873, filed on Feb. 3, 2020, 11 pages including English Translation.

* cited by examiner

EXAMPLE 2

EXAMPLE 6

EXAMPLE 8

EXAMPLE 10

EXAMPLE 12

EXAMPLE 13

EXAMPLE 14

EXAMPLE 16

EXAMPLE 18

EXAMPLE 19

EXAMPLE 32

EXAMPLE 33

EXAMPLE 35

SELF-LUMINOUS BODY FOR DISPLAY APPARATUS, SELF-LUMINOUS DISPLAY APPARATUS, BACKLIGHT, LIQUID CRYSTAL DISPLAY APPARATUS, AND METHOD FOR MANUFACTURING SELF-LUMINOUS BODY FOR DISPLAY APPARATUS

TECHNICAL FIELD

The present disclosure relates to a self-luminous body for a display apparatus, a self-luminous display apparatus including the self-luminous body for a display apparatus, a backlight, a liquid crystal display apparatus, and a method for manufacturing the self-luminous body for a display apparatus.

BACKGROUND ART

In recent years, a display apparatus including a thin display panel having a flat shape has been widely used. A liquid crystal display apparatus (LCD) that displays an image by light modulated by using a liquid crystal, an organic electroluminescence (EL) display apparatus that displays an image by light emitted by electroluminescence, and the like are representatives of the display apparatus. The organic EL display apparatus is also called an organic light emitting diode (OLED) display apparatus.

The LCD has a characteristic of being thin and light. Therefore, the LCD is used as a display apparatus for a driver included in a vehicle. For example, the LCD is used as a display apparatus incorporated in a speedometer, a navigation system, or the like included in an automobile. In addition, the LCD is used as a display apparatus for a passenger included in a vehicle. For example, the LCD is used as a display apparatus incorporated in a reproduction apparatus that reproduces an entertainment video recorded in a video medium such a digital versatile disc (DVD (registered trademark)) or a Blu-ray Disc (BD (registered trademark)) included in an automobile, an aircraft, or the like.

The LCD and the organic EL display apparatus are also used as display apparatuses incorporated in general apparatuses such as mobile terminals typified by smartphones and televisions.

The LCD generally includes a liquid crystal panel, a backlight, a circuit, a power supply, and a housing. The backlight emits light. The circuit supplies an electrical signal to the liquid crystal panel. The liquid crystal panel modulates light according to the electrical signal to display an image and a video. The power supply supplies power to the liquid crystal panel. The housing accommodates the liquid crystal panel, the backlight, the circuit, and the power supply.

The liquid crystal panel includes an array substrate, a color filter substrate, and a liquid crystal layer. The array substrate includes a pixel electrode. The color filter substrate includes a common electrode. The array substrate and the color filter substrate are bonded to each other. The liquid crystal layer is sandwiched between the array substrate and the color filter substrate.

The organic EL display apparatus generally includes an organic EL panel, a circuit, a power supply, and a housing. The circuit supplies an electrical signal to the organic EL panel. The organic EL panel emits light according to the electrical signal to display an image and a video. The power supply supplies power to the organic EL panel. The housing accommodates the organic EL panel, the circuit, and the power supply.

The organic EL panel includes a substrate, an organic EL layer, a positive electrode, a negative electrode, and a sealing film. The substrate is a glass substrate, a plastic substrate, or the like. The organic EL layer, the negative electrode, and the positive electrode are arranged on the substrate. The negative electrode and the positive electrode sandwich the organic EL layer. The sealing film seals the organic EL layer, the negative electrode, and the positive electrode. Instead of the sealing film, a glass substrate, a plastic substrate, or the like may seal the organic EL layer, the negative electrode, and the positive electrode.

The organic EL layer includes an electron injection layer, an electron transport layer, a light emitting layer, a hole transport layer, a hole injection layer, and the like.

A display apparatus such as the LCD or the organic EL display apparatus has an active area and an inactive area. The active area is an area in which an image and a video are displayed. The inactive area is a frame-like area which is arranged outside the active area and in which an image and a video are not displayed.

A plurality of display pixels are arranged in the active area. Each of the plurality of display pixels has a plurality of subpixels. Each subpixel of the plurality of subpixels emits light of a color such as red, blue, yellow, or white. In the active area, a switching element, a pixel electrode, a wiring, and the like are arranged. The switching element is a thin film transistor or the like.

In the inactive area, a seal, a sealing seal, a routing wiring, an integrated circuit (IC) for driving, a terminal, and the like are arranged. The seal seals the liquid crystal layer between the array substrate and the color filter substrate. The sealing seal prevents moisture from entering the organic EL layer. The routing wiring is electrically connected to the thin film transistor or the like. The terminal is electrically connected to an external driving circuit.

The LCD and the organic EL display apparatus have similar configurations for displaying an image and a video. However, the LCD and the organic EL display apparatus are different from each other in the principle of displaying an image and a video. In the LCD, a voltage applied between the pixel electrode and the common electrode is controlled by the thin film transistor. By controlling the voltage, the alignment direction of liquid crystal molecules constituting the liquid crystal layer is controlled. In addition, by controlling the alignment direction, the transmittance when the light emitted by the backlight passes through the liquid crystal panel is controlled. As a result, an image and a video are displayed on the LCD. On the other hand, in the organic EL display apparatus, a current flowing through the organic EL layer sandwiched between the negative electrode and the positive electrode is controlled by the thin film transistor. Furthermore, the luminance of the light emitting layer is controlled by controlling the current. As a result, an image and a video are displayed on the organic EL display apparatus. When light is emitted to the light emitting layer, electrons and holes are injected from the negative electrode and the positive electrode, respectively. In addition, the injected electrons and holes are transported to the light emitting layer via the electron transport layer and the hole transport layer, respectively. In addition, the transported electrons and holes are combined to excite the light-emitting material constituting the light emitting layer. In addition, the excited light-emitting material returns to the ground state. The light emitting layer emits light as the excited light-emitting material returns to the ground state.

The LCD has relatively high environmental resistance with respect to temperature, humidity, and the like. Therefore, as described above, the LCD is used as a display apparatus included in an automobile. However, the LCD has a disadvantage that it has only low display quality. For example, the LCD has a disadvantages such as low moving image performance and low contrast. The disadvantage that the LCD has only low moving image performance is that the operation speed of liquid crystal molecules constituting the liquid crystal layer is slow. The disadvantage that the LCD has only low contrast is that the backlight is always on, so that the black region included in the displayed image and video becomes bright.

On the other hand, the organic EL display apparatus has high display quality. For example, the organic EL display apparatus has high operation performance and high contrast. However, the organic EL display apparatus has disadvantages such as having only relatively low environmental resistance with respect to temperature, humidity, and the like, having only a short life, and being unsuitable for display having high luminance. The organic EL display apparatus has the disadvantage because the organic material constituting the organic EL layer is deteriorated due to instability of the organic material.

Therefore, in order to solve the above-described disadvantages of the LCD and the above-described disadvantages of the organic EL display apparatus, micro ($\mu$) light emitting diode (LED) displays have been developed and commercialized. The $\mu$LED display includes a backplane and a number of $\mu$LEDchips. The number of $\mu$LED chips are arranged on the backplane. Thin film transistor, the wiring, and the like are formed on the backplane.

In addition, it has also been studied to adopt the $\mu$LED in the backlight included in the LCD. When the $\mu$LED is adopted in the backlight, a plurality of $\mu$LEDs arranged in a grid are arranged on the back surface of the liquid crystal panel. In addition, the $\mu$LED that emits light and the light intensity are controlled according to the image and the video displayed by the LCD. For example, the $\mu$LED arranged in the dark region included in the image and the video is turned off, or the luminance of the $\mu$LEDis lowered. Further, the $\mu$LEDarranged in the bright region included in the image and the video is turned on, or the luminance of the $\mu$LED is increased. Consequently, the contrast of the LCD can be increased, and the display quality of the LCD can be improved. The backlight that emits light and whose light intensity is controlled in this manner is called a local dimming backlight.

In the display apparatus described in Patent Document 1, pixels are two-dimensionally arranged according to a predetermined arrangement pattern. As the pixel, for example, an LED is used (paragraph 0016).

In the display apparatus described in Patent Document 2, a large number of light emitting elements are arranged. Furthermore, in the light emitting element, a plurality of light emitting pixels are arranged in a matrix. In the arrangement of the light-emitting pixels, local non-uniformity of the arrangement pitch is allowed (page 219, left column, lines 13 to 17 and page 220, lower left column, lines 11 to 18).

In the LED display system described in Non-Patent Document 1, a $\mu$LED is arranged in each cell. In the LED display system, in order to prevent the surface of the resin package of the $\mu$LED from reflecting light to reduce the contrast ratio, the area occupied by the $\mu$LED is reduced, and a high contrast ratio is obtained (page 121, right column, lines 11 to 16 and page 121, lines 17 to 32).

PRIOR ART DOCUMENTS

Patent Documents

Patent Document 1: Japanese Patent Application Laid-Open No. 2018-197781 Patent Document 2: Japanese Patent Application Laid-Open No. 2-304843

Non-Patent Documents

Non-Patent Document 1: Goshi Biwa et al., "Technologies for the Crystal LED Display System", SID 2019'Digest, pp. 121-124 (2019)

SUMMARY

Problem to Be Solved by the Invention

If each display pixel of the $\mu$LEDdisplay has three sub-pixels, then three times as many $\mu$LEDs as the number of display pixels of the $\mu$LED display must be arranged when the $\mu$LED display is manufactured. For example, when a $\mu$LED display having a 4 K resolution is manufactured, about 24 million $\mu$LEDs must be arranged. Therefore, the time required to manufacture the $\mu$LED display becomes long.

This problem also occurs when a self-luminous body for a display apparatus other than a display such as a backlight is manufactured in a case where the $\mu$LED is replaced with a self-luminous element other than the $\mu$LED.

The present disclosure has been made in view of this problem. An object of the present disclosure is to shorten a time required to manufacture a self-luminous body for a display apparatus.

Means to Solve the Problem

A self-luminous body for a display apparatus includes a backplane and a plurality of stacks. The plurality of stacks are arranged on a backplane. Each stack includes a plurality of integrated self-luminous elements. The plurality of self-luminous elements in each stack include at least two self-luminous elements that are arranged at a first pitch and emit light of the same color. The plurality of stacks include a first stack and a second stack adjacent to each other. The self-luminous element of the first stack and the self-luminous element of the second stack that emits light of the same color as a color of light emitted by the self-luminous element of the first stack are arranged at a second pitch larger than the first pitch.

Effects of the Invention

According to the present disclosure, the plurality of self-luminous elements can be collectively arranged in a plurality of regions by arranging one stack on the backplane. As a result, it is possible to shorten the time required to manufacture the self-luminous body for a display apparatus.

The object, features, aspects, and advantages of the present invention will become more apparent with the following detailed description and the accompanying drawings.

DESCRIPTION OF EMBODIMENTS

1 Reference Example

1.1 Outline of Self-Luminous Display Apparatus

Figure 1:
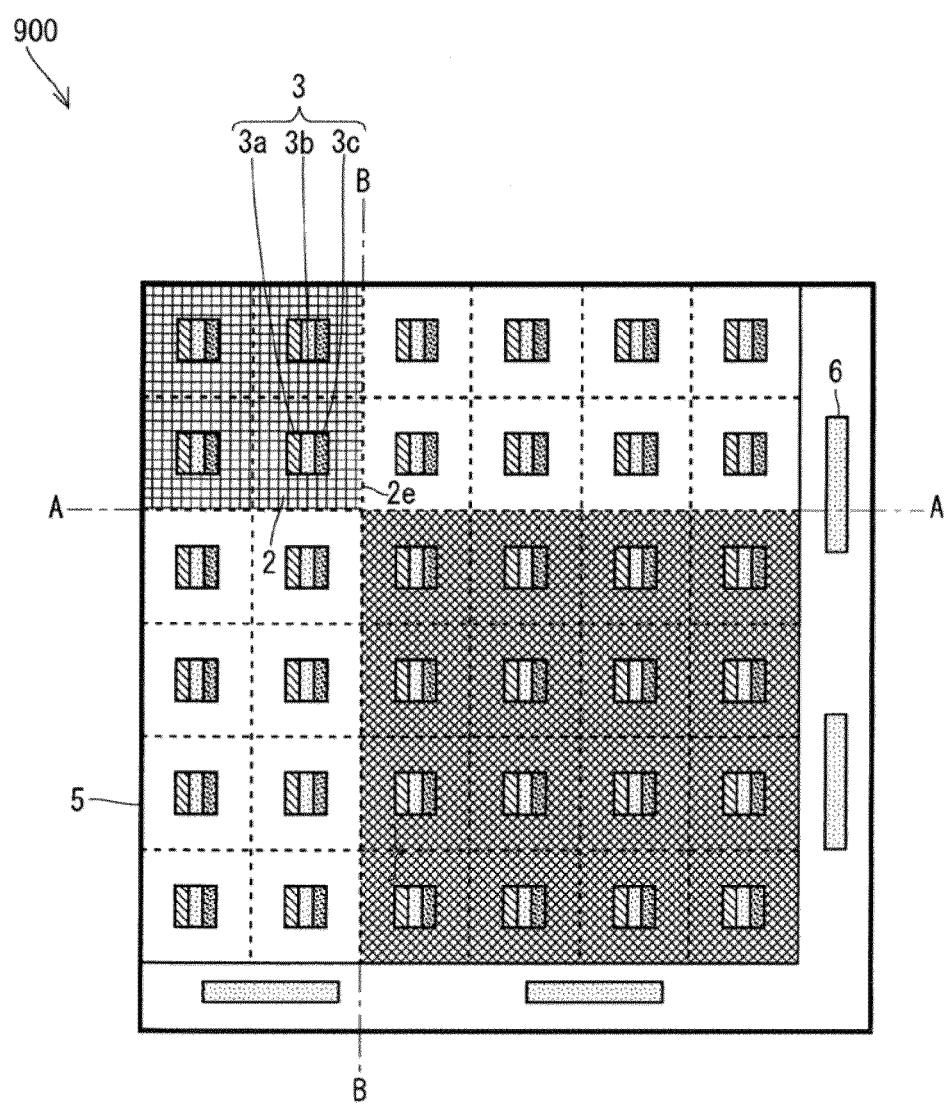
FIG. 1 is a plan view schematically illustrating a self-luminous display apparatus of a reference example.
Figure 2:
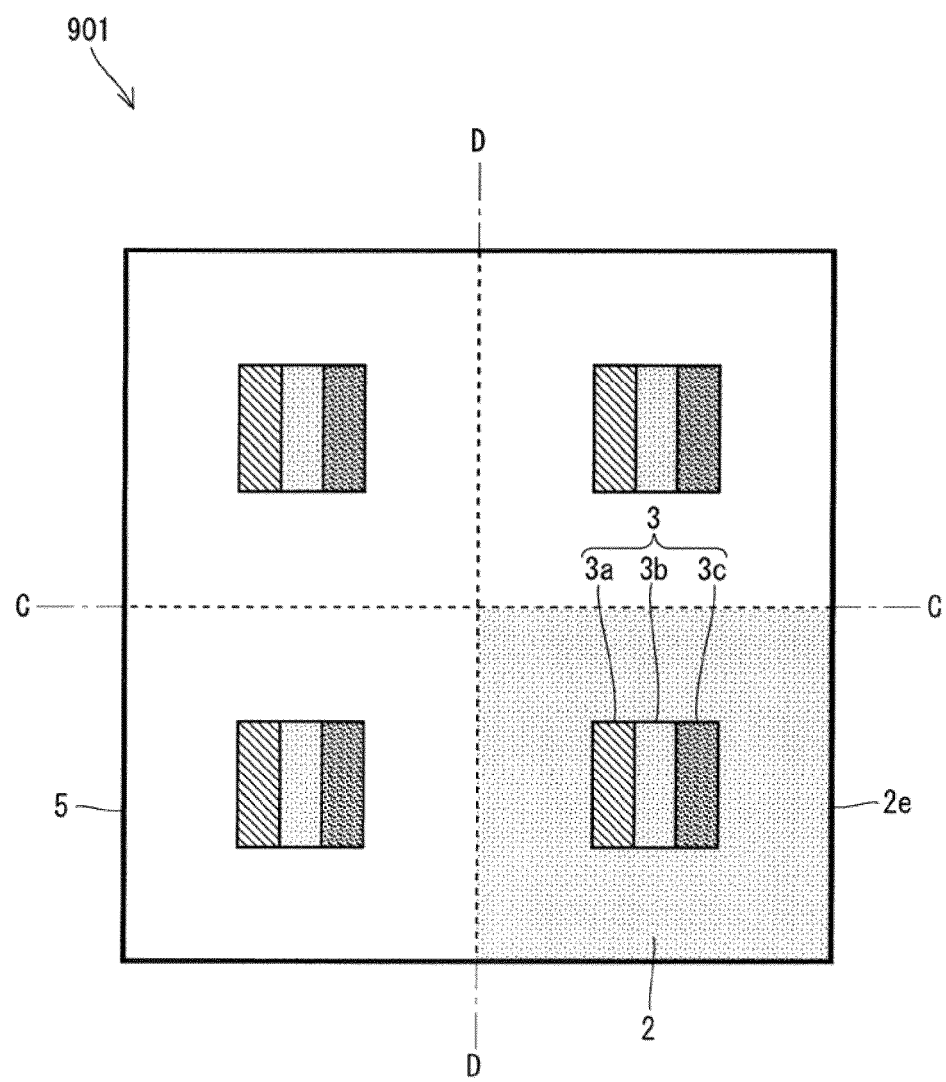
FIG. 2 is a plan view schematically illustrating adjacent four display pixels included in the self-luminous display apparatus of the reference example.
Figure 3:
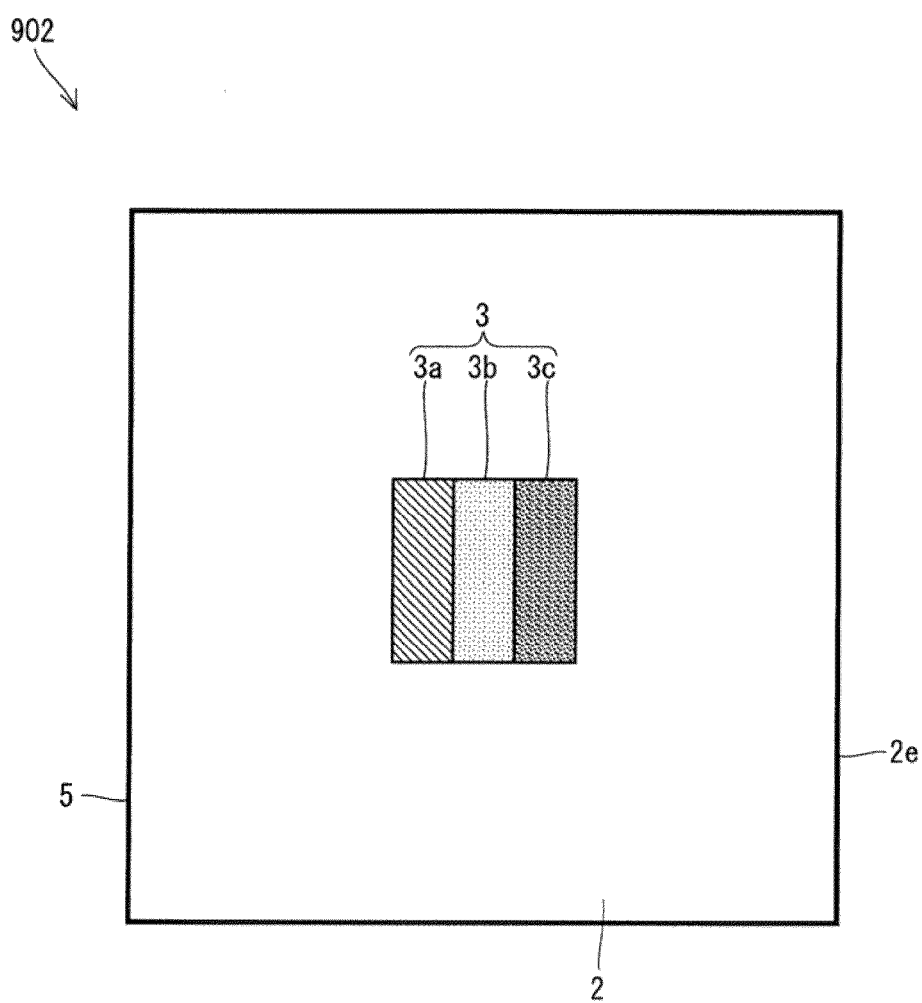
FIG. 3 is a plan view schematically illustrating one display pixel included in the self-luminous display apparatus of the reference example.

FIG. 1 is a plan view schematically illustrating a self-luminous display apparatus of a reference example. FIG. 2 is a plan view schematically illustrating adjacent four display pixels included in the self-luminous display apparatus of the reference example. FIG. 3 is a plan view schematically illustrating one display pixel included in the self-luminous display apparatus of the reference example.

Four display pixels 901 illustrated in FIG. 2 are obtained by cutting a self-luminous display apparatus 900 of the reference example illustrated in FIG. 1 at the positions of the cutting lines A-A and B-B. One display pixel 902 illustrated in FIG. 3 is obtained by cutting the four display pixels 901 illustrated in FIG. 2 at the positions of the cutting lines C-C and D-D.

The self-luminous display apparatus 900 is a micro (μ) light emitting diode (LED) display.

As illustrated in FIG. 1, the self-luminous display apparatus 900 includes a plurality of display pixels 2.

The plurality of display pixels 2 are arranged in a matrix.

As illustrated in FIGS. 1 to 3, each display pixel of the plurality of display pixels 2 includes a subpixel group 3.

The plurality of display pixels 2 constitute an active area in which an image and a video displayed by the plurality of subpixel groups 3 included in each of the plurality of display pixels 2 are displayed.

Each display pixel 2 includes one subpixel group 3. Therefore, the number of display pixels 2 included in the self-luminous display apparatus 900 is the same as the number of subpixel groups 3 included in the self-luminous display apparatus 900.

The subpixel group 3 is arranged in a central portion of the display pixel 2. Therefore, the subpixel group 3 is not in contact with an end 2e of the display pixel 2.

As illustrated in FIGS. 1, 2, and 3, the subpixel group 3 includes three subpixels 3a, 3b, and 3c. The subpixel group 3 may include four or more subpixels.

Each subpixel of the three subpixels 3a, 3b, and 3c is a self-luminous element. In the self-luminous display apparatus 900, the self-luminous element is an LED element. The self-luminous element may be a self-luminous element other than the LED element.

The three subpixels 3a, 3b, and 3c are arranged at the central portion of the display pixel 2. Therefore, the three subpixels 3a, 3b, and 3c are not in contact with the end 2e of the display pixel 2.

The three subpixels 3a, 3b, and 3c are arranged adjacent to each other.

The three subpixels 3a, 3b, and 3c emit light of three colors different from each other. In the self-luminous display apparatus 900, the three subpixels 3a, 3b, and 3c emit red, green, and blue light constituting three primary colors, respectively. In this case, by causing all of the three subpixels 3a, 3b, and 3c to emit light having predetermined brightness, the subpixel group 3 can be caused to emit white light. Furthermore, by causing all or a part of the three subpixels 3a, 3b, and 3c to emit light having brightness darker than the predetermined brightness, the subpixel group 3 can be caused to emit light of intermediate colors such as gray and yellow. The three subpixels 3a, 3b, and 3c may emit light of a color other than red, green, and blue.

1.2 Active Area and Inactive Area

The self-luminous display apparatus 900 has an active area and an inactive area. The active area is an area in which an image and a video are displayed. The inactive area is a frame-like area which is arranged outside the active area and in which an image and a video are not displayed.

1.3 Element for Operating Subpixel

As illustrated in FIG. 1, the self-luminous display apparatus 900 includes a backplane 5 and driving integrated circuits (ICs) 6. Further, the self-luminous display apparatus 900 includes a terminal (not illustrated).

The driving ICs 6 and the terminal are arranged in the inactive area.

The backplane 5 includes a glass substrate, an electrode, a switching element, a metal thin-film wiring, and the like (not illustrated).

The switching element is a thin film transistor.

The switching element and the electrode are arranged inside each display pixel 2. The position of the switching element inside each display pixel 2 is determined according to the design of the self-luminous display apparatus 900.

Each subpixel of the three subpixels 3a, 3b, and 3c is electrically connected to the switching element via an electrode. The switching element is electrically connected to the driving IC 6 via a metal thin-film wiring. The terminal is electrically connected to a control board outside the self-luminous display apparatus 900 via a flexible board or the like.

The terminal receives signals such as a drive signal and a video signal supplied to the switching element from the control board via the flexible board or the like. The driving IC 6 transmits signals such as a driving signal and a video signal. The metal thin-film wiring supplies the transmitted signals to the switching element. The switching element operates the subpixel electrically connected to the switching element according to the supplied signals. As a result, light emitted by the plurality of subpixel groups 3 included in the plurality of display pixels 2 is controlled according to signals such as a drive signal and a video signal. As a result, the image and the video are displayed in the active area.

The three subpixels 3a, 3b, and 3c may be electrically connected to one switching element, and one switching element may operate the three subpixels 3a, 3b, and 3c. A switching element other than the thin film transistor may operate each subpixel of the three subpixels 3a, 3b, and 3c. For example, a pixel driving IC may operate each subpixel. In a case where the pixel driving IC operates each subpixel, in general, one pixel driving IC operates each subpixel.

The switching element, the metal thin-film wiring, the electrode, and the like are formed by a semiconductor process.

The backplane 5 may be a printed circuit board including a glass epoxy substrate, a copper wiring, an electrode, and the like. The electrode is subjected to plating treatment. In a case where the backplane 5 is a printed circuit board, a switching element such as a pixel driving IC produced using a glass substrate, a silicon substrate, or the like is arranged on the printed circuit board instead of the thin film transistor.

1.4 Method for Manufacturing LED Element

When the LED element is manufactured, first, a laminated film is produced on a substrate. The substrate is a sapphire substrate or the like. The laminated film to be produced includes a buffer layer, an n-type semiconductor layer, a light emitting layer, a p-type semiconductor layer, and the like. The laminated film is produced by crystal-growing a layer included in the laminated film. In addition, an electrode is formed on the n-type semiconductor layer and the p-type semiconductor layer that have been crystal-grown. In addition, an intermediate product including the substrate, the produced laminated film, and the formed electrode is cut into the size of the LED element by dicing or the like. Thus, the LED element is manufactured.

1.5 Color of Light Emitted by LED Element

The color of the light emitted by the LED element can be changed by changing the n-type semiconductor layer, the light emitting layer, the p-type semiconductor layer, and the like included in the LED element. Alternatively, the color of the light emitted by the LED element can be changed by adding a color conversion layer having fluorescent particles, quantum dots, and the like to the LED element.

1.6 Method for Manufacturing Self-Luminous Display Apparatus

The self-luminous display apparatus 900 is manufactured by arranging the LED elements on the backplane 5 and electrically connecting the terminals included in the LED elements to the electrode included in the backplane 5. The LED elements are arranged on the backplane 5 by a pick and place method or the like. Only the LED layer including the buffer layer, the n-type semiconductor layer, the light emitting layer, the p-type semiconductor layer, the electrode, the color conversion layer, and the like may be peeled off from the substrate by a laser lift-off method or the like, and the peeled LED layer may be arranged on the backplane 5. Instead of these methods, a transfer method using an elastic stamp, a method using magnetism or static electricity, or the like may be adopted.

The terminal included in the LED element is electrically connected to the electrode included in the backplane 5 using a conductive paste, an anisotropic conductor film, or the like.

1.7 Size of Subpixel

The length of one side of each subpixel of the three subpixels 3a, 3b, and 3c is less than 100 μm. Generally speaking, an LED element having a length of one side of less than 100 μm is referred to as a μ LED element. Therefore, the LED element to be each subpixel is a μ LED element. However, the length of one side of each subpixel is determined according to the design of the self-luminous display apparatus 900. Therefore, the LED element to be each subpixel may be an LED element that is not a μ LED element having a length of one side of 100 μm or more.

1.8 Problems of Self-Luminous Display Apparatus of Reference Example

In the self-luminous display apparatus 900, each subpixel of the three subpixels 3a, 3b, and 3c is configured by an individual μ LED element. Therefore, when the self-luminous display apparatus 900 is manufactured, a large number of μ LED elements are individually arranged on the backplane 5 in order to mount and arrange the large number of μ LED elements on the backplane 5. For example, when the self-luminous display apparatus 900 has a full high vision resolution, about 6 million μ LED elements are individually arranged on the backplane 5. When the self-luminous display apparatus 900 has a 4 K resolution, about 24 million μLED elements are individually arranged on the backplane 5. Therefore, the time required to manufacture the self-luminous display apparatus 900 becomes long. Therefore, it is difficult to increase the manufacturing efficiency of the self-luminous display apparatus 900. In addition, since detective arrangement occurs with a certain probability, the number of defective products also increases. Therefore, it is difficult to reduce the manufacturing cost of the self-luminous display apparatus 900.

2 First Embodiment

2.1 Outline of Self-Luminous Display Apparatus

Figure 4:
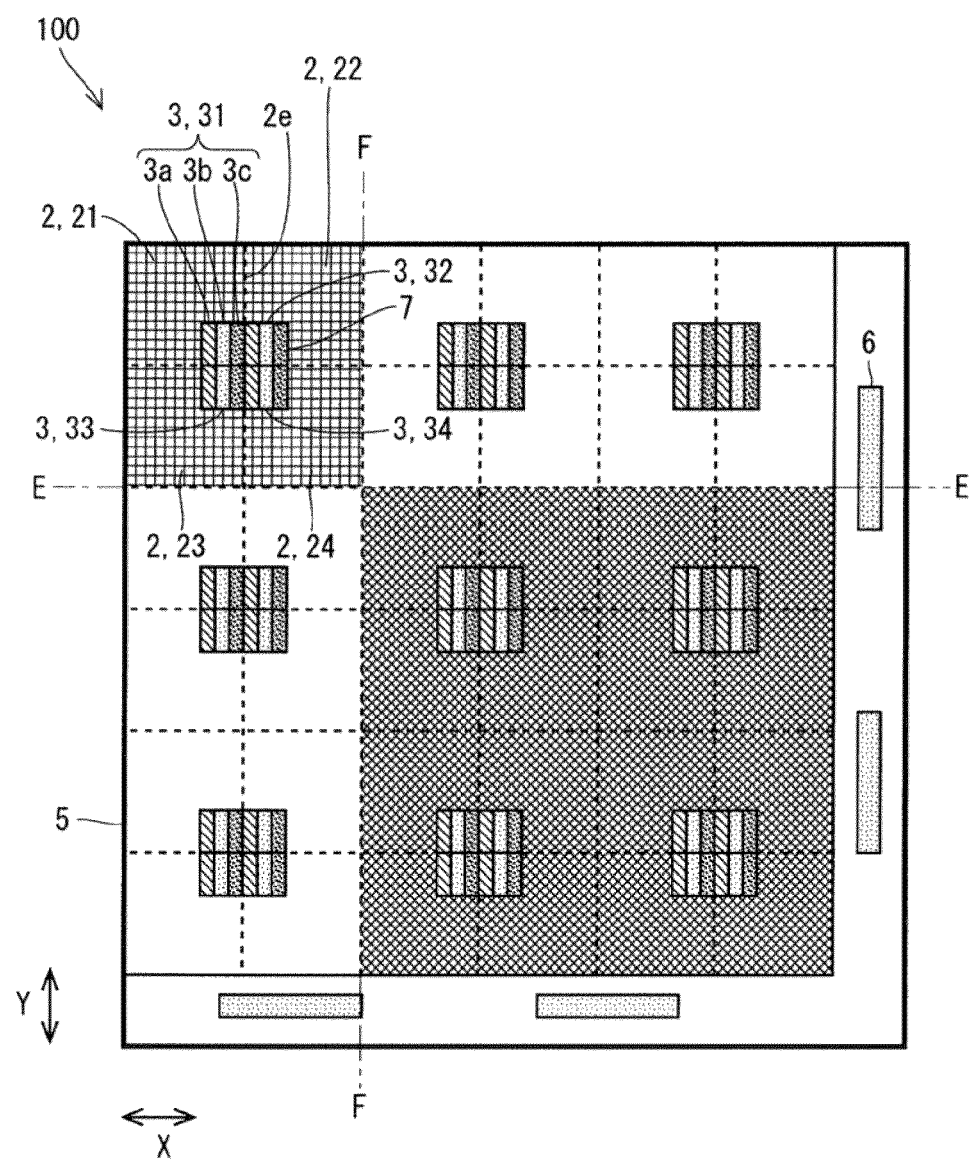
FIG. 4 is a plan view schematically illustrating a self-luminous display apparatus of a first embodiment.
Figure 5:
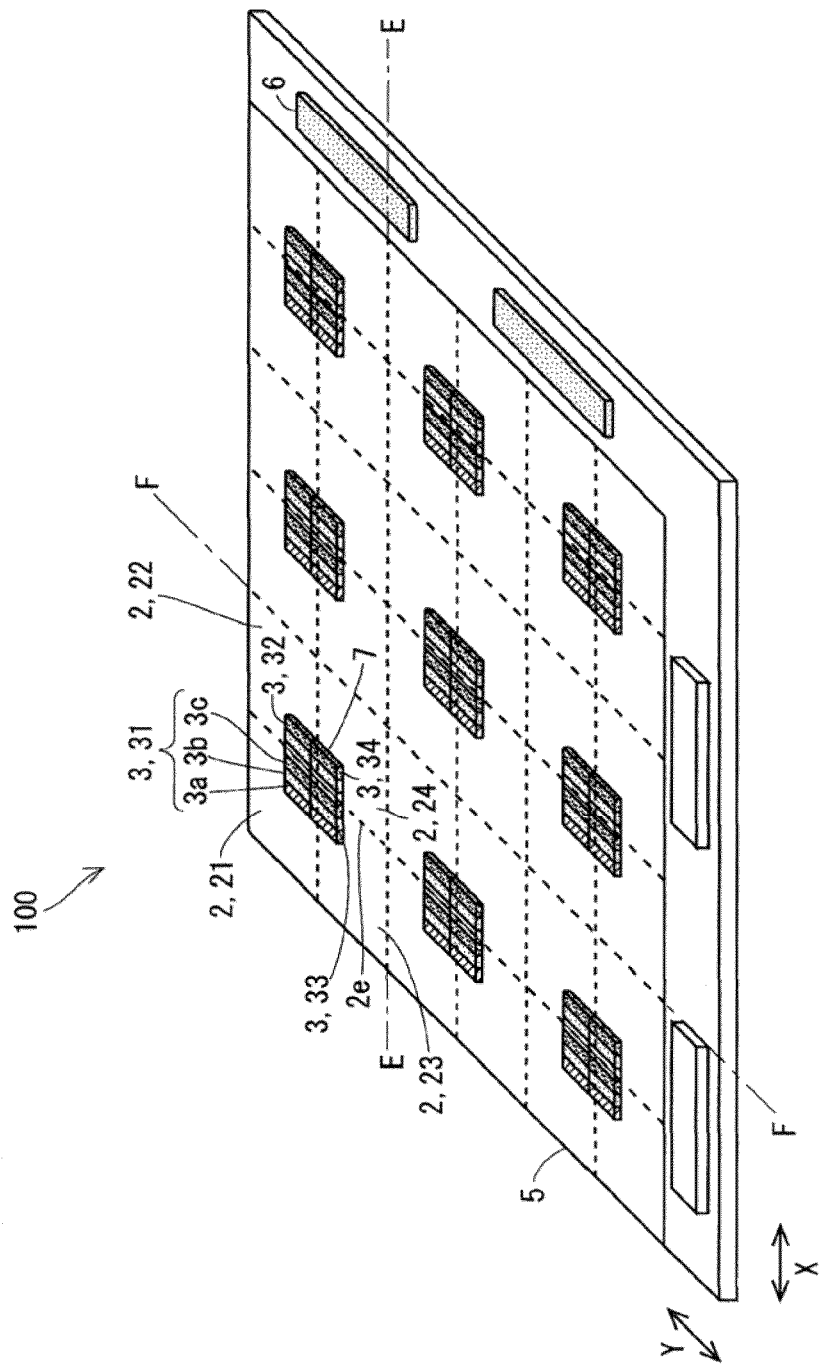
FIG. 5 is a perspective view schematically illustrating the self-luminous display apparatus of the first embodiment.
Figure 6:
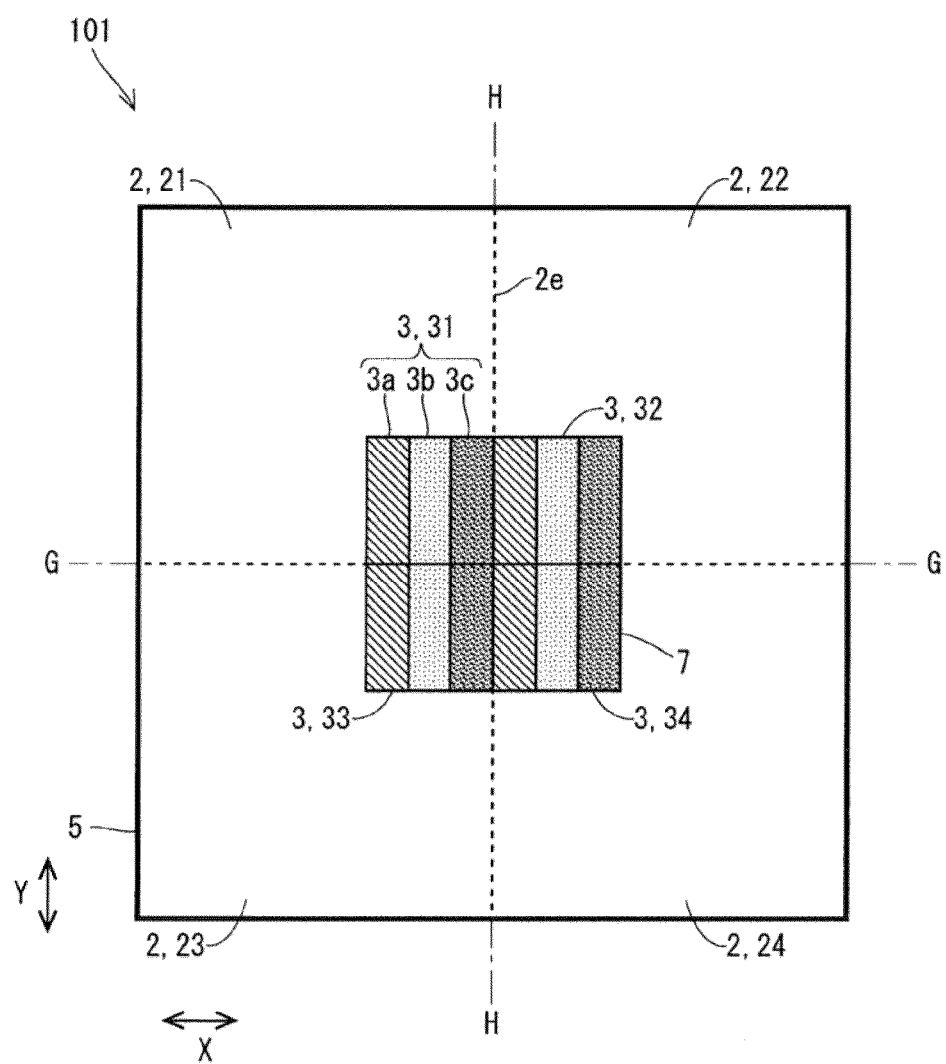
FIG. 6 is a plan view schematically illustrating adjacent four display pixels included in the self-luminous display apparatus of the first embodiment.
Figure 7:
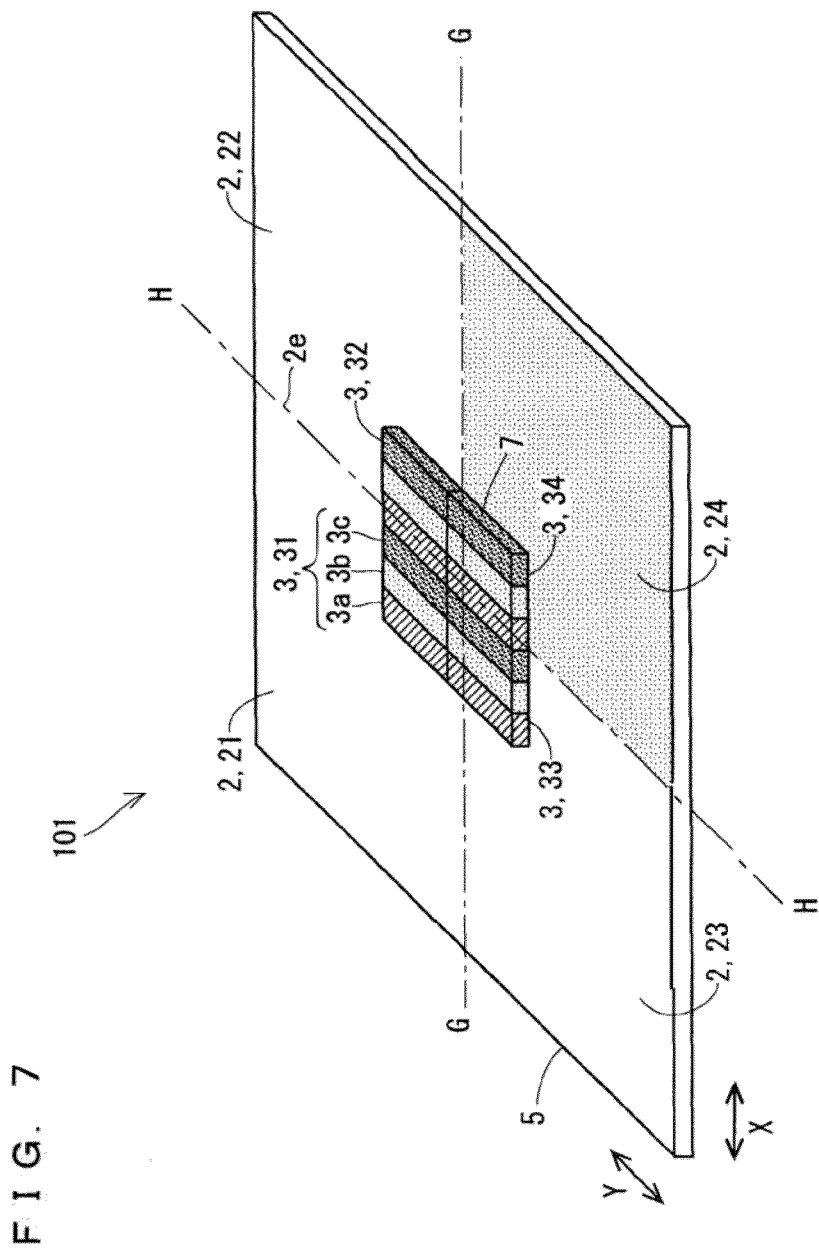
FIG. 7 is a perspective view schematically illustrating the adjacent four display pixels included in the self-luminous display apparatus of the first embodiment.
Figure 8:
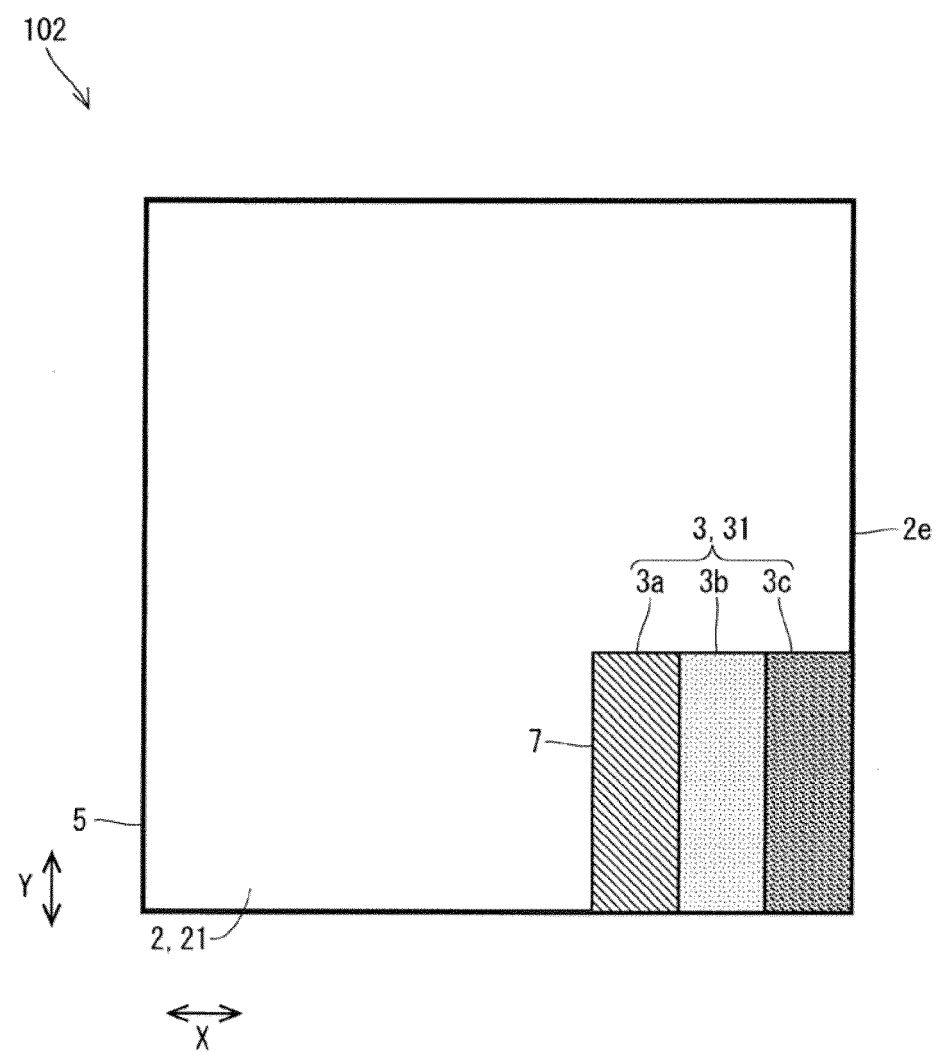
FIG. 8 is a plan view schematically illustrating one display pixel included in the self-luminous display apparatus of the first embodiment.
Figure 9:
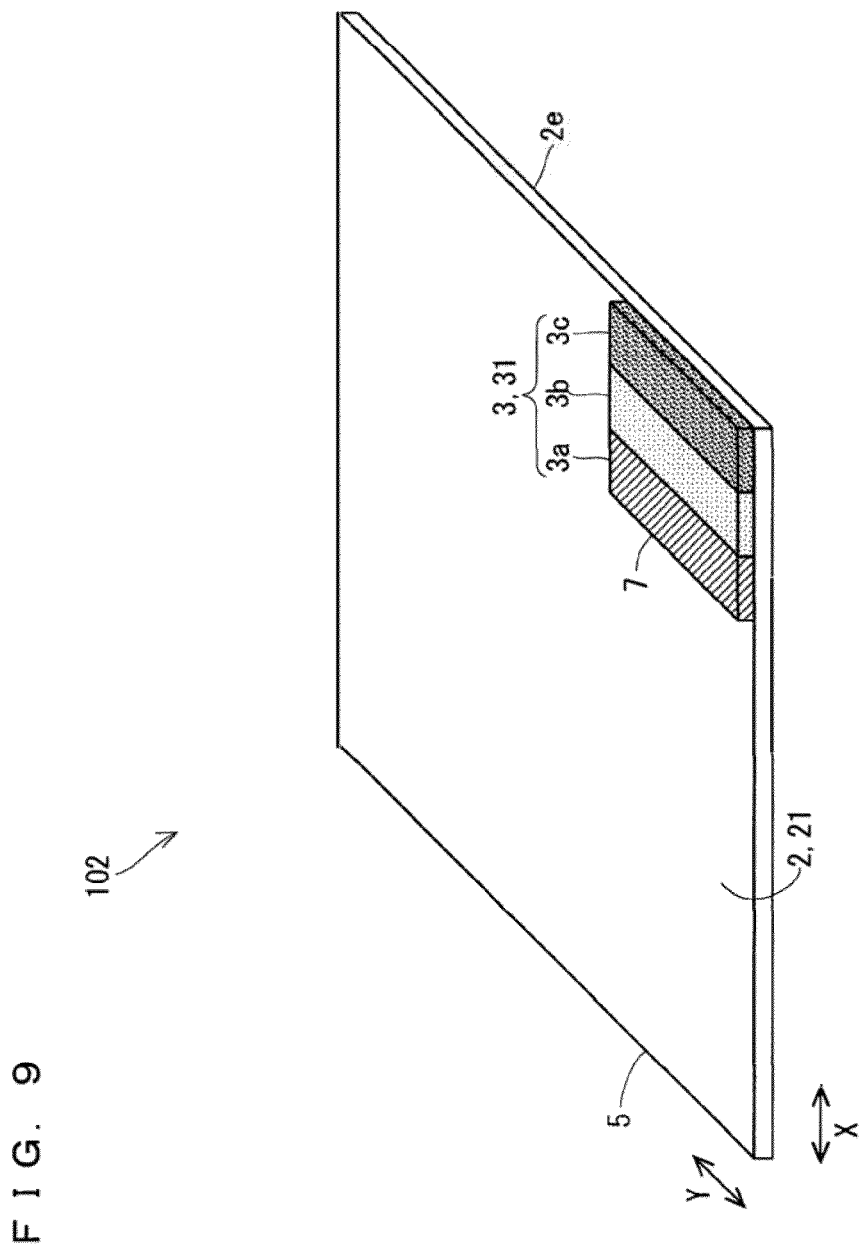
FIG. 9 is a perspective view schematically illustrating the one display pixel included in the self-luminous display apparatus of the first embodiment.

FIG. 4 is a plan view schematically illustrating a self-luminous display apparatus of a first embodiment. FIG. 5 is a perspective view schematically illustrating the self-luminous display apparatus of the first embodiment. FIG. 6 is a plan view schematically illustrating adjacent four display pixels included in the self-luminous display apparatus of the first embodiment. FIG. 7 is a perspective view schematically illustrating the adjacent four display pixels included in the self-luminous display apparatus of the first embodiment. FIG. 8 is a plan view schematically illustrating one display pixel included in the self-luminous display apparatus of the first embodiment. FIG. 9 is a perspective view schematically illustrating the one display pixel included in the self-luminous display apparatus of the first embodiment.

Four display pixels 101 illustrated in FIGS. 6 and 7 are obtained by cutting a self-luminous display apparatus 100 of the first embodiment illustrated in FIGS. 4 and 5 at the positions of the cutting lines E-E and F-F. One display pixel 102 illustrated in FIGS. 8 and 9 is obtained by cutting the four display pixels 101 illustrated in FIGS. 6 and 7 at the positions of the cutting lines G-G and H-H.

The self-luminous display apparatus 100 is a μLED display. The self-luminous display apparatus 100 is an example of a self-luminous body for a display apparatus.

As illustrated in FIGS. 4 and 5, the self-luminous display apparatus 100 includes a plurality of display pixels 2.

The plurality of display pixels 2 are arranged in a matrix. As illustrated in FIGS. 4 to 9, each display pixel of the plurality of display pixels 2 includes a subpixel group 3.

The plurality of display pixels 2 constitute an active area in which an image and a video displayed by the plurality of subpixel groups 3 included in each of the plurality of display pixels 2 are displayed.

Each display pixel 2 includes one subpixel group 3. Therefore, the number of display pixels 2 included in the self-luminous display apparatus 100 is the same as the number of subpixel groups 3 included in the self-luminous display apparatus 100.

The subpixel group 3 is in contact with an end 2e of the display pixel 2.

The subpixel group 3 includes two or more subpixels, and desirably includes three or more subpixels. As illustrated in FIGS. 4 to 9, in the self-luminous display apparatus 100, the subpixel group 3 includes three subpixels 3a, 3b, and 3c.

Each subpixel of the three subpixels 3a, 3b, and 3c is a self-luminous element. Therefore, the subpixel group 3 is a self-luminous element assembly. In the self-luminous display apparatus 100, the self-luminous element is an LED element. The self-luminous element may be a self-luminous element other than the LED element.

The three subpixels 3a, 3b, and 3c serve as light emission sources for causing the plurality of subpixel groups 3 to display an image and a video.

The three subpixels 3a, 3b, and 3c are linearly arranged. The three subpixels 3a, 3b, and 3c are arranged adjacent to each other.

The three subpixels 3a, 3b, and 3c emit light of three colors different from each other. In the self-luminous display apparatus 100, the three subpixels 3a, 3b, and 3c emit red, green, and blue light constituting three primary colors, respectively. In this case, by causing all of the three subpixels 3a, 3b, and 3c to emit light having predetermined brightness, the subpixel group 3 can be caused to emit white light. Furthermore, by causing all or a part of the three subpixels 3a, 3b, and 3c to emit light having brightness darker than the predetermined brightness, the subpixel group 3 can be caused to emit light of intermediate colors such as gray and yellow. The arrangement order of the three subpixels 3a, 3b, and 3c that emit red, green, and blue light may be changed. Each subpixel of the three subpixels 3a, 3b, and 3c may emit light of a color different from red, green, and blue.

When the subpixel group 3 includes two or more subpixels, the two or more subpixels emit light of two or more colors different from each other. The two or more colors different from each other include at least one selected from the group consisting of red, green, blue, and white. The two or more colors different from each other may include colors different from red, green, blue, and white.

2.2 Stacks

As illustrated in FIGS. 4 and 5, the self-luminous display apparatus 100 includes a backplane 5 and a plurality of stacks 7.

The plurality of stacks 7 are arranged on the backplane 5.

Each stack of the plurality of stacks 7 is a display pixel group.

Each stack 7 includes two or more subpixel groups 3, and desirably includes four or more subpixel groups 3. As illustrated in FIGS. 4 to 9, in the self-luminous display apparatus 100, each stack 7 includes four subpixel groups 31, 32, 33, and 34.

The plurality of display pixels 2 include two or more display pixels in which each stack 7 is arranged. In the self-luminous display apparatus 100, the plurality of display pixels 2 include four display pixels 21, 22, 23, and 24 in which each stack 7 is arranged. The four display pixels 21, 22, 23, and 24 are four regions that can independently emit light, respectively.

The four subpixel groups 31, 32, 33, and 34 are arranged in the four display pixels 21. 22, 23, and 24, respectively.

The four subpixel groups 31, 32, 33, and 34 are not structurally divided. Therefore, the four subpixel groups 31, 32, 33, and 34 are integrated. Each stack 7 is arranged across the four display pixels 21, 22, 23, and 24.

The three subpixels 3a, 3b, and 3c are also not structurally divided. Therefore, the three subpixels 3a, 3b, and 3c are integrated.

Therefore, the twelve subpixels included in each stack 7 are not structurally divided. Further, the twelve subpixels are integrated. The twelve subpixels are integrated into one chip using a semiconductor process. In each stack 7, the twelve subpixels formed on a substrate such as a sapphire substrate are integrated, and the twelve subpixels are diced into one chip as one unit.

The twelve subpixels included in each stack 7 include the three subpixels 3a, 3b, and 3c included in each subpixel group of the four subpixel groups 31, 32, 33, and 34.

The four subpixel groups 31, 32, 33, and 34 are electrically separated. Therefore, the four subpixel groups 31, 32, 33, and 34 can emit light independently of each other. Therefore, the four display pixels 21, 22, 23, and 24 can emit light independently of each other.

The three subpixels 3a, 3b, and 3c are also electrically separated. Therefore, the three subpixels 3a, 3b, and 3c can also emit light independently of each other.

In FIGS. 8 and 9, only one subpixel group 31 included in each stack 7 is illustrated. However, the four subpixel groups 31, 32, 33, and 34 included in each stack 7 are not structurally divided but are integrated. That is, the four subpixel groups 31, 32, 33, and 34 are integrated in one chip using a semiconductor process. In each stack 7, the four subpixel groups 31, 32, 33, and 34 formed on a substrate such as a sapphire substrate are integrated, and the four subpixel groups 31, 32, 33, and 34 are diced into one chip as one unit. Therefore, one subpixel group 31 included in each stack 7 illustrated in FIGS. 8 and 9 is not structurally divided from the other three subpixel groups 32, 33, and 34 included in each stack 7, and is integrated with the other three subpixel groups 32, 33, and 34 included in each stack 7.

When the four subpixel groups 31, 32, 33, and 34 are integrated and included in each stack 7, by arranging one stack 7 on the backplane 5, the four subpixel groups 31, 32, 33, and 34 can be collectively arranged in the four display pixels 21, 22, 23, and 24. As a result, the time required to manufacture the self-luminous display apparatus 100 can be shortened.

2.3 Active Area and Inactive Area

The self-luminous display apparatus 100 has an active area and an inactive area. The active area is an area in which an image and a video are displayed. The inactive area is a frame-like area which is arranged outside the active area and in which an image and a video are not displayed.

2.4 Element for Operating Subpixel

As illustrated in FIGS. 4 and 5, the self-luminous display apparatus 100 includes the backplane 5 and driving ICs 6. Further, the self-luminous display apparatus 100 includes a terminal (not illustrated).

The driving ICs 6 and the terminal are arranged in the inactive area

The backplane 5 includes a glass substrate, an electrode, a switching element, a metal thin-film wiring, and the like (not illustrated). The backplane 5 may include an antireflection film covering the surfaces of the switching element and the metal thin-film wiring.

The backplane 5 has a rectangular planar shape. The backplane 5 may have a planar shape other than the rectangular planar shape. For example, the backplane 5 may have a polygonal planar shape, a planar shape having an outline including an arc, a planar shape having an outline including a recess, or the like. The polygonal planar shape is a hexagonal planar shape, an octagonal planar shape, or the like.

The switching element is a thin film transistor. The semiconductor constituting the thin film transistor is determined according to the design of the self-luminous display apparatus 100. The semiconductor is an oxide, amorphous silicon, low-temperature polysilicon, or the like.

The switching element and the electrode are arranged inside each display pixel 2. The number of switching elements arranged inside each display pixel 2 and the position of the switching element inside each display pixel 2 are determined according to the design of the self-luminous display apparatus 100.

Each subpixel of the three subpixels 3a, 3b, and 3c is electrically connected to the switching element via an electrode. The switching element is electrically connected to the driving IC 6 via a metal thin-film wiring. The terminal is electrically connected to a control board outside the self-luminous display apparatus 100 via a flexible board or the like.

The terminal receives signals such as a drive signal and a video signal supplied to the switching element from the control board via the flexible board or the like. The driving IC 6 transmits signals such as a driving signal and a video signal. The metal thin-film wiring supplies the transmitted signals to the switching element. The switching element operates the subpixel electrically connected to the switching element according to the supplied signals. As a result, light emitted by the plurality of subpixel groups 3 included in the plurality of display pixels 2 is controlled according to signals such as a drive signal and a video signal. As a result, the image and the video are displayed in the active area.

The three subpixels 3a, 3b, and 3c may be operated by an operation method different from the above-described operation method. For example, the three subpixels 3a, 3b, and 3c may be electrically connected to one switching element, and one switching element may operate the three subpixels 3a. 3b, and 3c. A switching element other than the thin film transistor may operate each subpixel of the three subpixels 3a, 3b, and 3c. For example, a pixel driving IC may operate each subpixel. In a case where the pixel driving IC operates each subpixel, in general, one pixel driving IC operates each subpixel.

The switching element, the metal thin-film wiring, the electrode, and the like are formed by a semiconductor process.

The backplane 5 may have a configuration other than the above-described configuration. For example, the backplane 5 may be a printed circuit board including a glass epoxy substrate, a copper wiring, an electrode, and the like. The electrode is subjected to plating treatment. In a case where the backplane 5 is a printed circuit board, a switching element such as a pixel driving IC produced using a glass substrate, a silicon substrate, or the like is arranged on the printed circuit board instead of the thin film transistor.

2.5 Protection of Surface of Self-Luminous Display Apparatus

The self-luminous display apparatus 100 has a surface on which the switching element, the plurality of subpixel groups 3, and the like are exposed. The self-luminous display apparatus 100 may include a protective member that protects the surface. The protective member faces the backplane 5 across the plurality of subpixel groups 3. The protective member is made of glass, resin, or the like. The protective member is a protective film, a protective plate, a protective cover, or the like.

2.6 Size of Subpixel

The length of one side of each subpixel of the three subpixels 3a, 3b, and 3c is less than 100 μm. Generally speaking, an LED element having a length of one side of less than 100 μm is referred to as a μLED element. Therefore, the LED element to be each subpixel is a μLED element. However, the length of one side of each subpixel is determined according to the design of the self-luminous display apparatus 100. Therefore, the LED element to be each subpixel may be an LED element that is not a μLED element having a length of one side of 100 μm or more.

2.7 Method for Manufacturing Self-Luminous Display Apparatus

Figure 10:
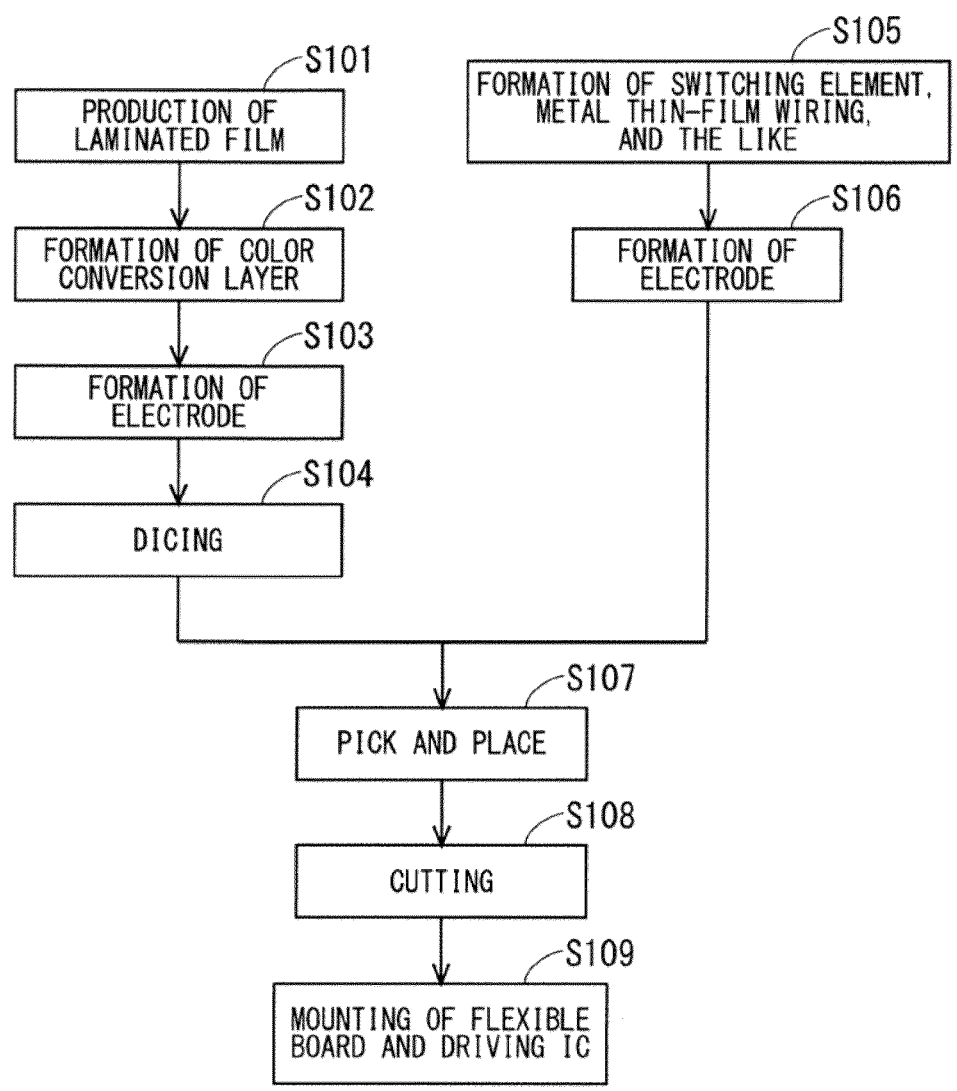
FIG. 10 is a flowchart illustrating a method for manufacturing the self-luminous display apparatus of the first embodiment and a backlight of the second embodiment.

FIG. 10 is a flowchart illustrating a method for manufacturing the self-luminous display apparatus of the first embodiment.

The self-luminous display apparatus 100 is manufactured by a manufacturing method illustrated in FIG. 10. Therefore, when the self-luminous display apparatus 100 is manufactured, steps S101 to S109 illustrated in FIG. 10 are executed.

In steps S101 to S104, each stack 7 is manufactured.

In step S101, a laminated film is produced. The laminated film is produced on a substrate. The substrate is a sapphire substrate or the like. The substrate is also referred to as a wafer. The laminated film to be produced includes a buffer layer, an n-type semiconductor layer, a light emitting layer, a p-type semiconductor layer, and the like. The laminated film is produced by crystal-growing a layer included in the laminated film.

In subsequent step S102, a color conversion layer is formed. The color conversion layer to be formed includes fluorescent particles and the like. The color conversion layer is formed such that an LED element to which a color conversion layer for converting a color of emitted light from blue to red is added and an LED element to which a color conversion layer for converting a color of emitted light from blue to green is added are adjacent to an LED element for emitting blue light In subsequent step S103, an electrode is formed. The electrode is formed on the n-type semiconductor layer and the p-type semiconductor layer, and is electrically in contact with the n-type semiconductor layer and the p-type semiconductor layer.

In subsequent step S104, dicing is performed. By dicing, an intermediate product including a substrate, a laminated film, a color conversion layer, and an electrode is cut into the size of each stack 7, and each stack 7 including the four subpixel groups 31, 32, 33, and 34 diced and integrated into one chip is obtained.

When the self-luminous display apparatus 900 is manufactured, the intermediate product is cut into the size of each subpixel of the three subpixels 3a, 3b, and 3c, and each subpixel is obtained. On the other hand, when the self-luminous display apparatus 100 is manufactured, the intermediate product is cut into the size of each stack 7 including the four integrated subpixel groups 31, 32, 33, and 34, and each stack 7 is obtained. Therefore, when the self-luminous display apparatus 100 is manufactured, the time required to cut the intermediate product can be shortened as compared with the case where the self-luminous display apparatus 900 is manufactured. For example, when each subpixel group 3 includes the three subpixels 3a, 3b, and 3c, the time required to cut the intermediate product can be shortened to about 1/12. Furthermore, when each subpixel group 3 includes four subpixels, the time required to cut the intermediate product can be shortened to about 1/16.

Each stack 7 may be manufactured by steps different from steps S101 to S104.

In steps S105 and S106, the backplane 5 is manufactured.

In step S105, a switching element, a metal thin-film wiring, and the like are formed on a glass substrate. The switching element, the metal thin-film wiring, and the like are formed by a semiconductor process. As the glass substrate, a glass substrate having a large size capable of taking a large number of glass substrates included in the self-luminous display apparatus 100 is used.

In subsequent step S106, an electrode is formed on the glass substrate. The electrode is formed so as to be electrically connected to the switching element, the metal thin-film wiring, or the like.

The backplane 5 may be manufactured by steps different from the processes S105 and S106.

In step S107, pick and place is performed. At that time, each stack 7 is arranged on the backplane 5 by a pick and place method. In addition, each stack 7 is repeatedly arranged on the backplane 5. In addition, the terminal of the LED element included in each stack 7 is electrically connected to the electrode included in the backplane 5.

When the self-luminous display apparatus 900 is manufactured, four subpixel groups 3 are arranged in four display pixels 2 by twelve picks and places. On the other hand, when the self-luminous display apparatus 100 is manufactured, the four subpixel groups 31, 32, 33, and 34 are collectively arranged in the four display pixels 21, 22, 23, and 24 by one pick and place. Therefore, when the self-luminous display apparatus 100 is manufactured, the time required to arrange the four subpixel groups 31. 32, 33, and 34 on the backplane 5 can be shortened as compared with the case where the self-luminous display apparatus 900 is manufactured. For example, when each subpixel group 3 includes the three subpixels 3a, 3b, and 3c, the time required to arrange the four subpixel groups 31, 32, 33, and 34 on the backplane 5 can be shortened to about 1/12. Furthermore, when each subpixel group 3 includes four subpixels, the time required to arrange the four subpixel groups 31, 32, 33, and 34 on the backplane 5 can be shortened to about 1/16.

Each stack 7 may be arranged on the backplane 5 by an arrangement method other than the pick and place method. Only the LED layer including the buffer layer, the n-type semiconductor layer, the light emitting layer, the p-type semiconductor layer, the electrode, the color conversion layer, and the like may be peeled off from the substrate by a laser lift-off method or the like, and the peeled LED layer may be arranged on the backplane 5. Instead of these methods, a transfer method using an elastic stamp, a method using magnetism or static electricity, or the like may be adopted. The terminal included in the LED element is electrically connected to the electrode included in the backplane 5 using a conductive paste, an anisotropic conductor film, or the like. The terminal included in the LED element may be electrically connected to the electrode by a connection method different from the connection method.

In subsequent step S108, cutting is performed. By the cutting, the glass substrate having a large size is cut into the size of the glass substrate included in one self-luminous display apparatus 100. The glass substrate is cut by a scribing and breaking method.

In subsequent step S109, a flexible board and driving ICs are mounted. As a result, the self-luminous display apparatus 100 is obtained. The flexible board and the driving ICs are mounted on the glass substrate via an anisotropic conductive film.

The order in which steps S101 to S109 are executed may be different from the above-described order. In addition, the processing performed in each of steps S101 to S109 may be different from the above-described processing.

The self-luminous display apparatus 100 may be manufactured by a manufacturing method different from the manufacturing method illustrated in FIG. 10 as long as the feature that the four subpixel groups 31, 32, 33, and 34 are collectively arranged on the backplane 5 by arranging each stack 7 including the four integrated subpixel groups 31, 32, 33, and 34 on the backplane 5 is not lost.

2.8 Arrangement of Subpixel, Subpixel Group, Stack, and Display Pixel

As illustrated in FIGS. 4 to 7, each stack 7 includes twelve subpixels. Each stack 7 includes two columns of self-luminous elements arranged in the direction Y in which the cutting line F-F extends and electrically separated from each other. Each self-luminous element of the two columns of self-luminous elements includes six self-luminous elements arranged in the direction X in which the cutting line E-E extends and electrically separated from each other. Each stack 7 includes six rows of self-luminous elements arranged in the direction X in which the cutting line E-E extends and electrically separated from each other. Each self-luminous element of the six rows of self-luminous elements includes two self-luminous elements arranged in the direction Y in which the cutting line F-F extends and electrically separated from each other.

Each stack 7 includes the four subpixel groups 31, 32, 33, and 34. Each stack 7 includes two columns of subpixel groups arranged in the direction Y in which the cutting line F-F extends and electrically separated from each other. Each of the two columns of subpixel groups includes two subpixel groups arranged in the direction X in which the cutting line E-E extends and electrically separated from each other. Each stack 7 includes two rows of subpixel groups arranged in the direction X in which the cutting line E-E extends and electrically separated from each other. Each of the two rows of subpixel groups includes two subpixel groups arranged in the direction Y in which the cutting line F-F extends and electrically separated from each other. As a result, each stack 7 includes the four subpixel groups 31, 32, 33, and 34 respectively arranged in the four display pixels 21, 22, 23, and 24 arranged in a matrix such that the two rows of display pixels are arranged in the direction X and the two columns of display pixels are arranged in the direction Y. The center of each stack 7 including the four subpixel groups 31, 32, 33, and 34 is aligned with the position where the four display pixels 21, 22, 23, and 24 are in contact with each other. As a result, each stack 7 is arranged across the four display pixels 21, 22, 23, and 24. Further, two sides included in four sides of each subpixel group of the four subpixel groups 31, 32, 33, and 34 are in contact with the ends 2e of the two display pixels 2. However, the positions of the four subpixel groups 31, 32, 33, and 34 may deviate from the above-described positions due to the influence of the process accuracy when the self-luminous display apparatus 100 is manufactured.

Each subpixel group in the stack 7 is independently driven as one display pixel by the driving IC 6, and functions as a display apparatus. For example, only the integrated stack 7 including the four subpixel groups 31, 32, 33, and 34 constitutes the four display pixels 2, and constitutes a 6 × 6 display in FIG. 4.

The self-luminous display apparatus 100 has a structure obtained by repeatedly arranging the stacks 7 each including the four display pixels 21, 22, 23, and 24 and the four subpixel groups 31, 32, 33, and 34 in the direction X and the direction Y so as not to overlap each other.

Hereinafter, specific examples of the arrangement of the display pixel 2, the subpixel group 3, the subpixels 3a, 3b, and 3c. and the stack 7 will be described.

Example 1

Figure 11:
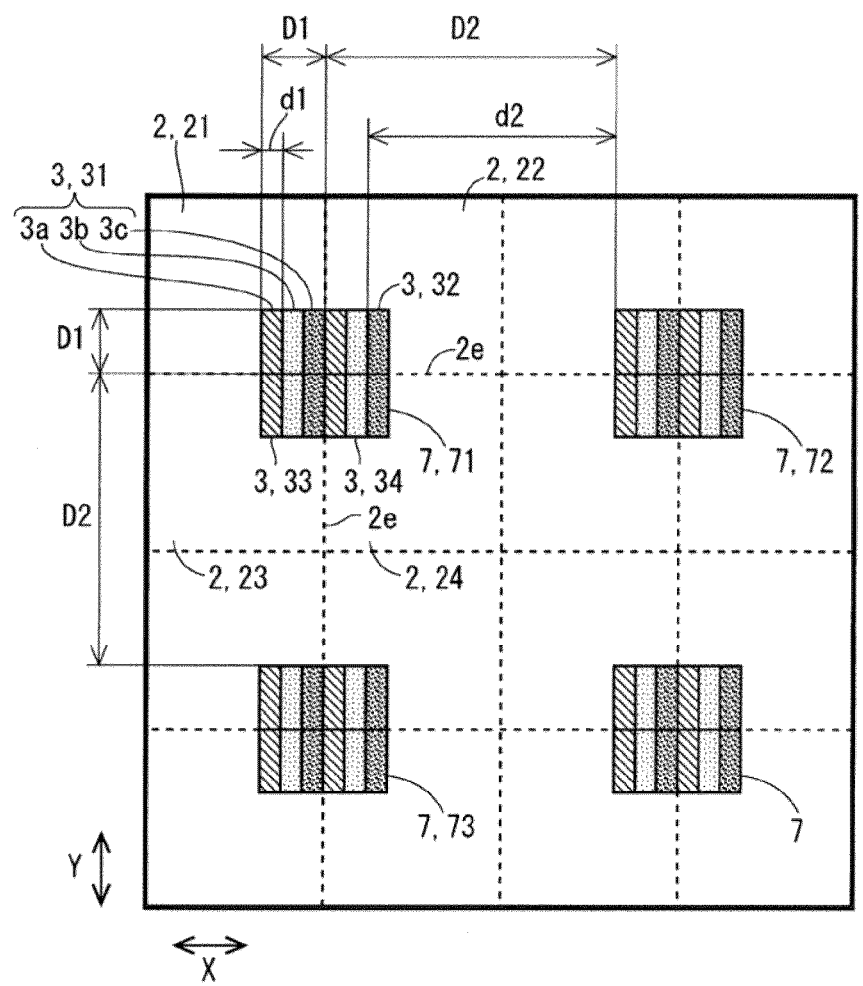
FIG. 11 is a plan view schematically illustrating sixteen display pixels included in a self-luminous display apparatus of Example 1 of the first embodiment.

FIG. 11 is a plan view schematically illustrating sixteen display pixels included in a self-luminous display apparatus of Example 1 of the first embodiment.

The sixteen display pixels illustrated in FIG. 11 are obtained by cutting the self-luminous display apparatus 100 of the first embodiment illustrated in FIGS. 4 and 5 at the positions of the cutting lines E-E and F-F.

As illustrated in FIG. 11, the self-luminous display apparatus 100 includes the sixteen display pixels 2 arranged in a matrix such that the four rows of display pixels are arranged in the direction X and the four columns of display pixels are arranged in the direction Y.

Each subpixel of the three subpixels 3a, 3b, and 3c has a rectangular planar shape. The long sides and the short sides of each subpixel are arranged in parallel to the direction Y and the direction X, respectively.

The three subpixels 3a, 3b, and 3c are arranged in the direction X such that long sides of the two subpixels 3a and 3b adjacent to each other face each other, and long sides of the two subpixels 3b and 3c adjacent to each other face each other. Therefore, the three subpixels 3a, 3b, and 3c are arranged in the direction X such that one long side of the subpixel 3a faces one long side of the subpixel 3b adjacent to the subpixel 3a, and the other long side of the subpixel 3b faces one long side of the subpixel 3c adjacent to the subpixel 3b.

The twelve subpixels included in each stack 7 are arranged such that the two subpixels arranged in the direction Y emit light of the same color. As a result, the self-luminous display apparatus 100 can be easily manufactured, and the three subpixels 3a, 3b, and 3c can be easily driven. However, the twelve subpixels may be arranged by an arrangement method different from the arrangement method.

As illustrated in FIG. 11, each stack 7 includes four subpixels 3a, four subpixels 3b, and four subpixels 3c. Furthermore, as illustrated in FIG. 11, each stack 7 includes the four subpixel groups 31, 32, 33, and 34. The four subpixel groups 31, 32, 33, and 34 are arranged in a matrix such that the two columns of subpixel groups are arranged in the direction X and the two rows of subpixel groups are arranged in the direction Y. The four subpixel groups 31, 32, 33, and 34 are arranged such that the long sides of the subpixels 3a and 3c, which are arranged in the direction X and included in the two subpixel groups adjacent to each other, near the center of each stack 7 face each other. Furthermore, the four subpixel groups 31, 32, 33, and 34 are arranged such that the short sides of the subpixels 3a, 3b, and 3c, which are arranged in the direction Y and included in the two subpixel groups adjacent to each other, near the center of each stack 7 face each other. Therefore, the twelve subpixels included in each stack 7 are arranged in a matrix such that the six rows of subpixels are arranged in the direction X and the two columns of subpixels are arranged in the direction Y.

The three subpixels 3a, 3b, and 3c of each stack 7 are arranged at a first pitch d1 in the specific direction X. The first pitch d1 matches the length of the short side of each subpixel of the three subpixels 3a, 3b, and 3c. In addition, the plurality of stacks 7 include two stacks 71 and 72 that are arranged in the specific direction X and adjacent to each other. The two subpixels 3c and 3a that are included in the two stacks 71 and 72 and adjacent to each other are arranged at a second pitch d2 larger than the first pitch d1.

Here, attention is paid to the subpixel 3a. The four display pixels 21, 22, 23, and 24 include the two display pixels 21 and 22 arranged in the specific direction X and adjacent to each other. The subpixels 3a and 3a that are provided in the two display pixels 21 and 22 and emit light of the same color are arranged at a first pitch D1 in the specific direction X. Therefore, the twelve subpixels included in each stack 7 include two first subpixels 3a that are arranged at the first pitch D1 in the specific direction X and emit light of the same color. The first pitch D1 matches the sum of the lengths of the short sides of the three subpixels 3a, 3b, and 3c. In addition, the plurality of stacks 7 include two stacks 71 and 72 that are arranged in the specific direction X and adjacent to each other. The two stacks 71 and 72 respectively include two subpixels 3a and 3a that are arranged in the specific direction X at a second pitch D2 larger than the first pitch D1 and emit light of the same color. The same applies to the case where attention is paid to the subpixels 3b and 3c.

Here, attention is paid to the subpixel 3a again. The four display pixels 21, 22, 23, and 24 include the two display pixels 21 and 23 arranged in the specific direction Y and adjacent to each other. The subpixels 3a and 3a that are provided in the two display pixels 21 and 23 and emit light of the same color are arranged at the first pitch D1 in the specific direction Y. Therefore, the twelve subpixels included in each stack 7 include two first subpixels 3a that are arranged at the first pitch D1 in the specific direction Y and emit light of the same color. The first pitch D1 matches the length of the long sides of the three subpixels 3a, 3b, and 3c. In addition, the plurality of stacks 7 include two stacks 71 and 73 that are arranged in the specific direction Y and adjacent to each other. The two stacks 71 and 73 respectively include two subpixels 3a and 3a that arc arranged in the specific direction Y at the second pitch D2 larger than the first pitch D1 and emit light of the same color. The same applies to the case where attention is paid to the subpixels 3b and 3c.

The three subpixels 3a, 3b, and 3c are arranged in the specific direction X at the first pitch. The four subpixel groups 31, 32, 33, and 34 are arranged in the specific direction X at the second pitch larger than the first pitch. The plurality of stacks 7 are arranged in the specific direction X at a third pitch larger than the first pitch and the second pitch.

Furthermore, the three subpixels 3a, 3b, and 3c are arranged in the specific direction Y at the first pitch. The four subpixel groups 31, 32, 33, and 34 are arranged in the specific direction Y at the second pitch that is the same as the first pitch. The plurality of stacks 7 are arranged in the specific direction Y at the third pitch larger than the first pitch and the second pitch.

Each subpixel of the three subpixels 3a, 3b, and 3c has a rectangular planar shape. The sum of the lengths of the short sides of the three subpixels 3a, 3b, and 3c is the same as the length of the long side of each subpixel of the three subpixels 3a, 3b, and 3c. Therefore, each subpixel group 3 has a square planar shape. However, the sum of the lengths of the short sides of the three subpixels 3a, 3b, and 3c may not be the same as the length of the long side of each subpixel. Therefore, the subpixel group 3 may not have a square planar shape. In addition, the first pitch D1 and the second pitch D2 in the direction X are the same as the first pitch D1 and the second pitch D2 in the direction Y, respectively. Therefore, each display pixel 2 has a square planar shape. However, the first pitch D1 and the second pitch D2 in the direction X may not be the same as the first pitch D1 and the second pitch D2 in the direction Y, respectively. Therefore, each display pixel 2 may not have a square planar shape. For example, each display pixel 2 may have a rectangular planar shape, a polygonal planar shape, a planar shape having an outline including an arc, or the like. The planar shape of each display pixel 2 is determined according to the design of the self-luminous display apparatus 100.

The lengths of the long sides of the three subpixels 3a, 3b, and 3c are the same. However, the lengths of the long sides of the three subpixels 3a, 3b, and 3c may not be the same. The lengths of the short sides of the three subpixels 3a, 3b, and 3c are the same. However, the lengths of the short sides of the three subpixels 3a, 3b, and 3c may not be the same.

Even in a case where the dimensions of the three subpixels 3a, 3b, and 3c are different from the exemplified dimensions, between the four display pixels 21, 22, 23, and 24 and the four display pixels 21, 22, 23, and 24 adjacent to the four display pixels 21, 22, 23, and 24, the subpixels 3a that emit light of the same color in each direction of the direction X and the direction Y are arranged at a plurality of pitches D1 and D2 different from each other, whereby the effect of the present disclosure is exhibited. The same applies to the subpixels 3b and 3c. That is, the four subpixel groups 31, 32, 33, and 34 can be collectively arranged in the four display pixels 21, 22, 23, and 24, and the time required to manufacture the self-luminous display apparatus 100 can be shortened.

Example 2

Figure 12:
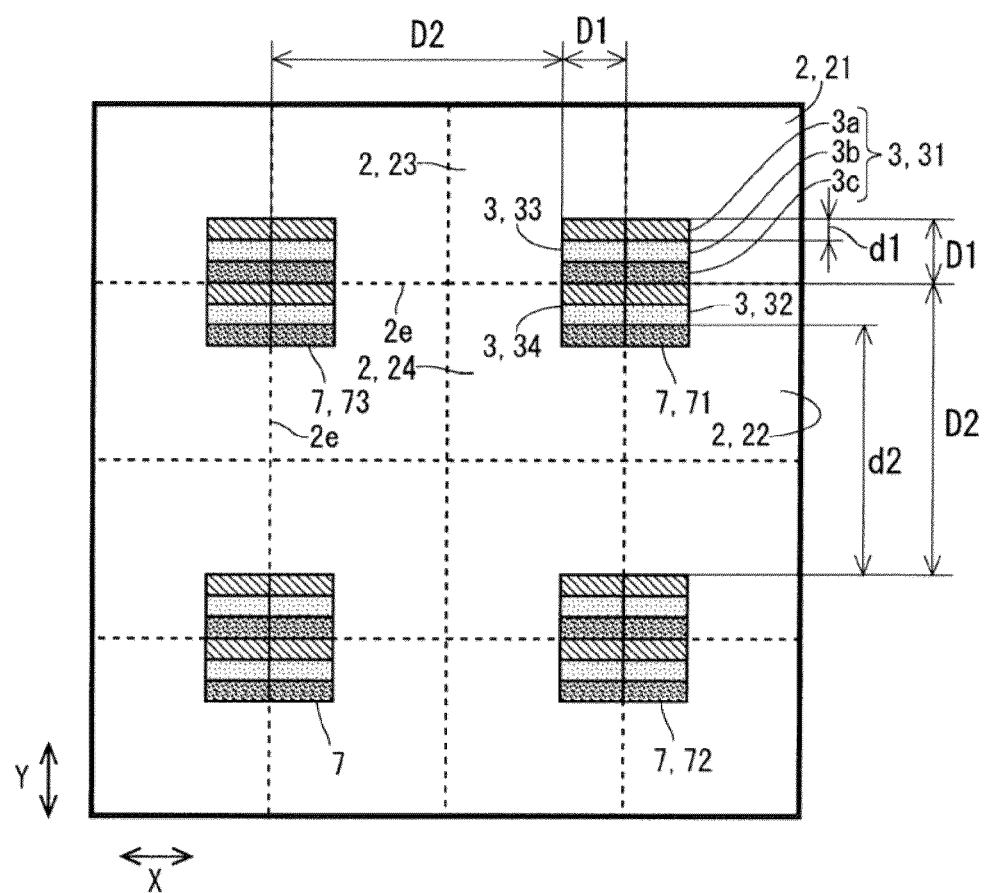
FIG. 12 is a plan view schematically illustrating sixteen display pixels included in a self-luminous display apparatus of Example 2 of the first embodiment.

FIG. 12 is a plan view schematically illustrating sixteen display pixels included in a self-luminous display apparatus of Example 2 of the first embodiment.

The sixteen display pixels illustrated in FIG. 12 are obtained by cutting the self-luminous display apparatus 100 of the first embodiment illustrated in FIGS. 4 and 5 at the positions of the cutting lines E-E and F-F.

As illustrated in FIG. 12, Example 2 is different from Example 1 in that the arrangement direction of the display pixels 2, the subpixel groups 3, the subpixels 3a, 3b, and 3c, and the stacks 7 is rotated clockwise by 90°. Therefore, the description of Example 1 will be the description of Example 2 by replacing the direction X and the direction Y with the direction Y and the direction X, respectively. Therefore, detailed description of Example 2 will be omitted.

Also in Example 2, between the four display pixels 21, 22, 23, and 24 and the four display pixels 21, 22, 23, and 24 adjacent to the four display pixels 21, 22, 23, and 24, the subpixels 3a that emit light of the same color in each direction of the direction X and the direction Y are arranged at a plurality of pitches D1 and D2 different from each other, whereby the effect of the present disclosure is exhibited. The same applies to the subpixels 3b and 3c. That is, the four subpixel groups 31, 32, 33, and 34 can be collectively arranged in the four display pixels 21, 22, 23, and 24, and the time required to manufacture the self-luminous display apparatus 100 can be shortened.

Example 3

Figure 13:
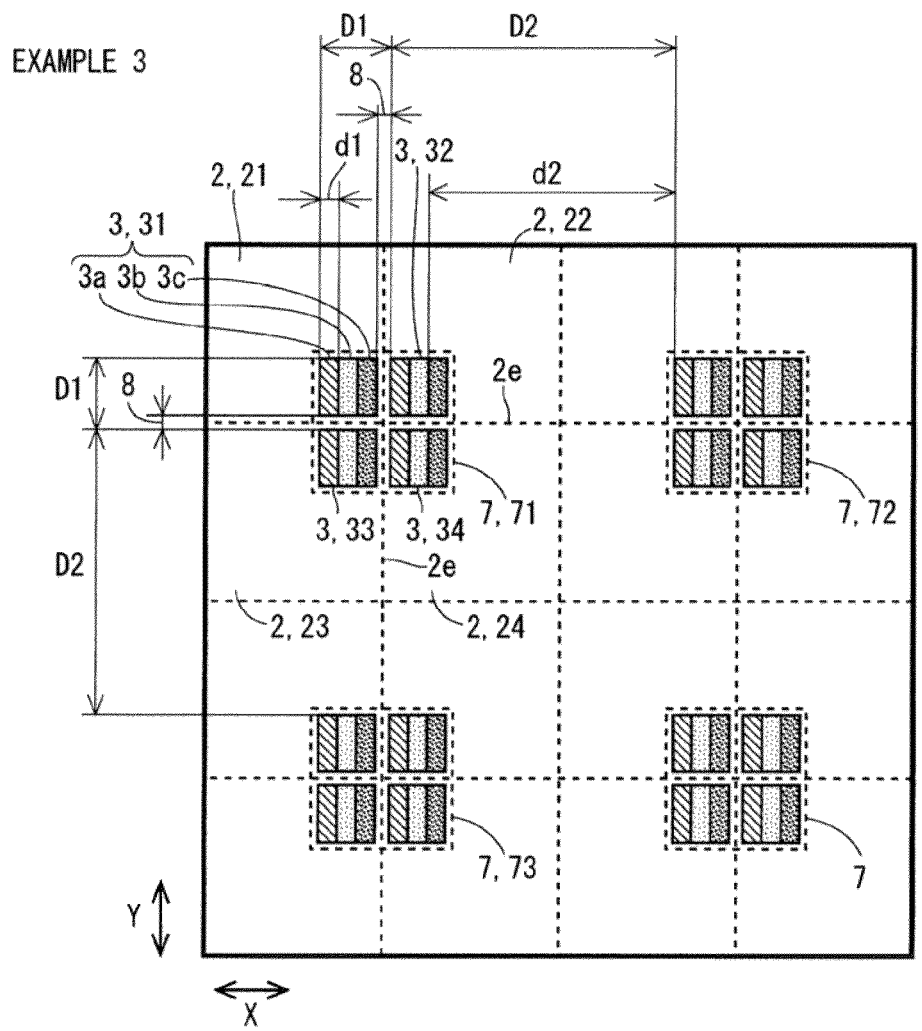
FIG. 13 is a plan view schematically illustrating sixteen display pixels included in a self-luminous display apparatus of Example 3 of the first embodiment.

FIG. 13 is a plan view schematically illustrating sixteen display pixels included in a self-luminous display apparatus of Example 3 of the first embodiment.

The sixteen display pixels illustrated in FIG. 13 are obtained by cutting the self-luminous display apparatus 100 of the first embodiment illustrated in FIGS. 4 and 5 at the positions of the cutting lines E-E and F-F.

As illustrated in FIG. 12, Example 3 is different from Example 1 in that adjacent two subpixel groups 31 and 32 included in the four subpixel groups 31, 32, 33, and 34 are separated from each other with a gap 8 interposed therebetween. The gap 8 is at the ends 2e of the display pixels 21 and 22. The same applies to two subpixel groups 33 and 34, two subpixel groups 31 and 33, and two subpixel groups 32 and 34. According to the gap 8, in a case where light of three colors different from each other is emitted by the three subpixels 3a, 3b, and 3c, it is possible to suppress color mixing of the three colors. The dimension of the gap 8 is determined according to the design of the self-luminous display apparatus 100. The plurality of gaps 8 may have the same dimension or dimensions different from each other. The gap 8 desirably has a dimension smaller than the length of the short side of each subpixel of the three subpixels 3a, 3b, and 3c.

The relationship between the first pitch d1 and the second pitch d2, the relationship between the first pitch D1 and the second pitch D2, the relationship between the first pitch in the specific direction X of the three subpixels 3a, 3b, and 3c, the second pitch in the specific direction X of the four subpixel groups 31, 32, 33, and 34, and the third pitch in the specific direction X of the plurality of stacks 7, and the relationship between the first pitch in the specific direction Y of the three subpixels 3a, 3b, and 3c, the second pitch in the specific direction Y of the four subpixel groups 31, 32, 33, and 34, and the third pitch in the specific direction Y of the plurality of stacks 7 in Example 3 are the same as those in Example 1.

Also in Example 3, between the four display pixels 21, 22, 23, and 24 and the four display pixels 21, 22, 23, and 24 adjacent to the four display pixels 21, 22, 23, and 24, the subpixels 3a that emit light of the same color in each direction of the direction X and the direction Y are arranged at a plurality of pitches D1 and D2 different from each other, whereby the effect of the present disclosure is exhibited. The same applies to the subpixels 3b and 3c. That is, the four subpixel groups 31, 32, 33, and 34 can be collectively arranged in the four display pixels 21, 22, 23, and 24, and the time required to manufacture the self-luminous display apparatus 100 can be shortened.

Example 4

Figure 14:
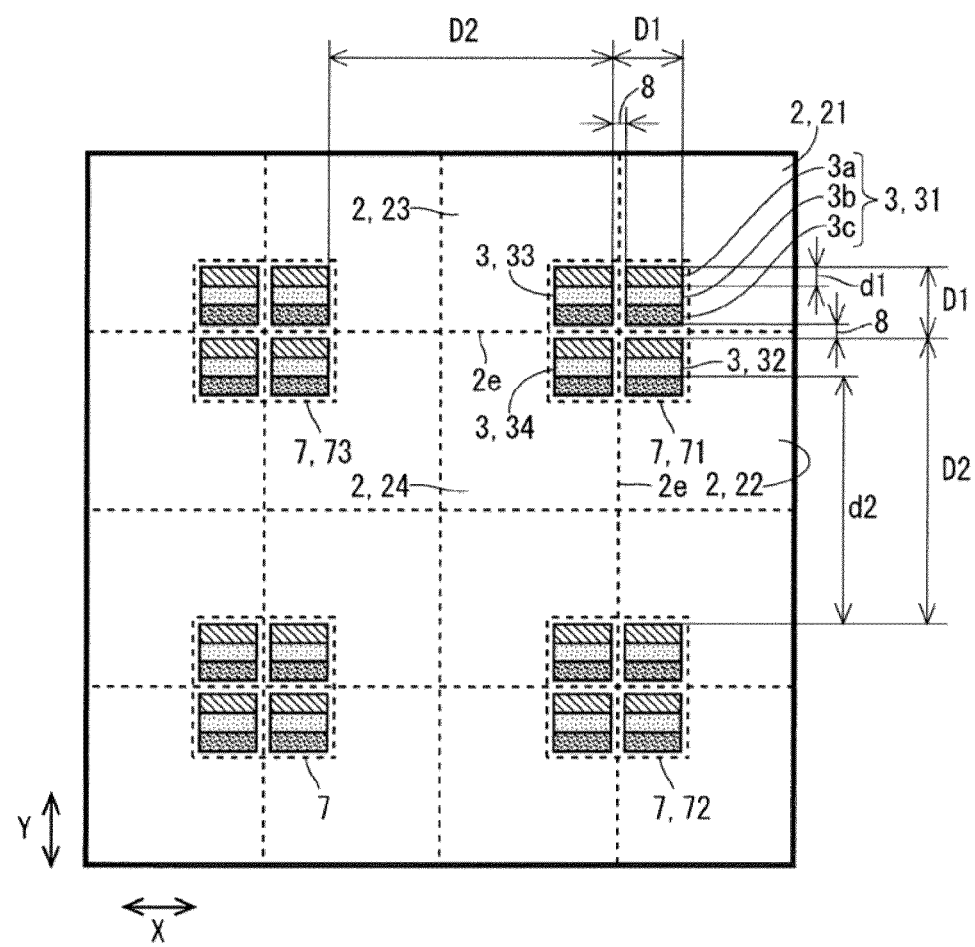
FIG. 14 is a plan view schematically illustrating sixteen display pixels included in a self-luminous display apparatus of Example 4 of the first embodiment.

FIG. 14 is a plan view schematically illustrating sixteen display pixels included in a self-luminous display apparatus of Example 4 of the first embodiment.

The sixteen display pixels illustrated in FIG. 14 are obtained by cutting the self-luminous display apparatus 100 of the first embodiment illustrated in FIGS. 4 and 5 at the positions of the cutting lines E-E and F-F.

As illustrated in FIG. 14, Example 4 is different from Example 3 in that the arrangement direction of the display pixels 2, the subpixel groups 3, the subpixels 3a, 3b, and 3c, and the stacks 7 is rotated clockwise by 90°. Therefore, the description of Example 3 will be the description of Example 4 by replacing the direction X and the direction Y with the direction Y and the direction X, respectively. Therefore, detailed description of Example 4 will be omitted.

Also in Example 4, between the four display pixels 21, 22, 23, and 24 and the four display pixels 21, 22, 23, and 24 adjacent to the four display pixels 21, 22, 23, and 24, the subpixels 3a that emit light of the same color in each direction of the direction X and the direction Y are arranged at a plurality of pitches D1 and D2 different from each other, whereby the effect of the present disclosure is exhibited. The same applies to the subpixels 3b and 3c. That is, the four subpixel groups 31, 32, 33, and 34 can be collectively arranged in the four display pixels 21, 22, 23, and 24, and the time required to manufacture the self-luminous display apparatus 100 can be shortened.

Example 5

Figure 15:
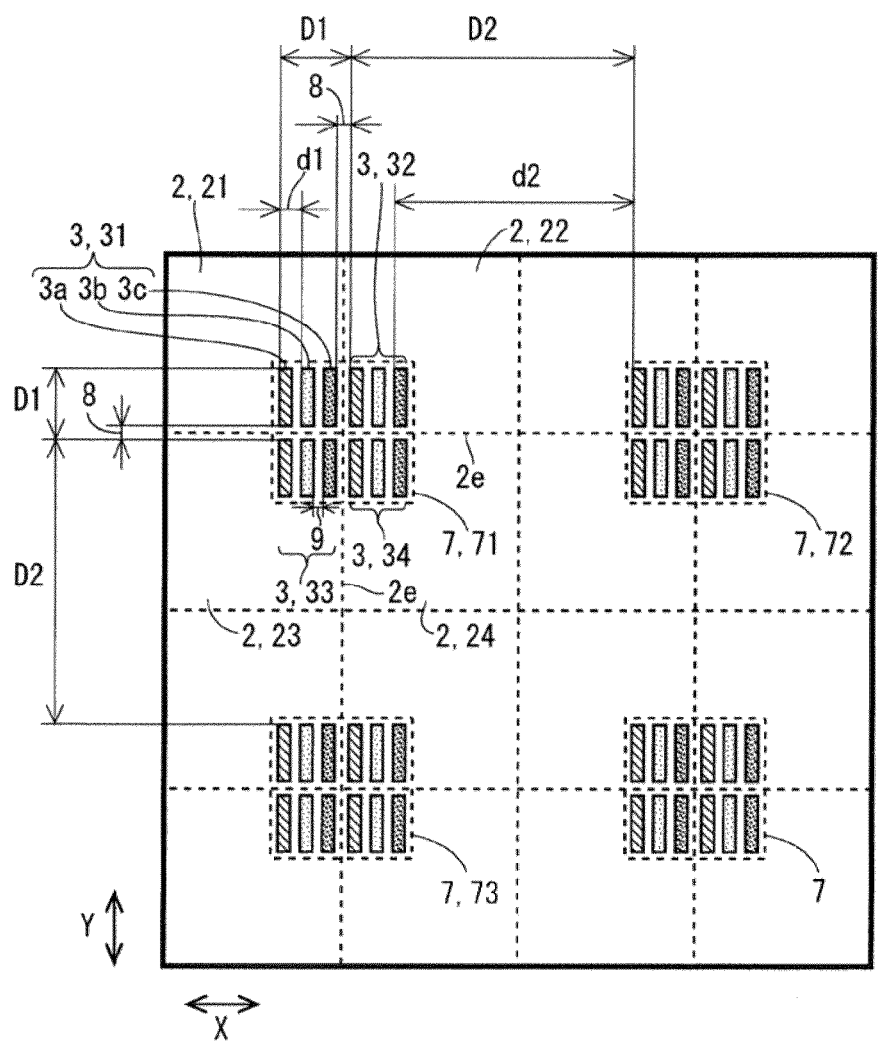
FIG. 15 is a plan view schematically illustrating sixteen display pixels included in a self-luminous display apparatus of Example 5 of the first embodiment.

FIG. 15 is a plan view schematically illustrating sixteen display pixels included in a self-luminous display apparatus of Example 5 of the first embodiment.

The sixteen display pixels illustrated in FIG. 15 are obtained by cutting the self-luminous display apparatus 100 of the first embodiment illustrated in FIGS. 4 and 5 at the positions of the cutting lines E-E and F-F.

As illustrated in FIG. 15, Example 5 is different from Example 1 in that adjacent two subpixel groups 31 and 32 included in the four subpixel groups 33, 31, 32 and 34 are separated from each other with the gap 8 interposed therebetween. The gap 8 is at the ends 2e of the display pixels 21 and 22. The same applies to two subpixel groups 33 and 34, two subpixel groups 31 and 33, and two subpixel groups 32 and 34. According to the gap 8, in a case where light of three colors different from each other is emitted by the three subpixels 3a, 3b, and 3c, it is possible to suppress color mixing of the three colors. The dimension of the gap 8 is determined according to the design of the self-luminous display apparatus 100. The plurality of gaps 8 may have the same dimension or dimensions different from each other. The gap 8 desirably has a dimension smaller than the length of the short side of each subpixel of the three subpixels 3a, 3b, and 3c.

Furthermore, Example 5 is different from Example 1 in that, when attention is paid to adjacent two subpixels 3a and 3b included in the three subpixels 3a, 3b and 3c, the two subpixels 3a and 3b are separated from each other with a gap 9 interposed therebetween. The same applies to two subpixels 3b and 3c. According to the gap 9, in a case where light of three colors different from each other is emitted by the three subpixels 3a, 3b, and 3c, it is possible to suppress color mixing of the three colors. The dimension of the gap 9 is determined according to the design of the self-luminous display apparatus 100. The plurality of gaps 9 may have the same dimension or dimensions different from each other. The gap 9 may have the same dimension as the dimension of the gap 8, or may have a dimension different from the dimension of the gap 8. The gap 9 desirably has a dimension smaller than the length of the short side of each subpixel of the three subpixels 3a, 3b, and 3c.

The relationship between the first pitch d1 and the second pitch d2, the relationship between the first pitch D1 and the second pitch D2, the relationship between the first pitch in the specific direction X of the three subpixels 3a, 3b, and 3c, the second pitch in the specific direction X of the four subpixel groups 31, 32, 33, and 34, and the third pitch in the specific direction X of the plurality of stacks 7, and the relationship between the first pitch in the specific direction Y of the three subpixels 3a, 3b, and 3c, the second pitch in the specific direction Y of the four subpixel groups 31, 32, 33, and 34, and the third pitch in the specific direction Y of the plurality of stacks 7 in Example 5 are the same as those in Example 1.

Also in Example 5, between the four display pixels 21, 22, 23, and 24 and the four display pixels 21, 22, 23, and 24 adjacent to the four display pixels 21, 22, 23, and 24, the subpixels 3a that emit light of the same color in each direction of the direction X and the direction Y are arranged at a plurality of pitches D1 and D2 different from each other, whereby the effect of the present disclosure is exhibited. The same applies to the subpixels 3b and 3c. That is, the four subpixel groups 31, 32, 33, and 34 can be collectively arranged in the four display pixels 21, 22, 23, and 24, and the time required to manufacture the self-luminous display apparatus 100 can be shortened.

Example 6

Figure 16:
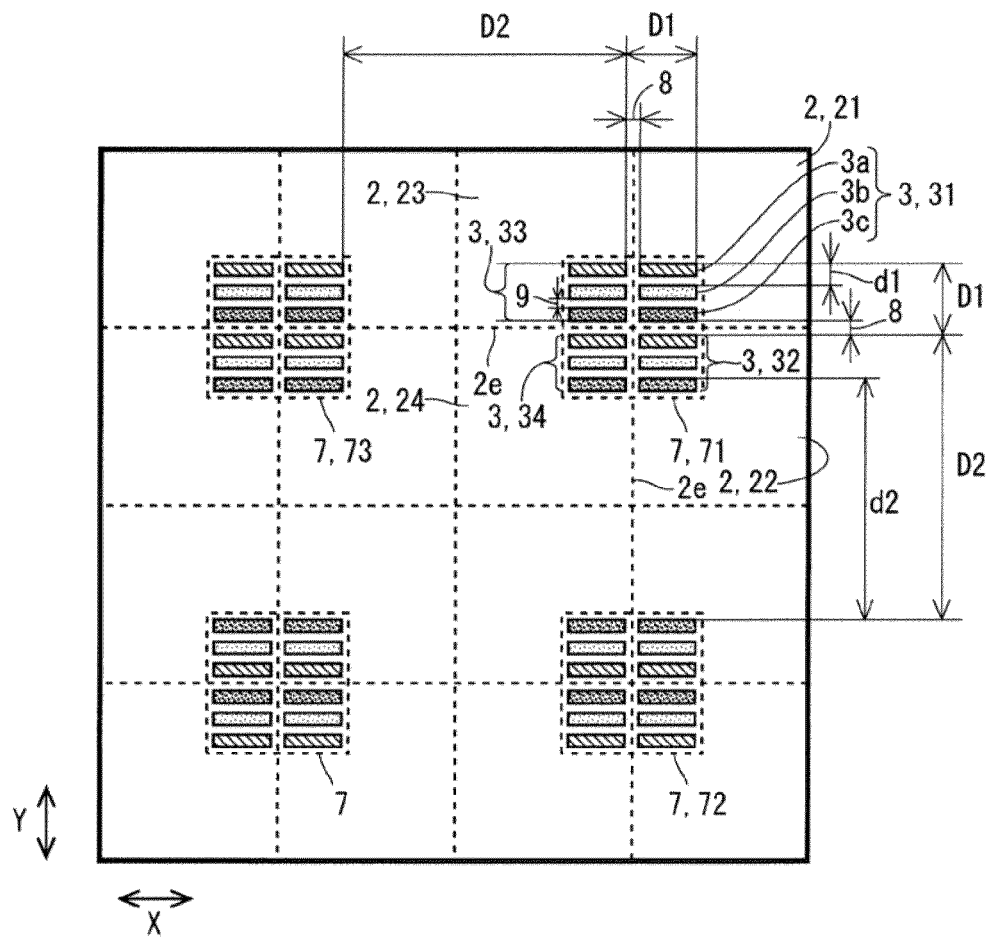
FIG. 16 is a plan view schematically illustrating sixteen display pixels included in a self-luminous display apparatus of Example 6 of the first embodiment.

FIG. 16 is a plan view schematically illustrating sixteen display pixels included in a self-luminous display apparatus of Example 6 of the first embodiment.

The sixteen display pixels illustrated in FIG. 16 are obtained by cutting the self-luminous display apparatus 100 of the first embodiment illustrated in FIGS. 4 and 5 at the positions of the cutting lines E-E and F-F.

As illustrated in FIG. 16, Example 6 is different from Example 5 in that the arrangement direction of the display pixels 2, the subpixel groups 3, the subpixels 3a, 3b, and 3c, and the stacks 7 is rotated clockwise by 90°. Therefore, the description of Example 5 will be the description of Example 6 by replacing the direction X and the direction Y with the direction Y and the direction X, respectively. Therefore, detailed description of Example 6 will be omitted.

Also in Example 6, between the four display pixels 21, 22, 23, and 24 and the four display pixels 21, 22, 23, and 24 adjacent to the four display pixels 21, 22, 23, and 24, the subpixels 3a that emit light of the same color in each direction of the direction X and the direction Y are arranged at a plurality of pitches D1 and D2 different from each other, whereby the effect of the present disclosure is exhibited. The same applies to the subpixels 3b and 3c. That is, the four subpixel groups 31, 32, 33, and 34 can be collectively arranged in the four display pixels 21, 22, 23, and 24, and the time required to manufacture the self-luminous display apparatus 100 can be shortened.

Example 7

Figure 17:
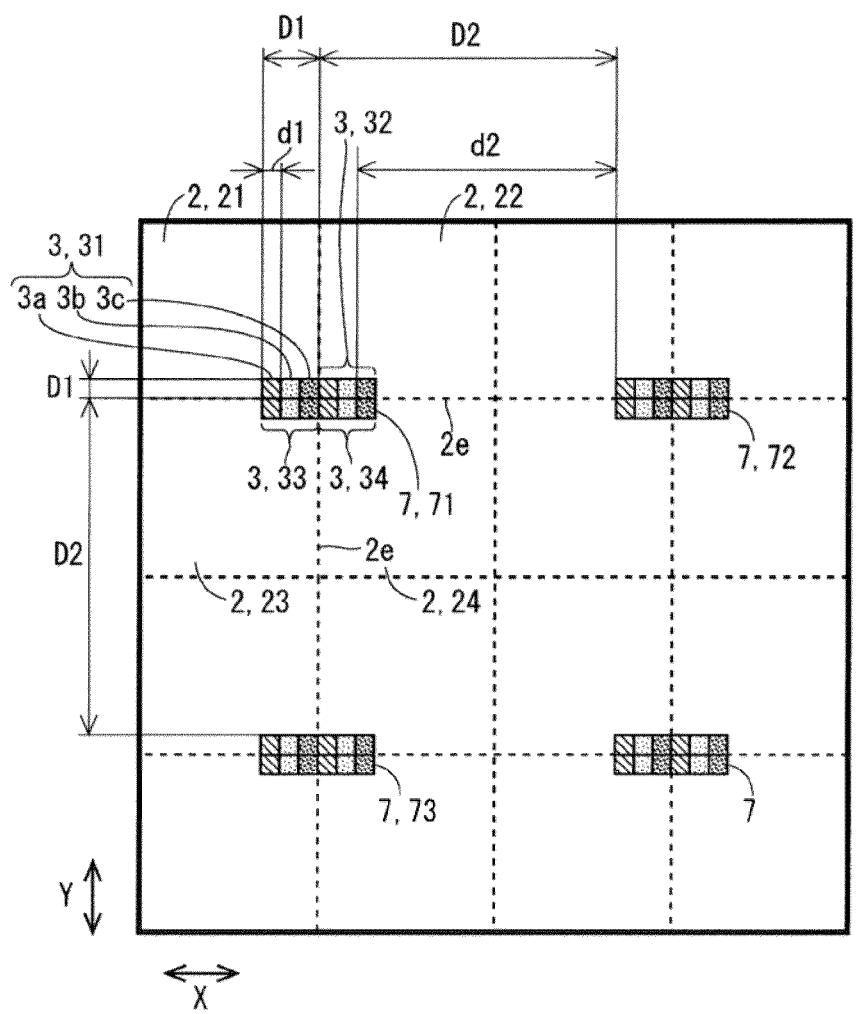
FIG. 17 is a plan view schematically illustrating sixteen display pixels included in a self-luminous display apparatus of Example 7 of the first embodiment.

FIG. 17 is a plan view schematically illustrating sixteen display pixels included in a self-luminous display apparatus of Example 7 of the first embodiment.

The sixteen display pixels illustrated in FIG. 17 are obtained by cutting the self-luminous display apparatus 100 of the first embodiment illustrated in FIGS. 4 and 5 at the positions of the cutting lines E-E and F-F.

As illustrated in FIG. 17, Example 7 is different from Example 1 in that each subpixel of the three subpixels 3a, 3b, and 3c has a square planar shape, and each subpixel group 3 has a rectangular shape. The length of one side of each subpixel in Example 7 is the same as the length of the short side of each subpixel in Example 1. According to the square planar shape of each sub-pixel, the difference between the distance in the direction X and the distance in the direction Y from the end 2e of each display pixel 2 to the three subpixels 3a, 3b, and 3c can be reduced. Therefore, the light emission luminance distribution inside each display pixel 2 can be made uniform. In addition, the number of LED elements that can be arranged on one substrate can be increased three times. Therefore, the number of LED elements that can be produced from one substrate can be increased three times, and the manufacturing cost of the self-luminous display apparatus 100 can be reduced. The dimension of each subpixel is determined according to the design of the self-luminous display apparatus 100. The dimension of each display pixel 2 is not limited, but is desirably determined according to the shape of each subpixel so that the light emission luminance distribution inside each display pixel 2 is uniform.

The relationship between the first pitch $d1$ and the second pitch $d2$, the relationship between the first pitch D1 and the second pitch D2, the relationship between the first pitch in the specific direction X of the three subpixels 3a, 3b, and 3c, the second pitch in the specific direction X of the four subpixel groups 31, 32, 33, and 34, and the third pitch in the specific direction X of the plurality of stacks 7, and the relationship between the first pitch in the specific direction Y of the three subpixels 3a, 3b, and 3c, the second pitch in the specific direction Y of the four subpixel groups 31, 32, 33, and 34, and the third pitch in the specific direction Y of the plurality of stacks 7 in Example 7 are the same as those in Example 1.

Also in Example 7, between the four display pixels 21, 22, 23, and 24 and the four display pixels 21, 22, 23, and 24 adjacent to the four display pixels 21, 22, 23, and 24, the subpixels 3a that emit light of the same color in each direction of the direction X and the direction Y are arranged at a plurality of pitches D1 and D2 different from each other, whereby the effect of the present disclosure is exhibited. The same applies to the subpixels 3b and 3c. That is, the four subpixel groups 31, 32, 33, and 34 can be collectively arranged in the four display pixels 21, 22, 23, and 24, and the time required to manufacture the self-luminous display apparatus 100 can be shortened.

Example 8

Figure 18:
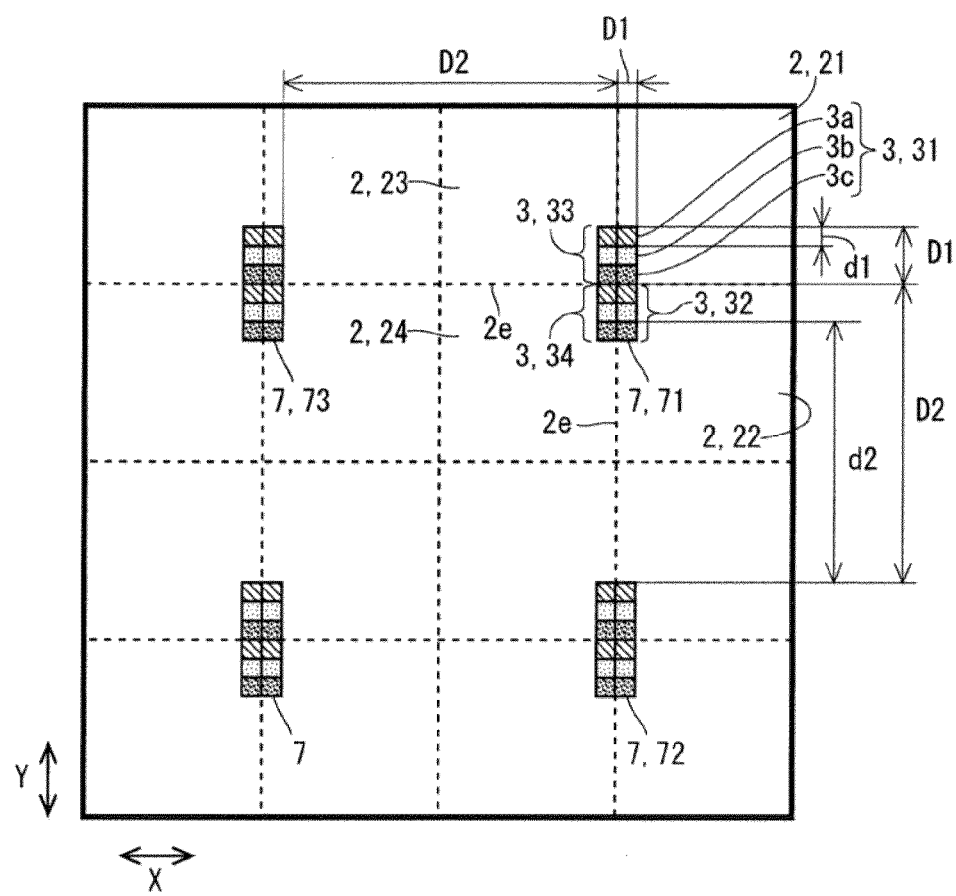
FIG. 18 is a plan view schematically illustrating sixteen display pixels included in a self-luminous display apparatus of Example 8 of the first embodiment.

FIG. 18 is a plan view schematically illustrating sixteen display pixels included in a self-luminous display apparatus of Example 8 of the first embodiment.

The sixteen display pixels illustrated in FIG. 18 are obtained by cutting the self-luminous display apparatus 100 of the first embodiment illustrated in FIGS. 4 and 5 at the positions of the cutting lines E-E and F-F.

As illustrated in FIG. 18, Example 8 is different from Example 7 in that the arrangement direction of the display pixels 2, the subpixel groups 3, the subpixels 3a, 3b, and 3c, and the stacks 7 is rotated clockwise by 90°. Therefore, the description of Example 7 will be the description of Example 8 by replacing the direction X and the direction Y with the direction Y and the direction X, respectively. Therefore, detailed description of Example 8 will be omitted.

Also in Example 8, between the four display pixels 21, 22, 23, and 24 and the four display pixels 21, 22, 23, and 24 adjacent to the four display pixels 21, 22, 23, and 24, the subpixels 3a that emit light of the same color in each direction of the direction X and the direction Y are arranged at a plurality of pitches D1 and D2 different from each other, whereby the effect of the present disclosure is exhibited. The same applies to the subpixels 3b and 3c. That is, the four subpixel groups 31, 32, 33, and 34 can be collectively arranged in the four display pixels 21, 22, 23, and 24, and the time required to manufacture the self-luminous display apparatus 100 can be shortened.

Example 9

Figure 19:
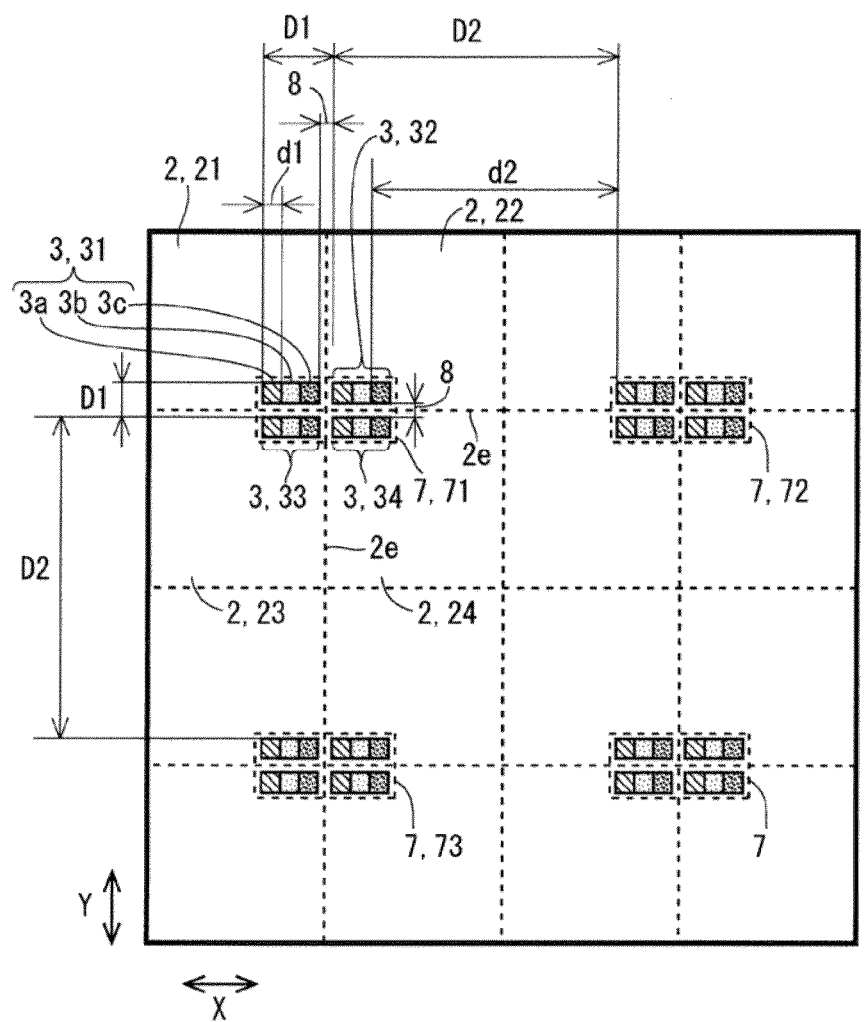
FIG. 19 is a plan view schematically illustrating sixteen display pixels included in a self-luminous display apparatus of Example 9 of the first embodiment.

FIG. 19 is a plan view schematically illustrating sixteen display pixels included in a self-luminous display apparatus of Example 9 of the first embodiment.

The sixteen display pixels illustrated in FIG. 19 are obtained by cutting the self-luminous display apparatus 100 of the first embodiment illustrated in FIGS. 4 and 5 at the positions of the cutting lines E-E and F-F.

As illustrated in FIG. 19, Example 9 is different from Example 1 in that adjacent two subpixel groups 31 and 32 included in the four subpixel groups 31, 32, 33, and 34 are separated from each other with the gap 8 interposed therebetween. The gap 8 is at the ends 2e of the display pixels 21 and 22. The same applies to two subpixel groups 33 and 34, two subpixel groups 31 and 33, and two subpixel groups 32 and 34. According to the gap 8, in a case where light of three colors different from each other is emitted by the three subpixels 3a, 3b, and 3c, it is possible to suppress color mixing of the three colors.

Furthermore, Example 9 is different from Example 1 in that each subpixel of the three subpixels 3a, 3b, and 3c has a square planar shape, and each subpixel group 3 has a rectangular shape. The length of one side of each subpixel in Example 9 is the same as the length of the short side of each subpixel in Example 1. According to the square planar shape of each subpixel, the distance from the end 2e of each display pixel 2 to the three subpixels 3a, 3b, and 3c can be shortened. Therefore, the light emission luminance distribution inside each display pixel 2 can be made uniform. In addition, the number of LED elements that can be arranged on one substrate can be increased three times. Therefore, the number of LED elements that can be produced from one substrate can be increased three times, and the manufacturing cost of the self-luminous display apparatus 100 can be reduced.

The relationship between the first pitch $d1$ and the second pitch $d2$, the relationship between the first pitch D1 and the second pitch D2, the relationship between the first pitch in the specific direction X of the three subpixels 3a, 3b, and 3c, the second pitch in the specific direction X of the four subpixel groups 31, 32, 33, and 34, and the third pitch in the specific direction X of the plurality of stacks 7, and the relationship between the first pitch in the specific direction Y of the three subpixels 3a, 3b, and 3c, the second pitch in the specific direction Y of the four subpixel groups 31, 32, 33, and 34, and the third pitch in the specific direction Y of the plurality of stacks 7 in Example 9 are the same as those in Example 1.

Also in Example 9, between the four display pixels 21, 22, 23, and 24 and the four display pixels 21, 22, 23, and 24 adjacent to the four display pixels 21, 22, 23, and 24, the subpixels 3a that emit light of the same color in each direction of the direction X and the direction Y are arranged at a plurality of pitches D1 and D2 different from each other, whereby the effect of the present disclosure is exhibited. The same applies to the subpixels 3b and 3c. That is, the four subpixel groups 31, 32, 33, and 34 can be collectively arranged in the four display pixels 21, 22, 23, and 24, and the time required to manufacture the self-luminous display apparatus 100 can be shortened.

Example 10

Figure 20:
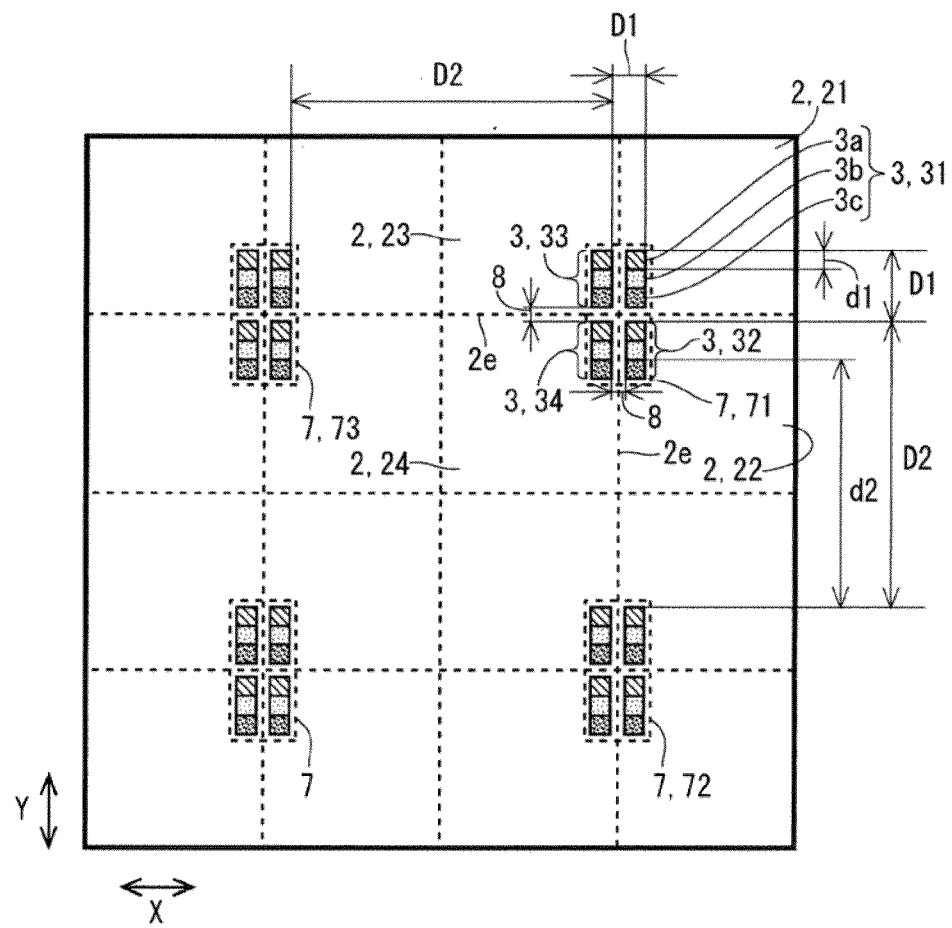
FIG. 20 is a plan view schematically illustrating sixteen display pixels included in a self-luminous display apparatus of Example 10 of the first embodiment.

FIG. 20 is a plan view schematically illustrating sixteen display pixels included in a self-luminous display apparatus of Example 10 of the first embodiment.

The sixteen display pixels illustrated in FIG. 20 are obtained by cutting the self-luminous display apparatus 100 of the first embodiment illustrated in FIGS. 4 and 5 at the positions of the cutting lines E-E and F-F.

As illustrated in FIG. 20, Example 10 is different from Example 9 in that the arrangement direction of the display pixels 2, the subpixel groups 3, the subpixels 3*a*, 3*b*, and 3*c*, and the stacks 7 is rotated clockwise by 90°. Therefore, the description of Example 9 will be the description of Example 10 by replacing the direction X and the direction Y with the direction Y and the direction X, respectively. Therefore, detailed description of Example 10 will be omitted.

Also in Example 10, between the four display pixels 21, 22, 23, and 24 and the four display pixels 21, 22, 23, and 24 adjacent to the four display pixels 21, 22, 23, and 24, the subpixels 3*a* that emit light of the same color in each direction of the direction X and the direction Y are arranged at a plurality of pitches D1 and D2 different from each other, whereby the effect of the present disclosure is exhibited. The same applies to the subpixels 3*b* and 3*c*. That is, the four subpixel groups 31, 32, 33, and 34 can be collectively arranged in the four display pixels 21, 22, 23, and 24, and the time required to manufacture the self-luminous display apparatus 100 can be shortened.

Example 11

Figure 21:
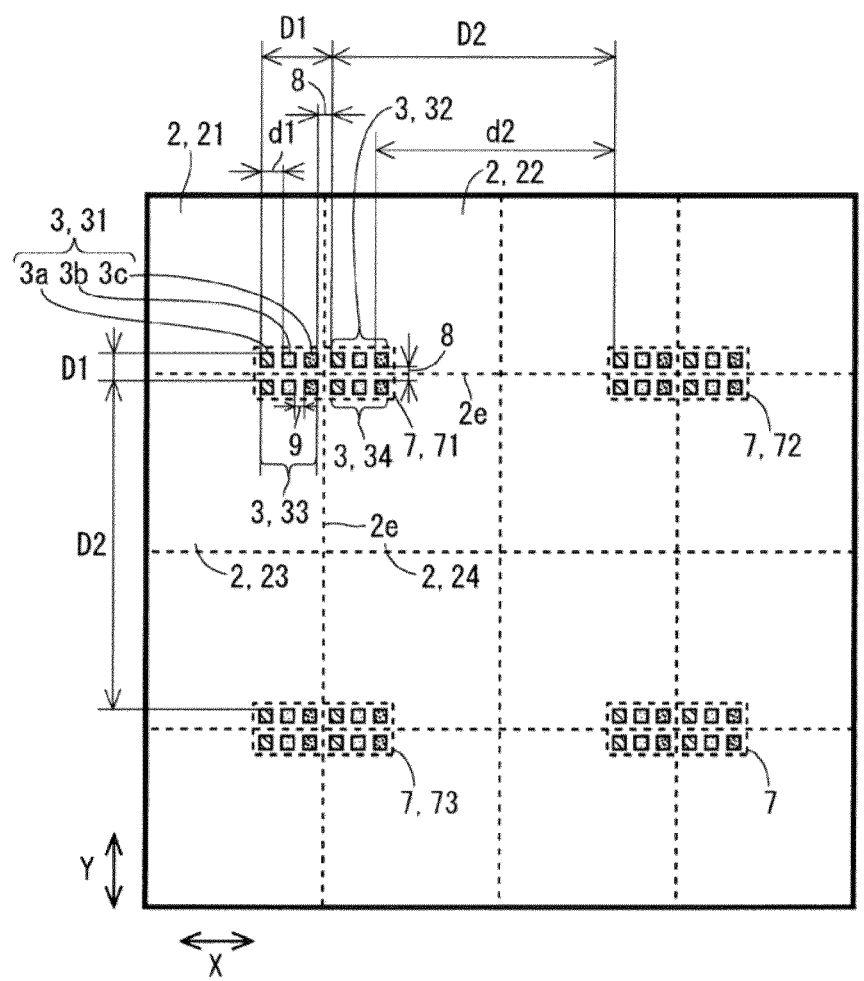
FIG. 21 is a plan view schematically illustrating sixteen display pixels included in a self-luminous display apparatus of Example 11 of the first embodiment.

FIG. 21 is a plan view schematically illustrating sixteen display pixels included in a self-luminous display apparatus of Example 11 of the first embodiment.

The sixteen display pixels illustrated in FIG. 21 are obtained by cutting the self-luminous display apparatus 100 of the first embodiment illustrated in FIGS. 4 and 5 at the positions of the cutting lines E-E and F-F.

As illustrated in FIG. 21, Example 11 is different from Example 1 in that adjacent two subpixel groups 31 and 32 included in the four subpixel groups 31, 32, 33, and 34 are separated from each other with the gap 8 interposed therebetween. The gap 8 is at the ends 2*e* of the display pixels 21 and 22. The same applies to two subpixel groups 33 and 34, two subpixel groups 31 and 33, and two subpixel groups 32 and 34. According to the gap 8, in a case where light of three colors different from each other is emitted by the three subpixels 3*a*, 3*b*, and 3*c*, it is possible to suppress color mixing of the three colors.

Furthermore, Example 11 is different from Example 1 in that, when attention is paid to adjacent two subpixels 3*a* and 3*b* included in the three subpixels 3*a*, 3*b* and 3*c*, the two subpixels 3*a* and 3*b* are separated from each other with a gap 9 interposed therebetween. The same applies to two subpixels 3*b* and 3*c*. According to the gap 9, in a case where light of three colors different from each other is emitted by the three subpixels 3*a*, 3*b*, and 3*c*, it is possible to suppress color mixing of the three colors.

Furthermore, Example 11 is different from Example 1 in that each subpixel of the three subpixels 3*a*, 3*b*, and 3*c* has a square planar shape, and each subpixel group 3 has a rectangular shape. The length of one side of each subpixel in Example 11 is the same as the length of the short side of each subpixel in Example 1. According to the square planar shape of each sub-pixel, the difference between the distance in the direction X and the distance in the direction Y from the end 2*e* of each display pixel 2 to the three subpixels 3*a*, 3*b*, and 3*c* can be reduced. Therefore, the light emission luminance distribution inside each display pixel 2 can be made uniform. In addition, the number of LED elements that can be arranged on one substrate can be increased three times. Therefore, the number of LED elements that can be produced from one substrate can be increased three times, and the manufacturing cost of the self-luminous display apparatus 100 can be reduced.

The relationship between the first pitch $d1$ and the second pitch $d2$, the relationship between the first pitch D1 and the second pitch D2, the relationship between the first pitch in the specific direction X of the three subpixels 3*a*, 3*b*, and 3*c*, the second pitch in the specific direction X of the four subpixel groups 31, 32, 33, and 34, and the third pitch in the specific direction X of the plurality of stacks 7, and the relationship between the first pitch in the specific direction Y of the three subpixels 3*a*, 3*b*, and 3*c*, the second pitch in the specific direction Y of the four subpixel groups 31, 32, 33, and 34, and the third pitch in the specific direction Y of the plurality of stacks 7 in Example 11 are the same as those in Example 1.

Also in Example 11, between the four display pixels 21, 22, 23, and 24 and the four display pixels 21, 22, 23, and 24 adjacent to the four display pixels 21, 22, 23, and 24, the subpixels 3*a* that emit light of the same color in each direction of the direction X and the direction Y are arranged at a plurality of pitches D1 and D2 different from each other, whereby the effect of the present disclosure is exhibited. The same applies to the subpixels 3*b* and 3*c*. That is, the four subpixel groups 31, 32, 33, and 34 can be collectively arranged in the four display pixels 21, 22, 23, and 24, and the time required to manufacture the self-luminous display apparatus 100 can be shortened.

Example 12

Figure 22:
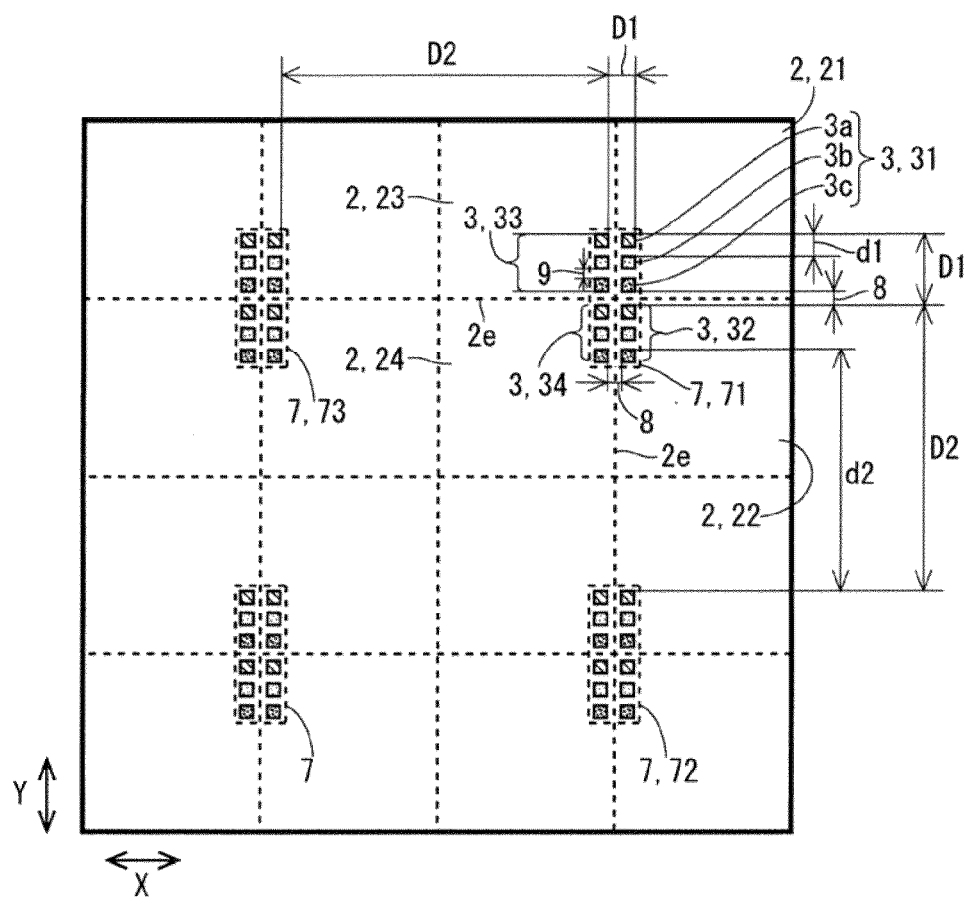
FIG. 22 is a plan view schematically illustrating sixteen display pixels included in a self-luminous display apparatus of Example 12 of the first embodiment.
Figure 23:
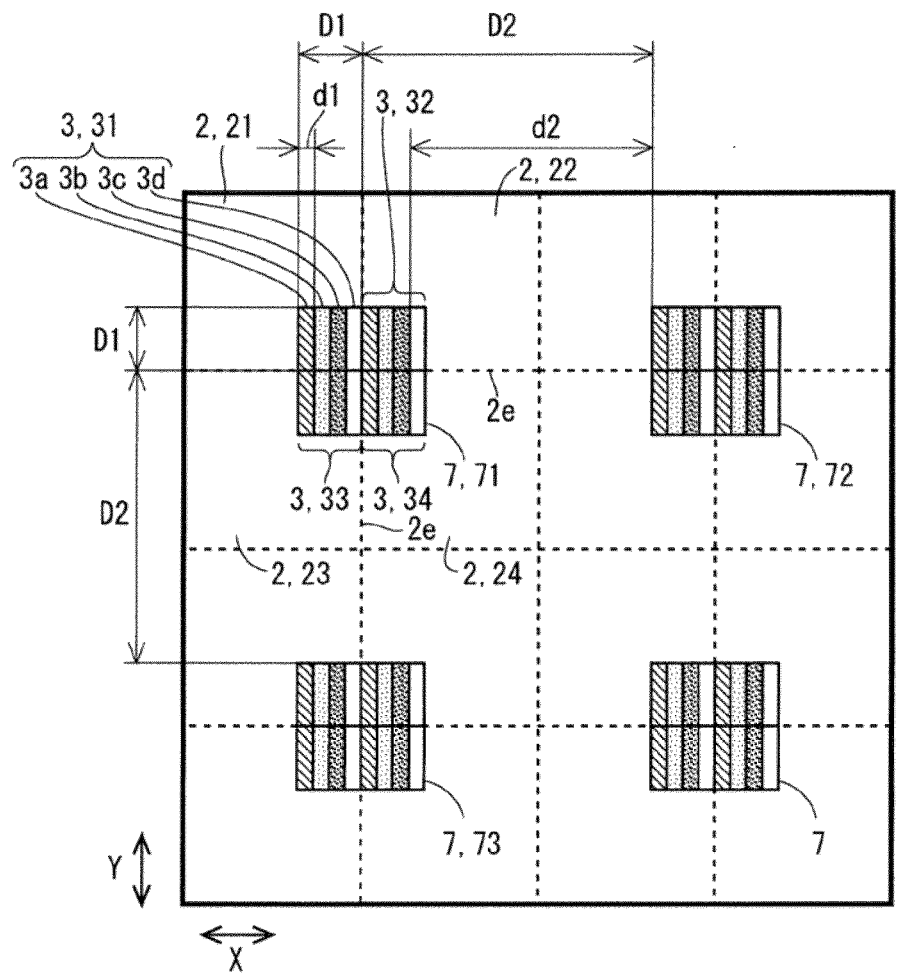
FIG. 23 is a plan view schematically illustrating sixteen display pixels included in a self-luminous display apparatus of Example 13 of the first embodiment
Figure 24:
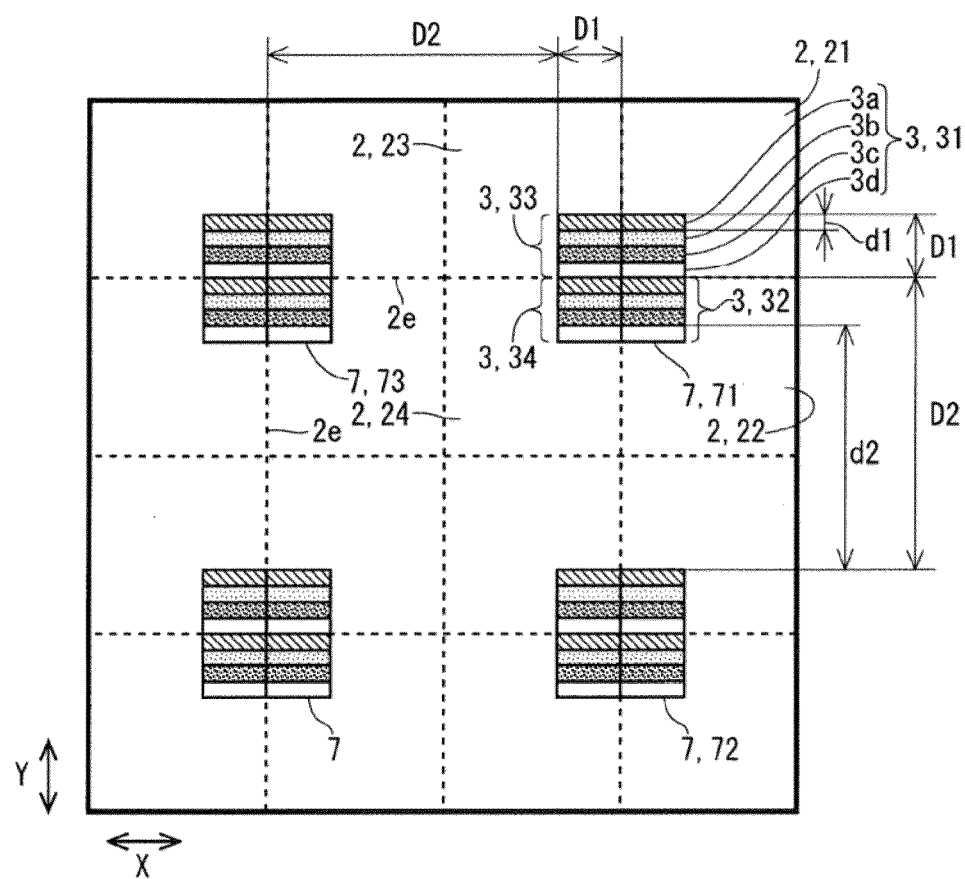
FIG. 24 is a plan view schematically illustrating sixteen display pixels included in a self-luminous display apparatus of Example 14 of the first embodiment.
Figure 25:
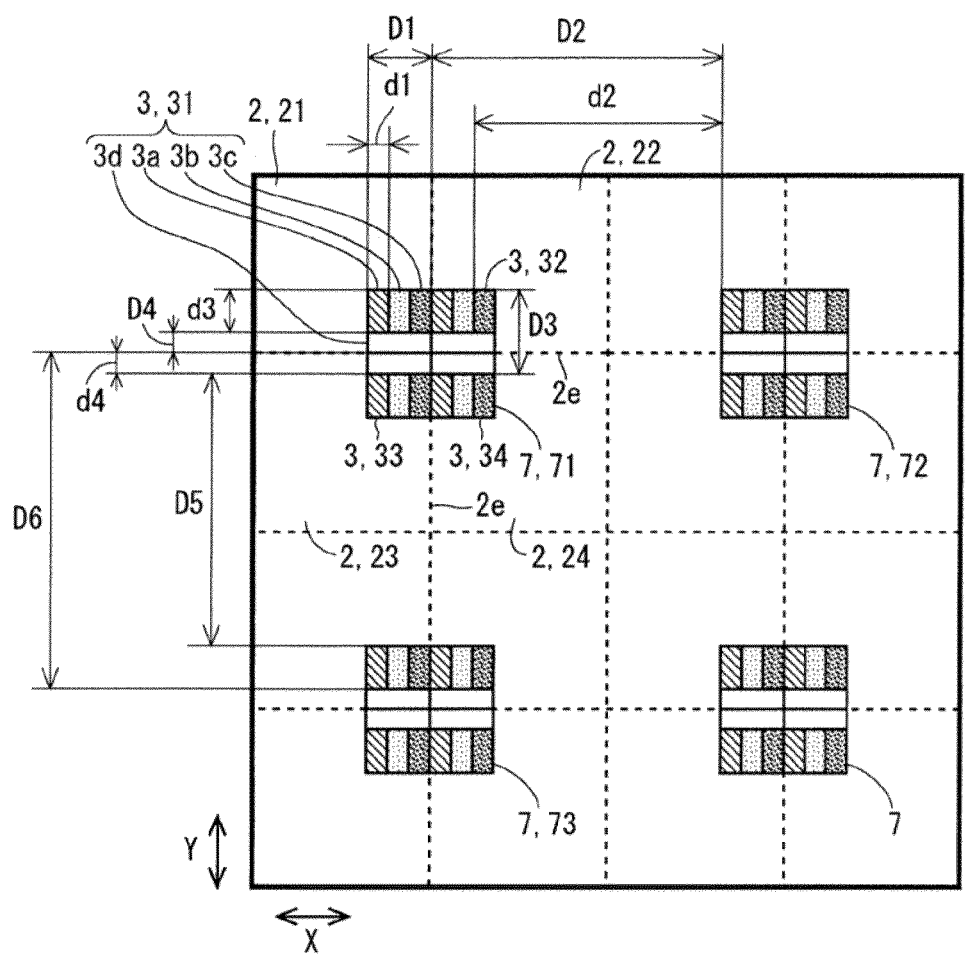
FIG. 25 is a plan view schematically illustrating sixteen display pixels included in a self-luminous display apparatus of Example 15 of the first embodiment.
Figure 26:
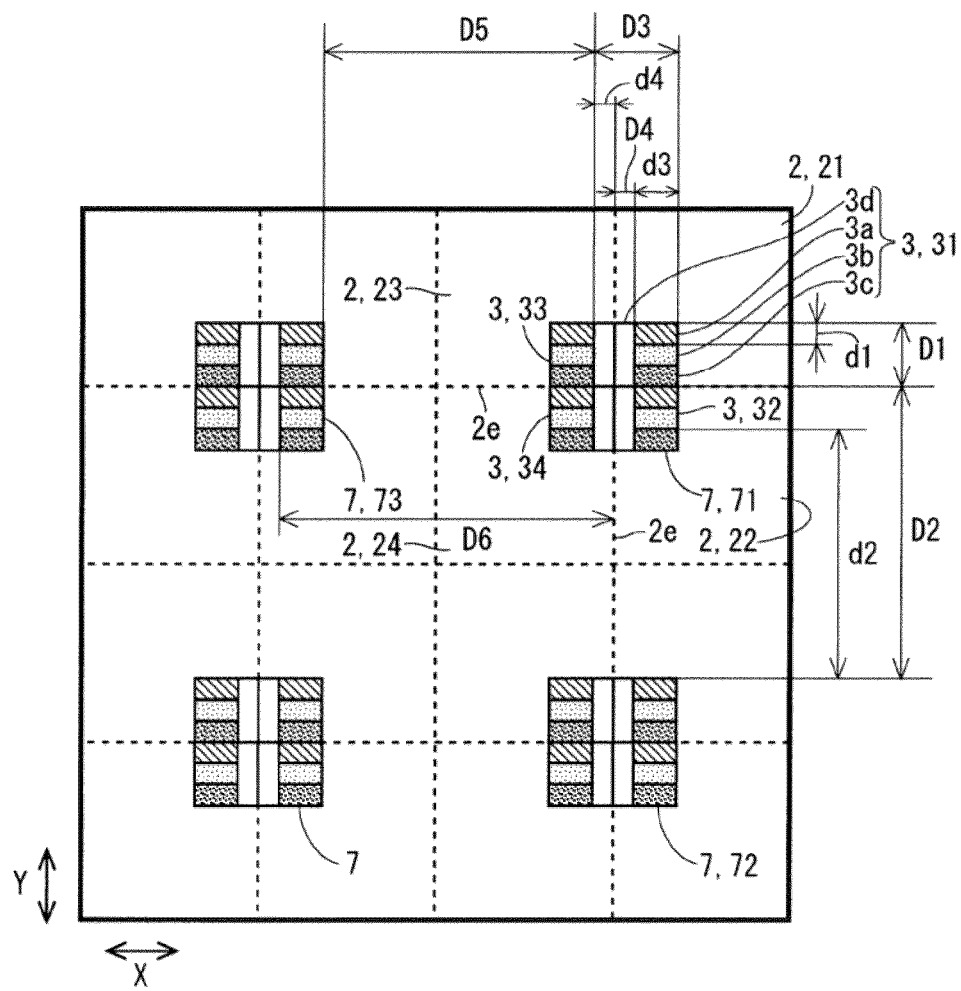
FIG. 26 is a plan view schematically illustrating sixteen display pixels included in a self-luminous display apparatus of Example 16 of the first embodiment.
Figure 27:
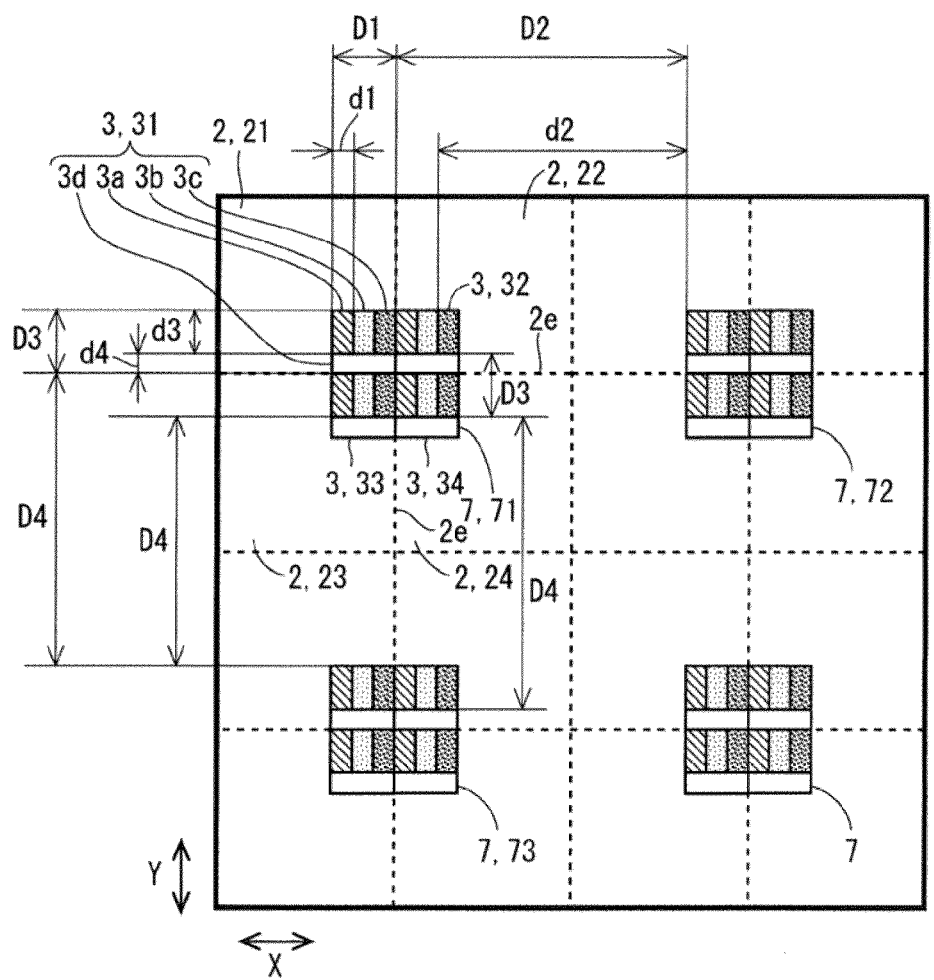
FIG. 27 is a plan view schematically illustrating sixteen display pixels included in a self-luminous display apparatus of Example 17 of the first embodiment.
Figure 28:
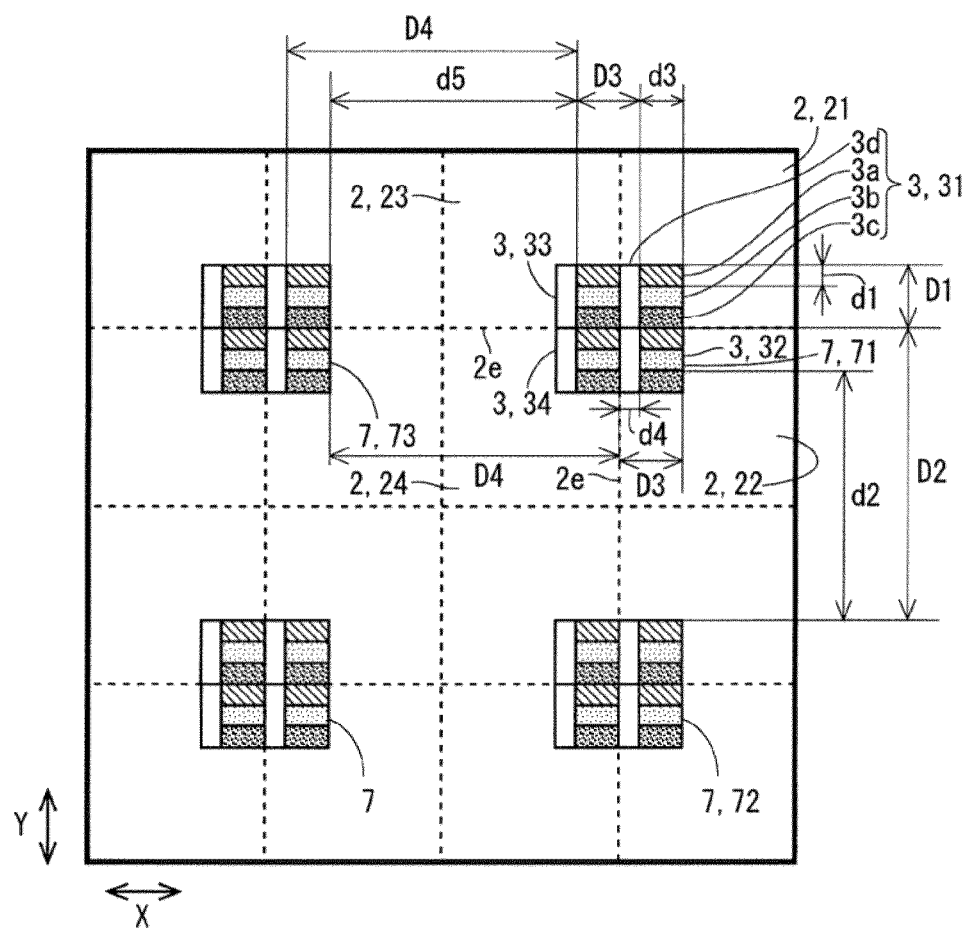
FIG. 28 is a plan view schematically illustrating sixteen display pixels included in a self-luminous display apparatus of Example 18 of the first embodiment.
Figure 29:
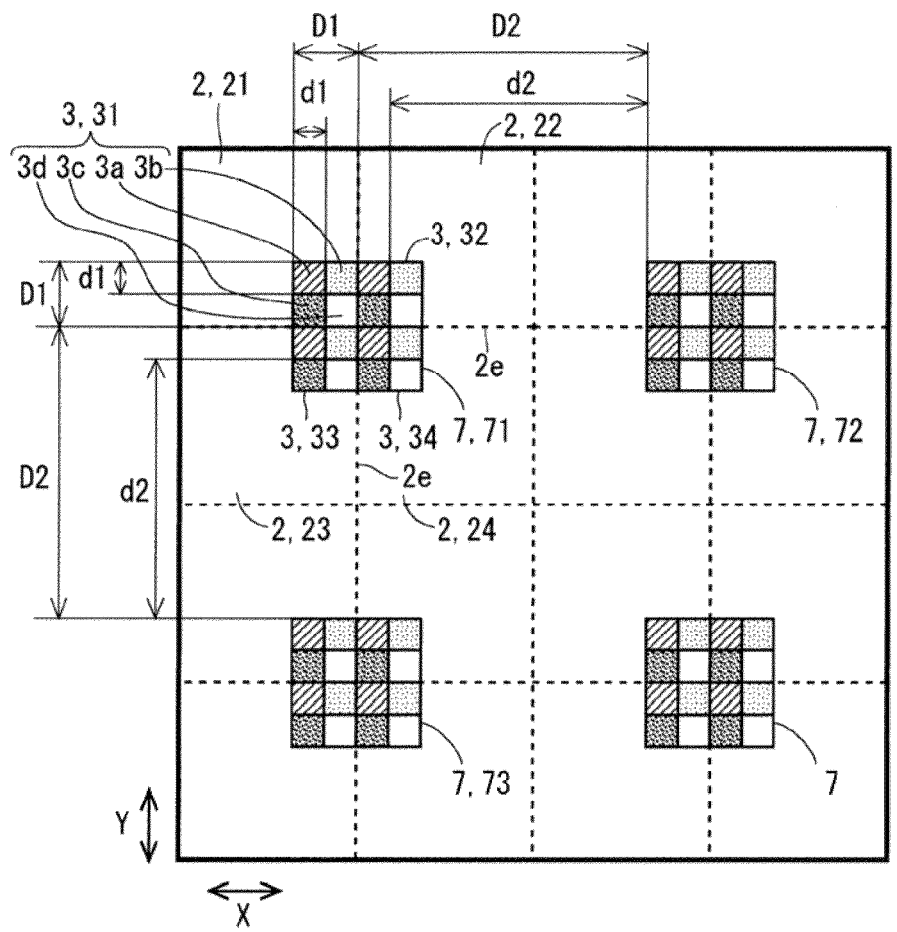
FIG. 29 is a plan view schematically illustrating sixteen display pixels included in a self-luminous display apparatus of Example 19 of the first embodiment.
Figure 30:
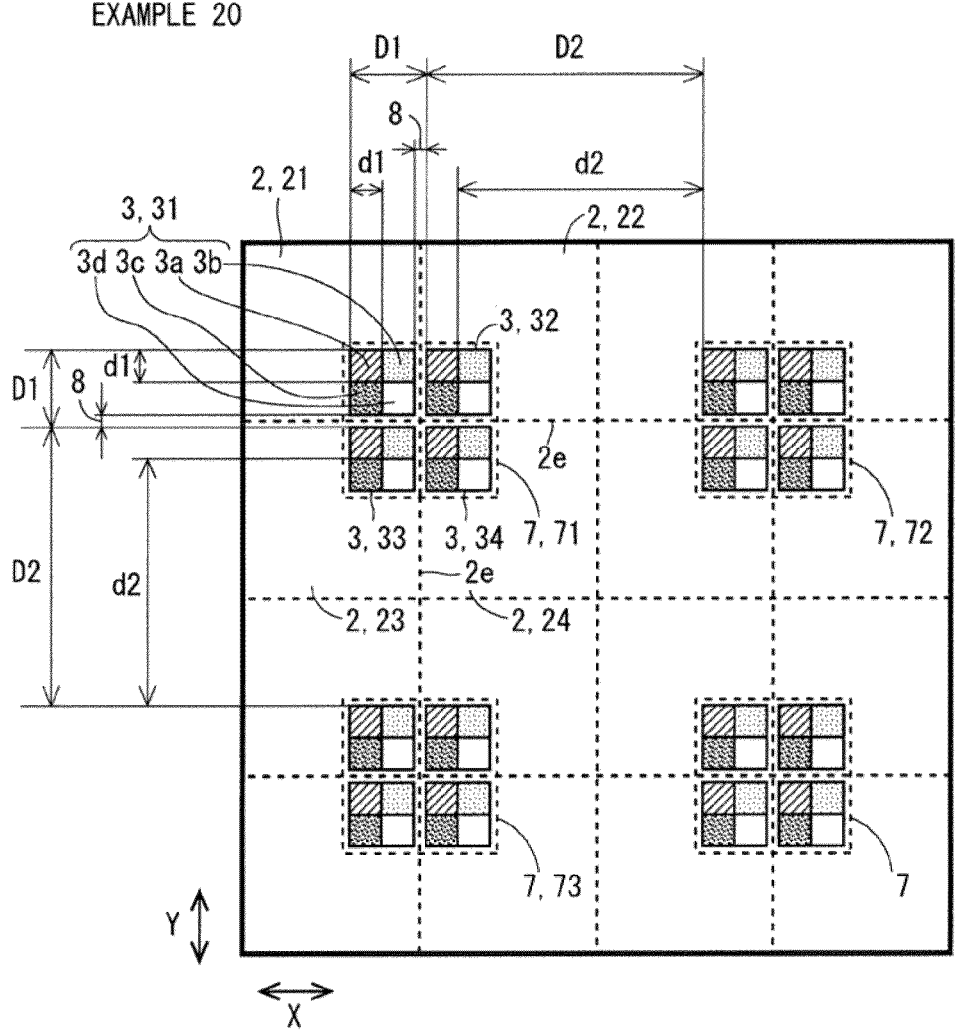
FIG. 30 is a plan view schematically illustrating sixteen display pixels included in a self-luminous display apparatus of Example 20 of the first embodiment.
Figure 31:
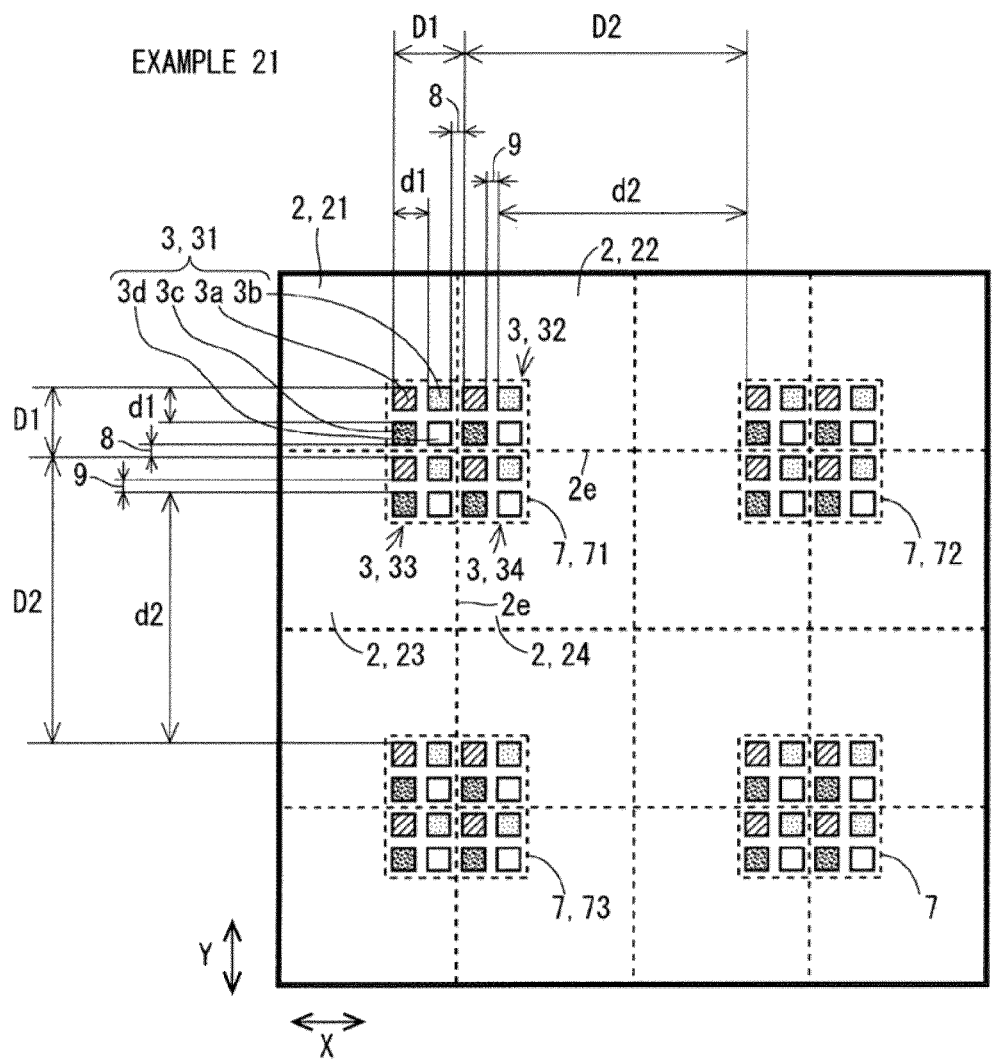
FIG. 31 is a plan view schematically illustrating sixteen display pixels included in a self-luminous display apparatus of Example 21 of the first embodiment.

FIG. 22 is a plan view schematically illustrating sixteen display pixels included in a self-luminous display apparatus of Example 12 of the first embodiment.

The sixteen display pixels illustrated in FIG. 22 are obtained by cutting the self-luminous display apparatus 100 of the first embodiment illustrated in FIGS. 4 and 5 at the positions of the cutting lines E-E and F-F.

As illustrated in FIG. 22, Example 12 is different from Example 11 in that the arrangement direction of the display pixels 2, the subpixel groups 3, the subpixels 3*a*, 3*b*, and 3*c*, and the stacks 7 is rotated clockwise by 90 °. Therefore, the description of Example 11 will be the description of Example 12 by replacing the direction X and the direction Y with the direction Y and the direction X, respectively. Therefore, detailed description of Example 12 will be omitted.

Also in Example 12, between the four display pixels 21, 22, 23, and 24 and the four display pixels 21, 22, 23, and 24 adjacent to the four display pixels 21, 22, 23, and 24, the subpixels 3*a* that emit light of the same color in each direction of the direction X and the direction Y are arranged at a plurality of pitches D1 and D2 different from each other, whereby the effect of the present disclosure is exhibited.

The same applies to the subpixels 3b and 3c. That is, the four subpixel groups 31, 32, 33, and 34 can be collectively arranged in the four display pixels 21, 22, 23, and 24, and the time required to manufacture the self-luminous display apparatus 100 can be shortened.

Examples 13 to 21

FIGS. 23 to 31 are plan views schematically illustrating sixteen display pixels included in self-luminous display apparatus of Examples 13 to 21 of the first embodiment, respectively.

The sixteen display pixels illustrated in each of FIGS. 23 to 31 are obtained by cutting the self-luminous display apparatus 100 of the first embodiment illustrated in FIGS. 4 and 5 at the positions of the cutting lines E-E and F-F.

As illustrated in FIGS. 23 to 31, Examples 13 to 21 are different from Example 1 in that each subpixel group 3 includes four subpixels 3a, 3b, 3c, and 3d. The color of light emitted by the subpixel 3d is not limited. The color of light emitted by the subpixel 3d may be the same as the color of light emitted by the subpixel 3a, 3b, or 3c, or may be different from the color of light emitted by the subpixels 3a, 3b, and 3c. The color of light emitted by the subpixel 3d is, for example, white.

The relationship between the first pitch d1 and the second pitch d2, the relationship between the first pitch D1 and the second pitch D2, the relationship between the first pitch in the specific direction X of the three subpixels 3a, 3b, and 3c, the second pitch in the specific direction X of the four subpixel groups 31, 32, 33, and 34, and the third pitch in the specific direction X of the plurality of stacks 7, and the relationship between the first pitch in the specific direction Y of the three subpixels 3a, 3b, and 3c, the second pitch in the specific direction Y of the four subpixel groups 31. 32. 33, and 34, and the third pitch in the specific direction Y of the plurality of stacks 7 in Examples 13 to 21 are substantially the same as those in Example 1. However, for the direction Y in Example 15 and the direction X in Example 16, a first pitch D3 and a second pitch D5 must be used instead of the first pitch D1 and the second pitch D2 for the subpixels 3a, 3b, and 3c, and a first pitch D4 and a second pitch D6 must be used instead of the first pitch D1 and the second pitch D2 for the subpixel 3d. In addition, for the direction Y in Example 17 and the direction X in Example 18, the first pitch D3 and a second pitch D4 must be used instead of the first pitch D1 and the second pitch D2.

Also in Examples 13 to 21, between the four display pixels 21, 22, 23, and 24 and the four display pixels 21, 22, 23, and 24 adjacent to the four display pixels 21, 22, 23, and 24, the subpixels 3a that emit light of the same color in each direction of the direction X and the direction Y are arranged at a plurality of pitches D1 and D2 different from each other, whereby the effect of the present disclosure is exhibited. The same applies to the subpixels 3b, 3c, and 3d. That is, the four subpixel groups 31, 32, 33, and 34 can be collectively arranged in the four display pixels 21, 22, 23, and 24, and the time required to manufacture the self-luminous display apparatus 100 can be shortened.

Comparison Between Reference Example and First Embodiment

Figure 32:
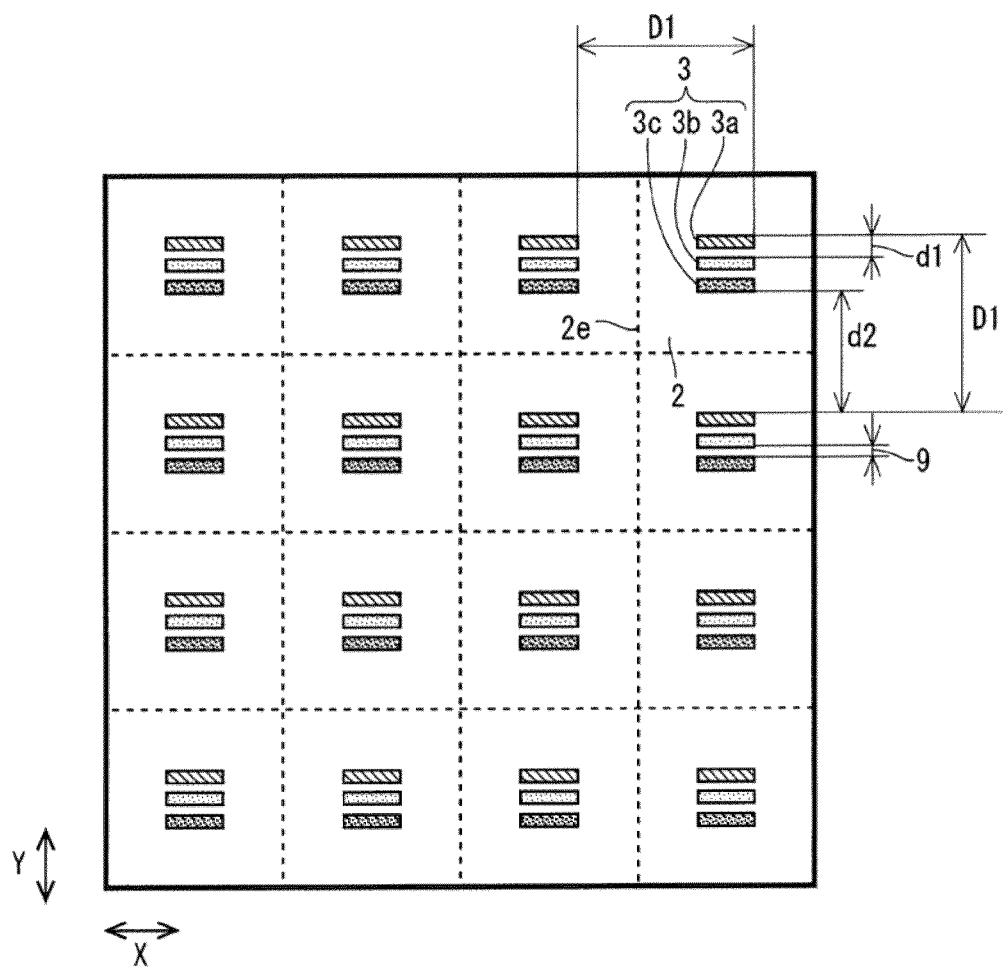
FIG. 32 is a plan view schematically illustrating 16 display pixels included in the self-luminous display apparatus of the reference example.

FIG. 32 is a plan view schematically illustrating sixteen display pixels included in the self-luminous display apparatus of the reference example.

Sixteen display pixels illustrated in FIG. 32 are obtained by cutting the self-luminous display apparatus of the reference example illustrated in FIG. 1 at the positions of the cutting lines A-A and B-B.

The arrangement of the subpixel group 3 in the reference example is different from the arrangement of the subpixel group 3 in Examples 1 to 21.

For example, in the reference example, the subpixel group 3 is arranged in the central portion of the display pixel 2 regardless of the arrangement, dimensions, and the like of the three subpixels 3a, 3b, and 3c, and is not contact with the end 2e of the display pixel 2. In addition, the three subpixels 3a, 3b, and 3c are structurally divided.

On the other hand, in Examples 1 to 21, the subpixel group 3 is in contact with the end 2e of the display pixel 2 regardless of the arrangement, dimensions, and the like of the three subpixels 3a, 3b, and 3c or the four subpixels 3a, 3b, 3c, and 3d. Furthermore, the four subpixel groups 31, 32, 33, and 34 are not structurally divided. The four subpixel groups 31, 32, 33, and 34 are integrated to constitute the stack 7 that straddles the ends 2e of the display pixels 2. Further, the three subpixels 3a, 3b, and 3c or the four subpixels 3a, 3b, 3c, and 3d are not structurally divided. The center of the stack 7 is aligned with the position where the four display pixels 21, 22, 23, and 24 are in contact with each other.

When the self-luminous display apparatus 900 of the reference example is manufactured, twelve picks and places are required in order to arrange twelve subpixels arranged in the four display pixels 2 on the backplane 5. Therefore, the time required to manufacture the self-luminous display apparatus 900 of the reference example becomes long. In addition, the cost required to manufacture the self-luminous display apparatus 900 of the reference example increases.

On the other hand, when the self-luminous display apparatus 100 of Examples 1 to 21 is manufactured, only one pick and place is required in order to arrange twelve or sixteen subpixels arranged in the four display pixels 21, 22, 23, and 24 on the backplane 5. Therefore, the time required to manufacture the self-luminous display apparatus 100 of Examples 1 to 21 is shortened to about 1/12 when each subpixel group 3 includes the three subpixels 3a, 3b, and 3c, and shortened to about 1/16 when each subpixel group 3 includes the four subpixels 3a, 3b, 3c, and 3d. In addition, the cost required to manufacture the self-luminous display apparatus 900 of Examples 1 to 21 also decreases.

Table 1 shows the number of pitches of subpixels that emit light of different colors in the direction X, the number of pitches of subpixels that emit light of the same color in the direction X, the number of pitches of subpixels that emit light of different colors in the direction Y, and the number of pitches of subpixels that emit light of the same color in the direction Y in the self-luminous display apparatus 100 of Examples 1 to 21.

TABLE 1

|  | Example | Direction Y | | Direction X | |
|---|---|---|---|---|---|
|  |  | Pitches of Subpixels that Emit Light of Different Colors | Pitches of Subpixels that Emit Light of Same Color | Pitches of Subpixels that Emit Light of Different Colors | Pitches of Subpixels that Emit Light of Same Color |
| Self-luminous Display Device of First Embodiment | 1 | Not Applied | 2 | 2 | 2 |
|  | 2 | 2 | 2 | Not Applied | 2 |
|  | 3 | Not Applied | 2 | 2 | 2 |
|  | 4 | 2 | 2 | Not Applied | 2 |
|  | 5 | Not Applied | 2 | 2 | 2 |
|  | 6 | 2 | 2 | Not Applied | 2 |
|  | 7 | NotApplied | 2 | 2 | 2 |
|  | 8 | 2 | 2 | Not Applied | 2 |
|  | 9 | Not Applied | 2 | 2 | 2 |
|  | 10 | 2 | 2 | Not Applied | 2 |
|  | 11 | Not Applied | 2 | 2 | 2 |
|  | 12 | 2 | 2 | Not Applied | 2 |
|  | 13 | Not Applied | 2 | 2 | 2 |
|  | 14 | 2 | 2 | Not Applied | 2 |
|  | 15 | 2 | 4 | 2 | 2 |
|  | 16 | 2 | 2 | 2 | 4 |
|  | 17 | 3 | 2 | 2 | 2 |
|  | 18 | 2 | 2 | 3 | 2 |
|  | 19 | 2 | 2 | 2 | 2 |
|  | 20 | 2 | 2 | 2 | 2 |
|  | 21 | 2 | 2 | 2 | 2 |

Table 2 shows the number of pitches of subpixels that emit light of different colors in the direction X, the number of pitches of subpixels that emit light of the same color in the direction X, the number of pitches of subpixels that emit light of different colors in the direction Y, and the number of pitches of subpixels that emit light of the same color in the direction Y in the self-luminous display apparatus 900 of the reference example.

TABLE 2

|  | Direction Y | | Direction X | |
|---|---|---|---|---|
|  | Pitches of Subpixels that Emit Light of Different Colors | Pitches of Subpixels that Emit Light of Same Color | Pitches of Subpixels that Emit Light of Different Colors | Pitches of Subpixels that Emit Light of Same Color |
| Self-luminous Display Device of Reference | 2 | 1 | Not Applied | 1 |

The number of pitches of subpixels that emit light of different colors in the direction X, the number of pitches of subpixels that emit light of the same color in the direction X, the number of pitches of subpixels that emit light of different colors in the direction Y, and the number of pitches of subpixels that emit light of the same color in the direction Y in the self-luminous display apparatus 100 of Examples 1 to 21 are different from those in the self-luminous display apparatus 900 of the reference example.

In the self-luminous display apparatus 900 of the reference example, there is only one type of pitch of subpixels that emit light of the same color in the direction X. Furthermore, there is only one type of pitch of subpixels that emit light of the same color in the direction Y.

On the other hand, in the self-luminous display apparatus 100 of Examples 1 to 21, there are two types of pitches of subpixels that emit light of the same color in the direction X. Furthermore, there are two types of pitches of subpixels that emit light of the same color in the direction Y.

3 Second Embodiment 3.1 Outline of Backlight

Figure 33:
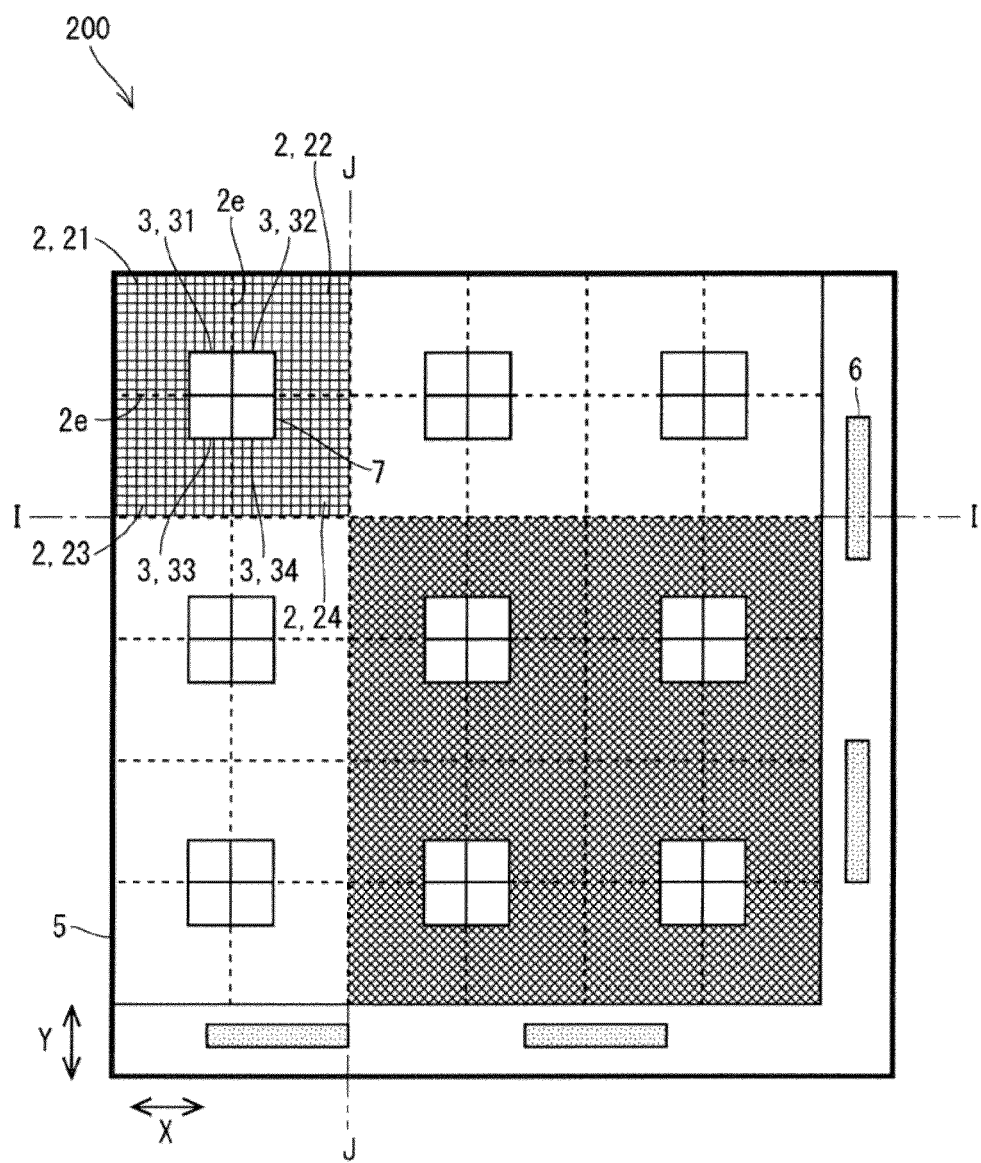
FIG. 33 is a plan view schematically illustrating a backlight of a second embodiment.
Figure 34:
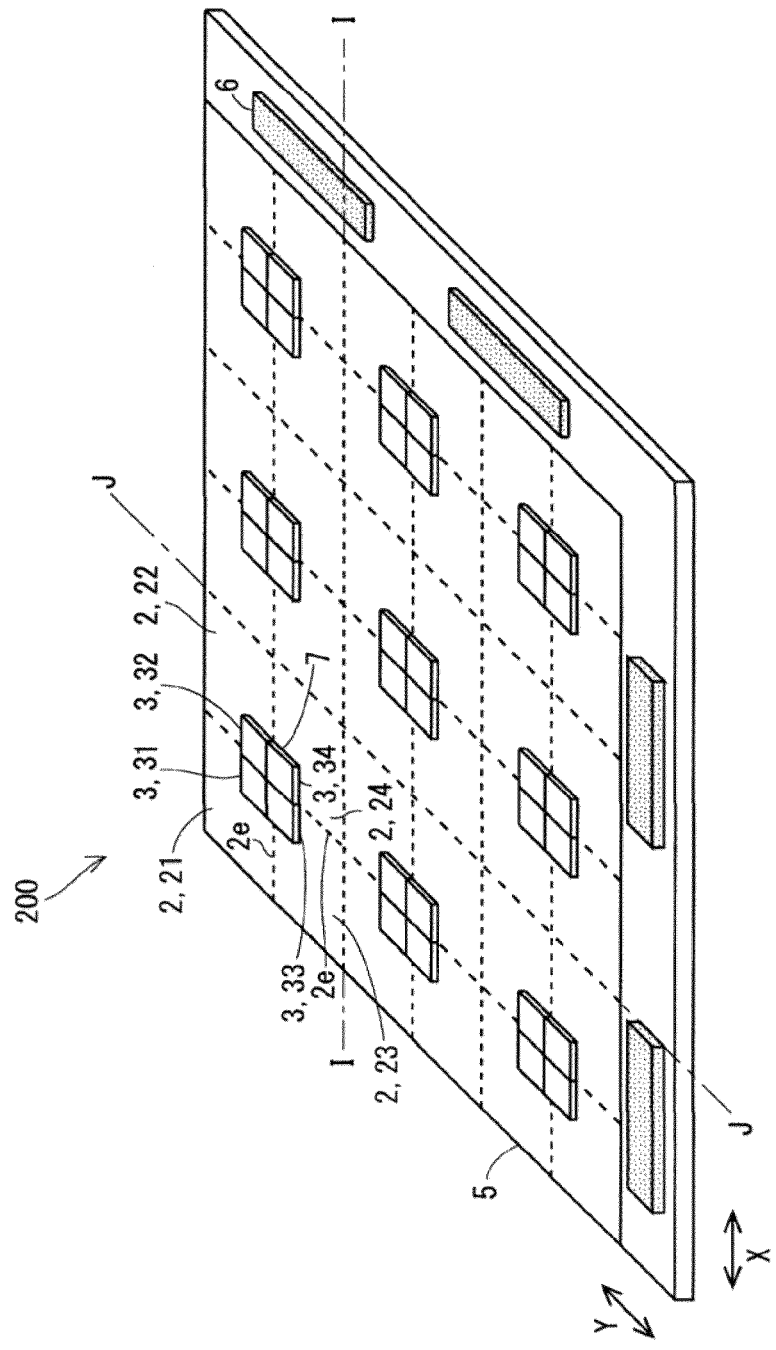
FIG. 34 is a perspective view schematically illustrating the backlight of the second embodiment.
Figure 35:
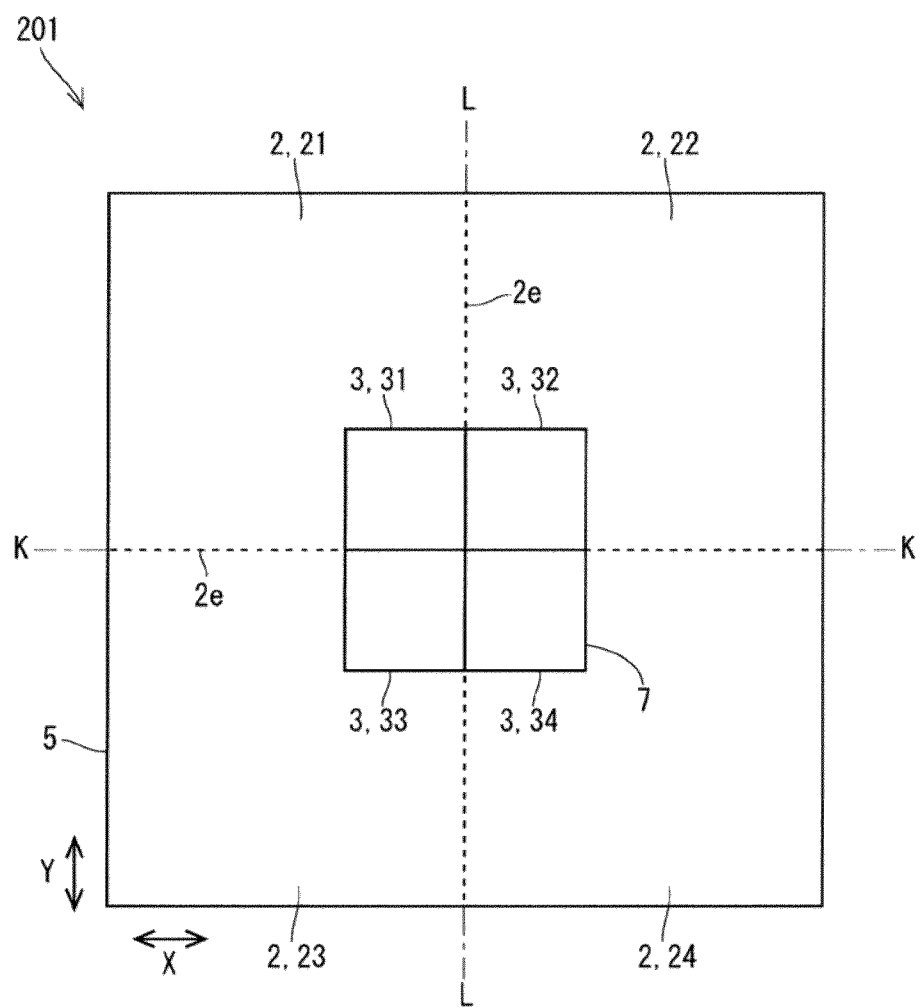
FIG. 35 is a plan view schematically illustrating adjacent four light emitting sections included in the backlight of the second embodiment.
Figure 36:
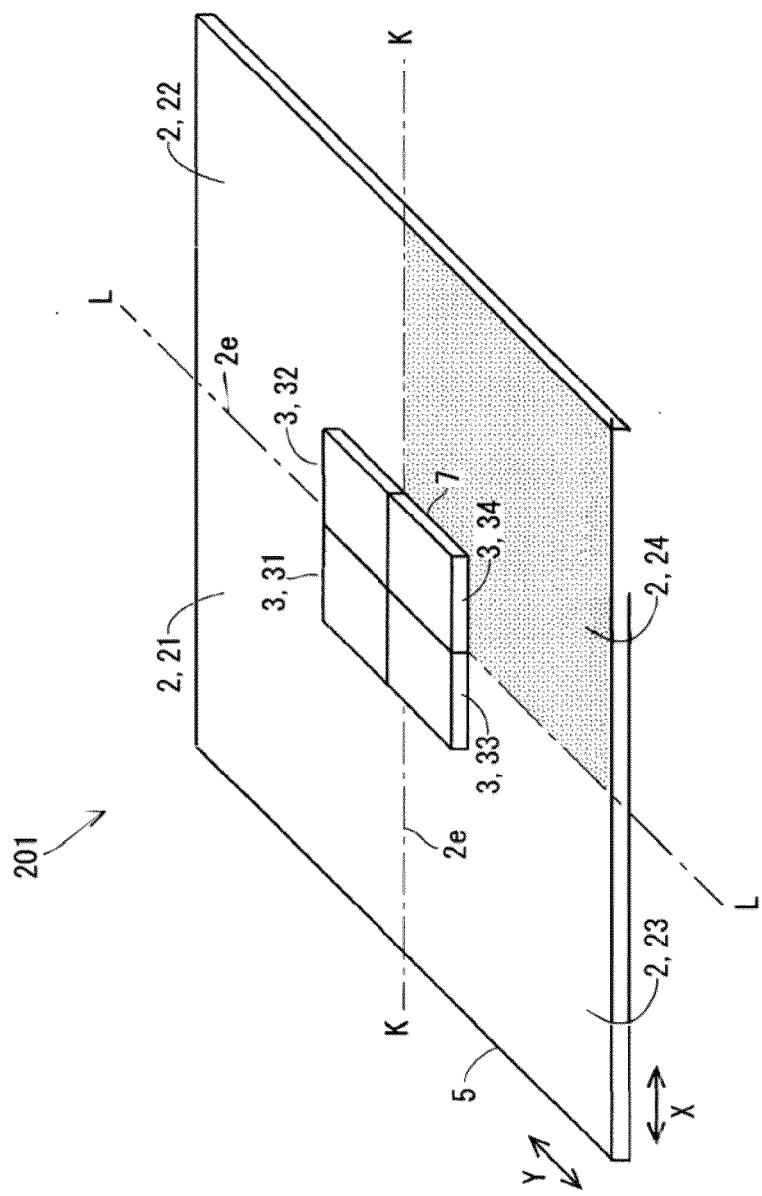
FIG. 36 is a perspective view schematically illustrating the adjacent four light emitting sections included in the backlight of the second embodiment.
Figure 37:
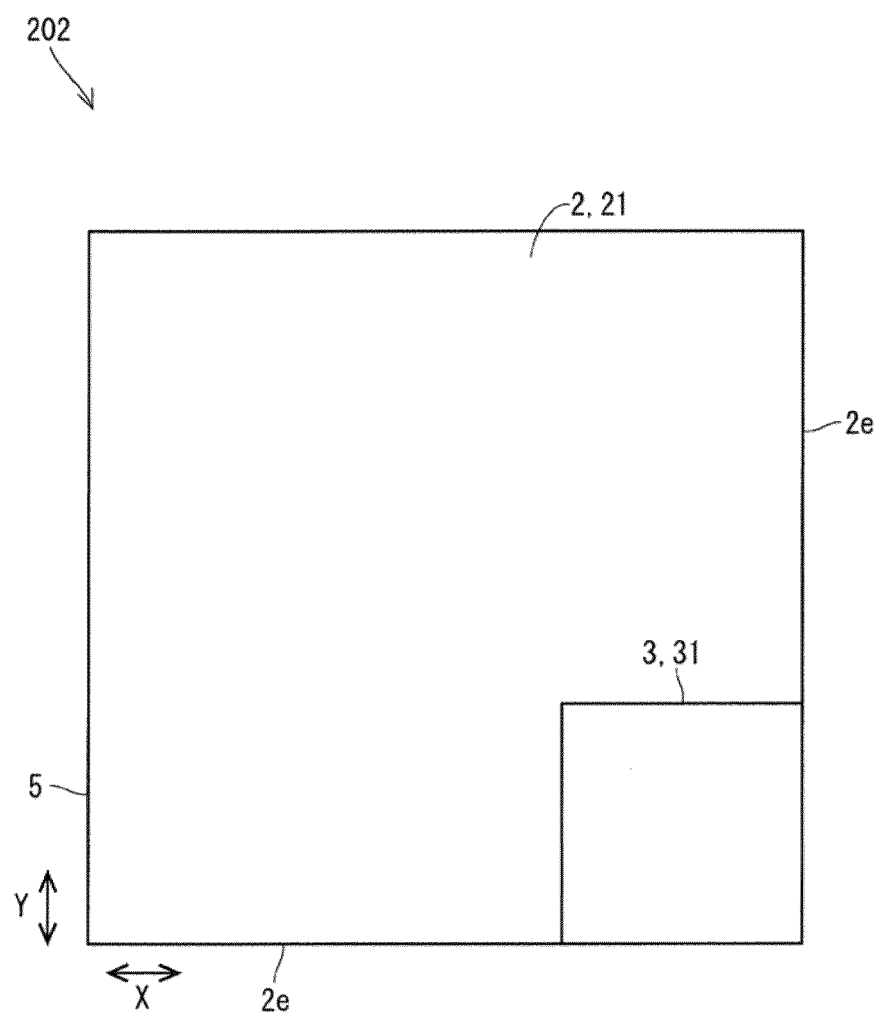
FIG. 37 is a plan view schematically illustrating one light emitting section included in the backlight of the second embodiment.
Figure 38:
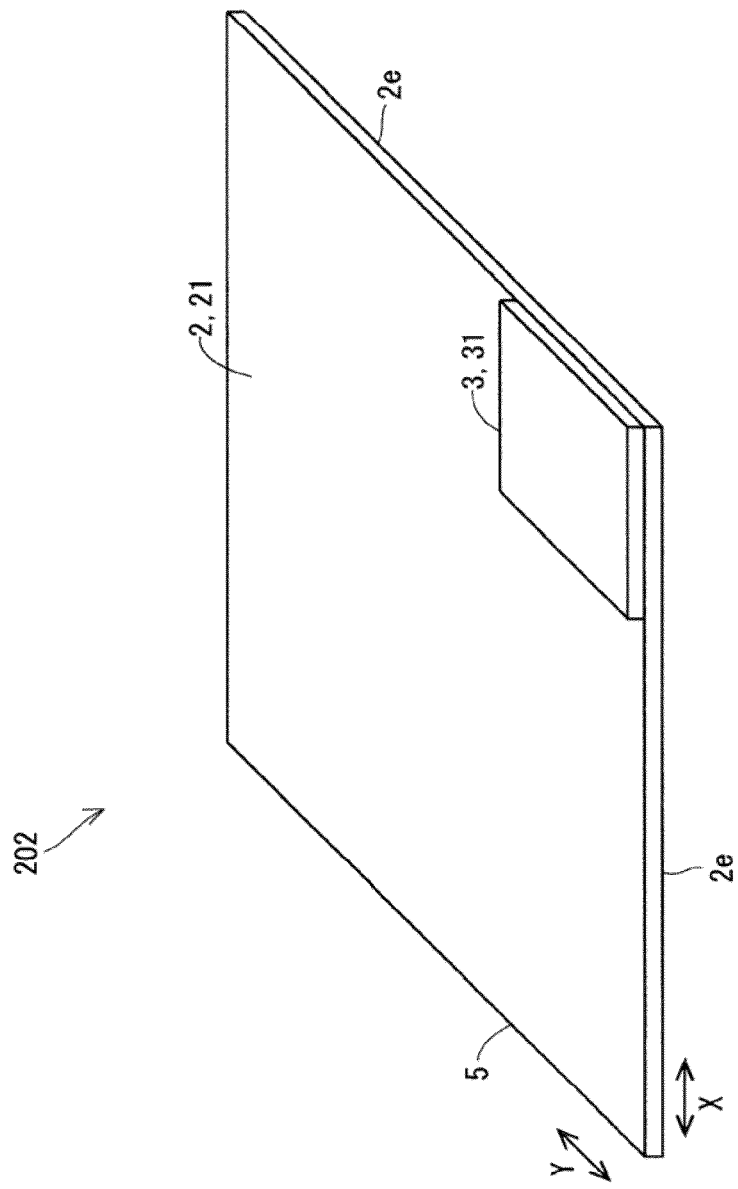
FIG. 38 is a perspective view schematically illustrating the one light emitting section included in the backlight of the second embodiment.

FIG. 33 is a plan view schematically illustrating a backlight of a second embodiment. FIG. 34 is a perspective view schematically illustrating the backlight of the second embodiment. FIG. 35 is a plan view schematically illustrating adjacent four light emitting sections included in the backlight of the second embodiment. FIG. 36 is a perspective view schematically illustrating the adjacent four light emitting sections included in the backlight of the second embodiment. FIG. 37 is a plan view schematically illustrating one light emitting section included in the backlight of the second embodiment. FIG. 38 is a perspective view schematically illustrating the one light emitting section included in the backlight of the second embodiment.

Four light emitting sections 201 illustrated in FIGS. 35 and 36 are obtained by cutting a backlight 200 of the second embodiment illustrated in FIGS. 33 and 34 at the positions of the cutting lines I-I and J-J. One light emitting section 202 illustrated in FIGS. 37 and 38 is obtained by cutting the four light emitting sections 201 illustrated in FIGS. 35 and 36 at the positions of the cutting lines K-K and L-L.

The backlight 200 is an example of a self-luminous body for a display apparatus.

As illustrated in FIGS. 33 and 34, the backlight 200 includes a plurality of light emitting sections 2.

The plurality of light emitting sections 2 are arranged in a matrix.

Each light emitting section of the plurality of light emitting sections 2 is a region where the self-luminous element 3 emits light The light emitted by the self-luminous element 3 is controlled by an image and a video displayed on an LCD including the backlight 200.

In the backlight 200, as the number of light emitting sections 2 present in the unit area increases, that is, as the number of divisions of the active area increases, the region that emits light can be precisely controlled. Therefore, as the number of divisions of the active area increases, the backlight 200 can emit light suitable for an image and a video displayed on the LCD including the backlight 200. The number of divisions of the active area is determined according to the design of the LCD such as the size of the LCD. By optimizing the number of divisions of the active area according to the design of the LCD, local dimming can be appropriately performed, the contrast of the LCD having only low contrast can be increased, and the quality of the image and the video displayed by the LCD can be improved.

Each light emitting section 2 includes the self-luminous element 3 as illustrated in FIGS. 33 to 38. In the backlight 200, the self-luminous element 3 is an LED element. The self-luminous element 3 may be a self-luminous element other than the LED element Each light emitting section 2 includes one self-luminous element 3. Therefore, the number of light emitting sections 2 included in the backlight 200 is the same as the number of self-luminous elements 3 included in the backlight 200.

The self-luminous element 3 serves as a light emission source for causing one light emitting section 2 to emit light.

3.2 Stacks

As illustrated in FIGS. 33 and 34, the backlight 200 includes a backplane 5 and a plurality of stacks 7.

The plurality of stacks 7 are arranged on the backplane 5.

Each stack 7 includes a plurality of self-luminous elements. Therefore, each stack 7 is a self-luminous element group. In the backlight 200, each stack 7 includes four self-luminous elements 31, 32, 33, and 34 as illustrated in FIGS. 33 to 38.

The plurality of light emitting sections 2 include a plurality of light emitting sections in which each stack 7 is arranged. In the backlight 200, the plurality of light emitting sections 2 include four light emitting sections 21, 22, 23, and 24 in which each stack 7 is arranged. The four light emitting sections 21, 22, 23, and 24 are four regions that can independently emit light, respectively.

The four self-luminous elements 31, 32, 33, and 34 are arranged in the four light emitting sections 21, 22, 23, and 24, respectively.

The four self-luminous elements 31, 32, 33, and 34 are not structurally divided. Therefore, the four self-luminous elements 31, 32, 33, and 34 are integrated. Each stack 7 is arranged across the four light emitting sections 21, 22, 23, and 24. The four self-luminous elements 31, 32, 33, and 34 are integrated in one chip using a semiconductor process. In each stack 7, the four self-luminous elements 31, 32, 33, and 34 formed on a substrate such as a sapphire substrate are integrated, and the four self-luminous elements 31, 32, 33, and 34 are diced into one chip as one unit.

The four self-luminous elements 31, 32, 33, and 34 are electrically separated. Therefore, the four self-luminous elements 31, 32, 33, and 34 can emit light independently of each other. Therefore, the four light emitting sections 21, 22, 23, and 24 can emit light independently of each other.

In FIGS. 37 and 38, only one self-luminous element 31 included in each stack 7 is illustrated. However, the four self-luminous elements 31, 32, 33, and 34 included in each stack 7 are not structurally divided but are integrated. That is, the four self-luminous elements 31, 32, 33, and 34 are integrated in one chip using a semiconductor process. In each stack 7, the four self-luminous elements 31, 32, 33, and 34 formed on a substrate such as a sapphire substrate are integrated, and the four self-luminous elements 31, 32, 33, and 34 are diced into one chip as one unit. Therefore, one self-luminous element 31 included in each stack 7 illustrated in FIGS. 37 and 38 is not structurally divided from the other three self-luminous elements 32, 33, and 34 included in each stack 7, and is integrated with the other three self-luminous elements 32, 33, and 34 included in each stack 7.

The four self-luminous elements 31, 32, 33, and 34 emit light of the same color. In the backlight 200, the four self-luminous elements 31, 32, 33, and 34 emit white light.

Each stack 7 may include two or more self-luminous element assemblies arranged in two or more light emitting sections 2. In this case, each stack 7 includes two or more self-luminous elements 3 included in each self-luminous element assembly of two or more self-luminous element assemblies.

The colors of light emitted from two or more self-luminous elements 3 are not limited, and may be the same or different from each other. By matching the color of the light emitted by the two or more self-luminous elements 3 with the color of the light emitted by the LCD including the backlight 200, an image and a video having high color purity can be displayed on the LCD. When each self-luminous element assembly includes three self-luminous elements 3, the three self-luminous elements 3 emit red, green, and blue light constituting three primary colors, respectively. Each self-luminous element assembly may include four self-luminous elements 3. The two or more self-luminous elements 3 are not structurally divided, but are integrated. The two or more self-luminous elements 3 are integrated into one chip using a semiconductor process. In each stack 7, the two or more self-luminous elements 3 formed on a substrate such as a sapphire substrate are integrated, and the two or more self-luminous elements 3 are diced into one chip as one unit. The two or more self-luminous elements 3 may be electrically separated from each other.

The backlight 200 may include a lens that adjusts a direction in which light travels. The lens is used to make uniform the light emission luminance distribution in the light emitting region included in each light emitting section 2. Alternatively, the lens is used to adjust the light emission luminance distribution.

3.3 Active Area and Inactive Area

The backlight 200 has an active area and an inactive area. The active area is an area that emits light. The inactive area is a frame-like area that is arranged outside the active area and does not emit light.

3.4 Element for Operating Self-Luminous Element

As illustrated in FIGS. 33 and 34, the backlight 200 includes the backplane 5 and driving ICs 6. Further, the backlight 200 includes a terminal (not illustrated).

The driving ICs 6 and the terminal are arranged in the inactive area.

The backplane 5 includes a glass substrate, an electrode, a switching element, a metal thin-film wiring, and the like (not illustrated).

The backplane 5 has a rectangular planar shape. The backplane 5 may have a planar shape other than the rectangular planar shape. For example, the backplane 5 may have a polygonal planar shape, a planar shape having an outline including an arc, a planar shape having an outline including a recess, or the like. The polygonal planar shape is a hexagonal planar shape, an octagonal planar shape, or the like. The planar shape of the backplane 5 is determined to match the planar shape of the LCD including the backlight 200.

The switching element is a thin film transistor. The semiconductor constituting the thin film transistor is determined according to the design of the backlight 200. The semiconductor is an oxide, amorphous silicon, low-temperature polysilicon, or the like.

The switching element and the electrode are arranged inside each light emitting section 2. The number of switching elements arranged inside each light emitting section 2 and the position of the switching element inside each light emitting section 2 are determined according to the design of the backlight 200.

Each self-luminous element 3 is electrically connected to the switching element via an electrode. The switching element is electrically connected to the driving IC 6 via a metal thin-film wiring. The terminal is electrically connected to a control board outside the backlight 200 via a flexible board or the like.

The terminal receives a signal supplied to the switching element from the control board via the flexible board or the like. The driving IC 6 transmits signals such as a drive signal and a signal indicating information of light emission luminance corresponding to a video signal input to the LCD including the backlight 200. The metal thin-film wiring supplies the transmitted signals to the switching element. The switching element operates each self-luminous element 3 according to the supplied signals. As a result, each self-luminous element 3 emits light having brightness corresponding to the video displayed on the LCD, and the backlight 200 emits light corresponding to the video displayed on the LCD.

Each self-luminous element 3 may be operated by an operation method different from the above-described operation method. For example, one self-luminous element 3 may be electrically connected to a plurality of switching elements, and the plurality of switching elements may operate one self-luminous element 3. A switching element other than the thin film transistor may operate each self-luminous element 3. For example, a pixel driving IC may operate each self-luminous element 3. In a case where each pixel driving IC operates the self-luminous element 3, in general, one pixel driving IC operates each self-luminous element 3.

The switching element, the metal thin-film wiring, the electrode, and the like are formed by a semiconductor process.

The backplane 5 may have a configuration other than the above-described configuration. For example, the backplane 5 may be a printed circuit board including a glass epoxy substrate, a copper wiring, an electrode, and the like. The electrode is subjected to plating treatment or the like. In a case where the backplane 5 is a printed circuit board, a switching element such as a pixel driving IC produced using a glass substrate, a silicon substrate, or the like is arranged on the printed circuit board instead of the thin film transistor.

3.5 Size of Self-Luminous Element

The length of one side of each self-luminous element 3 is less than 100 µm. Generally speaking, an LED element having a length of one side of less than 100 µm is referred to as a µLED element. Thus, each self-luminous element 3 is a µLED element. However, the length of one side of each self-luminous element 3 is determined according to the design of the backlight 200. Therefore, each self-luminous element 3 may be an LED element that is not a µLED element having a length of one side of 100 µm or more.

3.6 Method for Manufacturing Backlight

FIG. 10 is also a flowchart illustrating a method for manufacturing the backlight of the second embodiment.

The backlight 200 is manufactured by the manufacturing method illustrated in FIG. 10. Therefore, when the backlight 200 is manufactured, steps S101 to S109 illustrated in FIG. 10 are executed.

In steps S101 to S104, each stack 7 is manufactured.

In step S101, a laminated film is produced. The laminated film is produced on a substrate. The substrate is a sapphire substrate or the like. The substrate is also referred to as a wafer. The laminated film to be produced includes a buffer layer, an n-type semiconductor layer, a light emitting layer, a p-type semiconductor layer, and the like. The laminated film is produced by crystal-growing a layer included in the laminated film.

In subsequent step S102, a color conversion layer is formed. The color conversion layer to be formed includes fluorescent particles and the like. The color conversion layer converts the color of light emitted by the LED element from blue to white.

In subsequent step S103, an electrode is formed. The electrode is formed on the n-type semiconductor layer and the p-type semiconductor layer, and is electrically in contact with the n-type semiconductor layer and the p-type semiconductor layer.

In subsequent step S104, dicing is performed. By dicing, an intermediate product including a substrate, a laminated film, a color conversion layer, and an electrode is cut into the size of each stack 7, and each stack 7 including the four self-luminous elements 31, 32, 33, and 34 diced and integrated into one chip is obtained.

Each stack 7 may be manufactured by steps different from steps S101 to S104.

In steps S105 and S106, the backplane 5 is manufactured.

In step S105, a switching element, a metal thin-film wiring, and the like are formed on a glass substrate. The switching element, the metal thin-film wiring, and the like are formed by a semiconductor process. As the glass substrate, a glass substrate having a large size capable of taking a large number of glass substrates included in the backlight 200 is used.

In subsequent step S106, an electrode is formed on the glass substrate. The electrode is formed so as to be electrically connected to the switching element, the metal thin-film wiring, or the like.

The backplane 5 may be manufactured by steps different from the processes S105 and S106.

In step S107, pick and place is performed. At that time, each stack 7 is arranged on the backplane 5 by a pick and place method. In addition, each stack 7 is repeatedly arranged on the backplane 5. In addition, the terminal of the LED element included in each stack 7 is electrically connected to the electrode included in the backplane 5.

When the backlight 200 is manufactured, the four self-luminous elements 31, 32, 33, and 34 are collectively arranged in the four light emitting sections 21, 22, 23, and 24 by one pick and place. Therefore, when the backlight 200 is manufactured, the time required to arrange the four self.luminous elements 31, 32, 33, and 34 on the backplane 5 can be shortened.

Each stack 7 may be arranged on the backplane 5 by an arrangement method other than the pick and place method. Only the LED layer including the buffer layer, the n-type semiconductor layer, the light emitting layer, the p-type semiconductor layer, the electrode, the color conversion layer, and the like included in each stack 7 may be peeled off from the substrate by a laser lift-off method or the like, and the peeled LED layer may be arranged on the backplane 5.

The terminal included in the LED element is electrically connected to the electrode included in the backplane 5 using a conductive paste, an anisotropic conductor film, or the like. The terminal included in the LED element may be electrically connected to the electrode by a connection method different from the connection method.

In subsequent step S108, cutting is performed. By the cutting, the glass substrate having a large size is cut into the size of the glass substrate included in one backlight 200. The glass substrate is cut by a scribing and breaking method.

In subsequent step S109, a flexible board and driving ICs are mounted. Thus, the backlight 200 is obtained. The flexible board and the driving ICs are mounted on the glass substrate via an anisotropic conductive film.

The order in which steps S101 to S109 are executed may be different from the above-described order. In addition, the processing performed in each of steps S101 to S109 may be different from the above-described processing.

3.7 Liquid Crystal Display Apparatus

Figure 39:
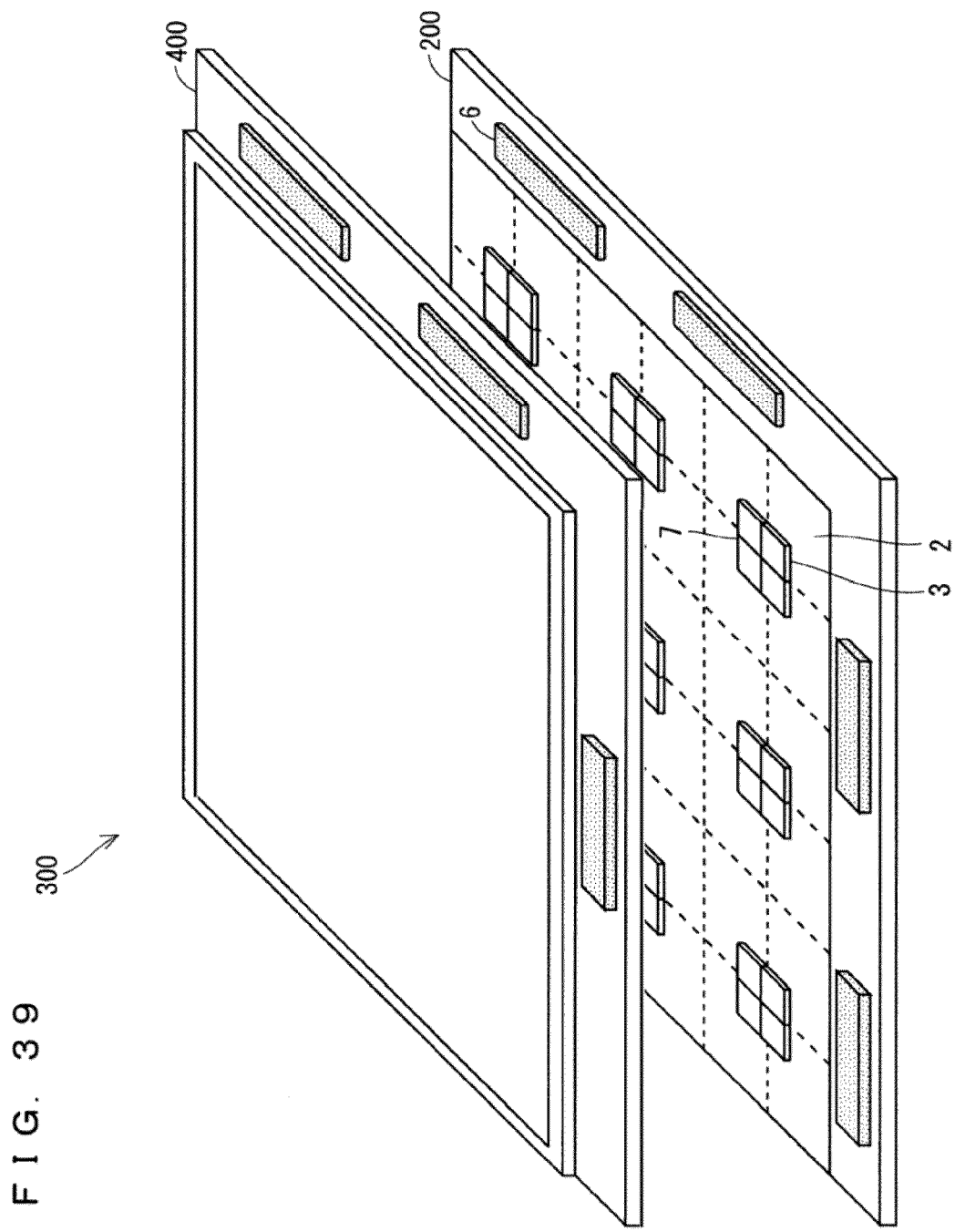
FIG. 39 is a perspective view schematically illustrating a liquid crystal display apparatus including the backlight of the second embodiment.

FIG. 39 is a perspective view schematically illustrating the LCD including the backlight of the second embodiment.

An LCD 300 illustrated in FIG. 39 includes the backlight 200 and a liquid crystal panel 400.

The backlight 200 emits light The backlight 200 emits light of one color. The backlight 200 may emit light of a plurality of colors. The liquid crystal panel 400 modulates the light emitted by the backlight 200. As a result, the LCD 300 displays an image and a video.

The backlight 200 has a main surface arranged on a visible side. The liquid crystal panel 400 is arranged on the main surface, The backlight 200 has the active area in which a plurality of light emitting sections 2 are arranged to emit light. The liquid crystal panel 400 has an active area in which a plurality of display pixels are arranged and an image and a video are displayed. The active area of the backlight 200 has the same size as the size of the active area of the liquid crystal panel 400 or a size larger than the size of the active area of the liquid crystal panel 400. However, the relationship between the sixes of the active area of the backlight 200 and the active area of the liquid crystal panel 400 may be changed.

The backlight 200 includes the plurality of light emitting sections 2. The liquid crystal panel 400 includes a plurality of display pixels. Each display pixel of the plurality of display pixels includes a plurality of subpixels. Each light emitting section 2 has a size larger than the size of the display pixel and the size of the subpixel. The number of divisions of the active area of the backlight 200 that determines the size of each light emitting section 2 is desirably optimized according to the liquid crystal panel 400. Consequently, the contrast of the LCD 300 having only the low contrast can be increased, and the quality of the image and the video displayed by the LCD 300 can be improved.

The liquid crystal panel 400 generally includes a protective plate, a printed circuit board, a drive IC, a switching element, a thin film wiring, and the like. The protective plate protects the surface of the liquid crystal panel 400. The printed circuit board, the drive IC, the switching element, and the thin film wiring handle image signals, video signals, and the like. The switching element is a thin film transistor or the like. The liquid crystal panel 400 may have a configuration different from the above configuration.

The LCD 300 includes a bonding medium (not illustrated). The bonding medium bonds the backlight 200 and the liquid crystal panel 400 together. The bonding medium is a double-sided tape, an adhesive, or the like. The LCD 300 may have a configuration different from the above configuration.

The LCD 300 may include a lens that equalizes the brightness of the light emitted by the backlight 200. The lens is arranged according to the arrangement of the light emitting sections 2, and adjusts the brightness, the light emission angle, and the like of the light emitted by the backlight 200.

3.8 Arrangement of Light Emitting Section, Self-Luminous Element, and Stack

Each stack 7 includes the four self-luminous elements 31, 32, 33, and 34 as illustrated in FIGS. 33 to 38. Each stack 7 includes two rows of self-luminous elements arranged in the direction X in which the cutting line I-I extends and electrically separated from each other. Each self-luminous element of the two rows of self-luminous elements includes two self-luminous elements arranged in the direction Y in which the cutting line J-J extends and electrically separated from each other. Each stack 7 includes two columns of self-luminous elements arranged in the direction Y in which the cutting line J-J extends and electrically separated from each other. Each self-luminous element of the two columns of self-luminous elements includes two self-luminous elements arranged in the direction X in which the cutting line I-I extends and electrically separated from each other. As a result, each stack 7 includes the four self-luminous elements 31, 32, 33, and 34 respectively arranged in the four light emitting sections 21, 22, 23, and 24 arranged in a matrix such that the two rows of light emitting sections are arranged in the direction X and the two columns of light emitting sections are arranged in the direction Y. The center of each stack 7 including the four self-luminous elements 31, 32, 33, and 34 is aligned with the position where the four light emitting sections 21, 22, 23, and 24 are in contact with each other. As a result, each stack 7 is arranged across the four light emitting sections 21, 22, 23, and 24. Further, two sides included in four sides of each self-luminous element of the four self-luminous elements 31, 32, 33, and 34 are in contact with ends 2e of the two light emitting sections 2. However, the positions of the four self-luminous elements 31, 32, 33, and 34 may deviate from the above-described positions due to the influence of the process accuracy when the backlight 200 is manufactured.

The backlight 200 has a structure obtained by repeatedly arranging the stacks 7 each including the four light emitting sections 21, 22, 23, and 24 and the four self-luminous elements 31, 32, 33, and 34 in the direction X and the direction Y so as not to overlap each other.

Each self-luminous element (self-luminous element assembly) in the stack 7 is independently driven as one light emitting section by the driving IC 6, and functions as a backlight. Only the integrated stack 7 including the four self-luminous elements 31, 32, 33, and 34 (self-luminous element assembly) constitutes the four light emitting sections 21, 22, 23, and 24, and constitutes a 6 × 6 backlight in FIG. 33.

Hereinafter, specific examples of the arrangement of the light emitting section 2, the self-luminous element 3, and the stack 7 will be described.

Example 31

Figure 40:
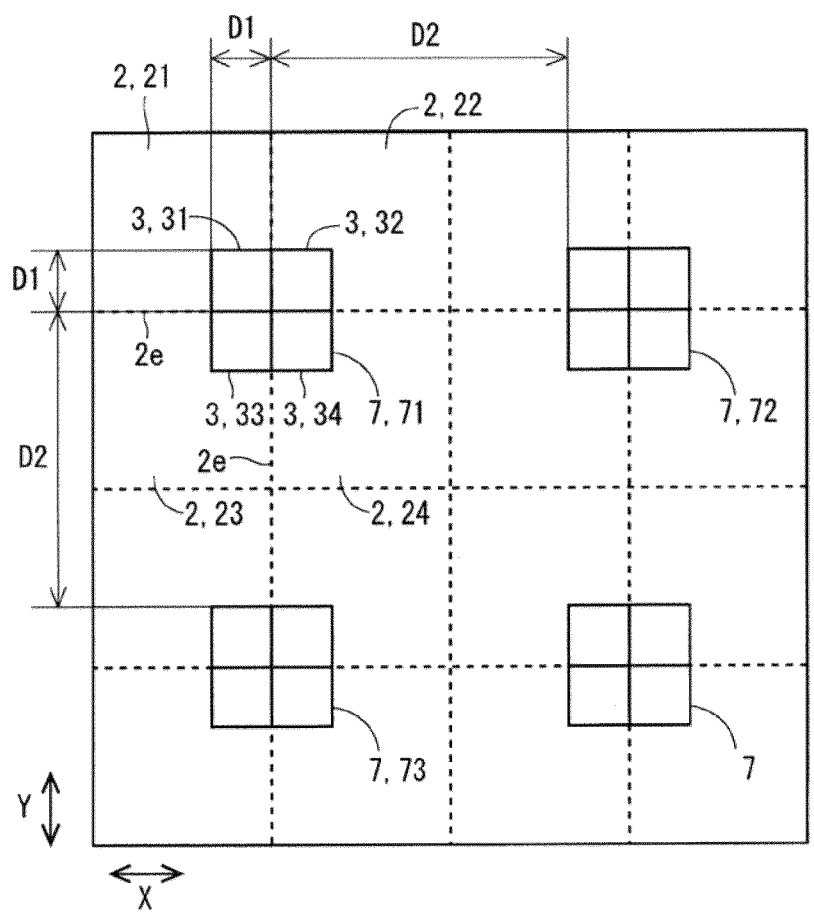
FIG. 40 is a plan view schematically illustrating sixteen light emitting sections included in a backlight of Example 31 of the second embodiment.

FIG. 40 is a plan view schematically illustrating sixteen light emitting sections included in a backlight of Example 31 of the second embodiment.

The sixteen display pixels illustrated in FIG. 40 are obtained by cutting the backlight 200 of the second embodiment illustrated in FIGS. 33 and 34 at the positions of the cutting lines I-I and J-J.

As illustrated in FIG. 40, the backlight 200 includes the sixteen light emitting sections 2 arranged in a matrix such that the four rows of light emitting sections are arranged in the direction X and the four columns of light emitting sections are arranged in the direction Y.

Each self-luminous element 3 has a square planar shape. A side extending in the direction X and a side extending in the direction Y of each self-luminous element 3 have the same length. Each self-luminous element 3 may have a planar shape different from the square planar shape.

Each stack 7 includes the four self-luminous elements 31, 32, 33, and 34 as illustrated in FIG. 40. The four self-luminous elements 31, 32, 33, and 34 are arranged in a matrix such that the two rows of self-luminous elements are arranged in the direction X and the two columns of self-luminous elements are arranged in the direction Y. The four self-luminous elements 31, 32, 33, and 34 are arranged such that sides of the two self-luminous elements adjacent to each other in the direction X, which are close to the center of each stack 7, face each other. In addition, the four self-luminous elements 31, 32, 33, and 34 are arranged such that sides of the two self-luminous elements adjacent to each other in the direction Y, which are close to the center of each stack 7, face each other.

The four light emitting sections 21, 22, 23, and 24 include the two light emitting sections 21 and 22 arranged in the specific direction X and adjacent to each other. The self-luminous elements 31 and 32 that are provided in the two light emitting sections 21 and 22 and emit light of the same color are arranged at the first pitch D1 in the specific direction X. Therefore, the four self-luminous elements 31, 32, 33, and 34 included in each stack 7 include two self-luminous elements 31 and 32 that are arranged at the first pitch D1 in the specific direction X and emit light of the same color. The first pitch D1 matches the length of one side of each self-luminous element 3. In addition, the plurality of stacks 7 include two stacks 71 and 72 that are arranged in the specific direction X and adjacent to each other. The two stacks 71 and 72 respectively include two self-luminous elements 32 and 31 that are arranged in the specific direction X at the second pitch D2 larger than the first pitch D1 and emit light of the same color.

The four light emitting sections 21, 22, 23, and 24 include two light emitting sections 21 and 23 arranged in the specific direction Y and adjacent to each other. The self-luminous elements 31 and 33 that are provided in the two light emitting sections 21 and 23 and emit light of the same color are arranged at the first pitch D1 in the specific direction Y. Therefore, the four self-luminous elements 31, 32, 33, and 34 included in each stack 7 include two self-luminous elements 31 and 33 that are arranged at the first pitch D1 in the specific direction Y and emit light of the same color. The first pitch D1 matches the length of one side of each self-luminous element 3. In addition, the plurality of stacks 7 include two stacks 71 and 73 that are arranged in the specific direction Y and adjacent to each other. The two stacks 71 and 73 respectively include two self-luminous elements 33 and 31 that are arranged in the specific direction Y at the second pitch D2 larger than the first pitch D1 and emit light of the same color.

The four self-luminous elements 31, 32, 33, and 34 are arranged at the first pitch in the specific direction X. The plurality of stacks 7 are arranged at the second pitch larger than the first pitch in the specific direction X.

The four self-luminous elements 31, 32, 33, and 34 are arranged at the first pitch in the specific direction Y. The plurality of stacks 7 are arranged at the second pitch larger than the first pitch in the specific direction Y.

The first pitch D1 and the second pitch D2 in the direction X are the same as the first pitch D1 and the second pitch D2 in the direction Y, respectively. Therefore, each light emitting section 2 has a square planar shape. However, the first pitch D1 and the second pitch D2 in the direction X may not be the same as the first pitch D1 and the second pitch D2 in the direction Y, respectively. Therefore, each light emitting section 2 may not have a square planar shape. For example, each light emitting section 2 may have a rectangular planar shape, a polygonal planar shape, a planar shape having an outline including an arc, or the like. The planar shape of each light emitting section 2 is determined according to the design of the backlight 200.

The lengths of the sides of the four self-luminous elements 31, 32, 33, and 34 are the same. However, the lengths of the sides of the four self-luminous elements 31, 32, 33, and 34 may be different from each other.

Even in a case where the dimensions of the four self-luminous elements 31, 32, 33, and 34 are different from the exemplified dimensions, between the four light emitting sections 21, 22, 23, and 24 and the four light emitting sections 21, 22, 23, and 24 adjacent to the four light emitting sections 21, 22, 23, and 24, the self-luminous elements 3 that emit light of the same color in each direction of the direction X and the direction Y are arranged at a plurality of pitches D1 and D2 different from each other, whereby the effect of the present disclosure is exhibited. That is, the four self-luminous elements 31, 32, 33, and 34 can be collectively arranged in the four light emitting sections 21, 22, 23, and 24, and the time required to manufacture the backlight 200 can be shortened.

Examples 32 to 34

Figure 41:
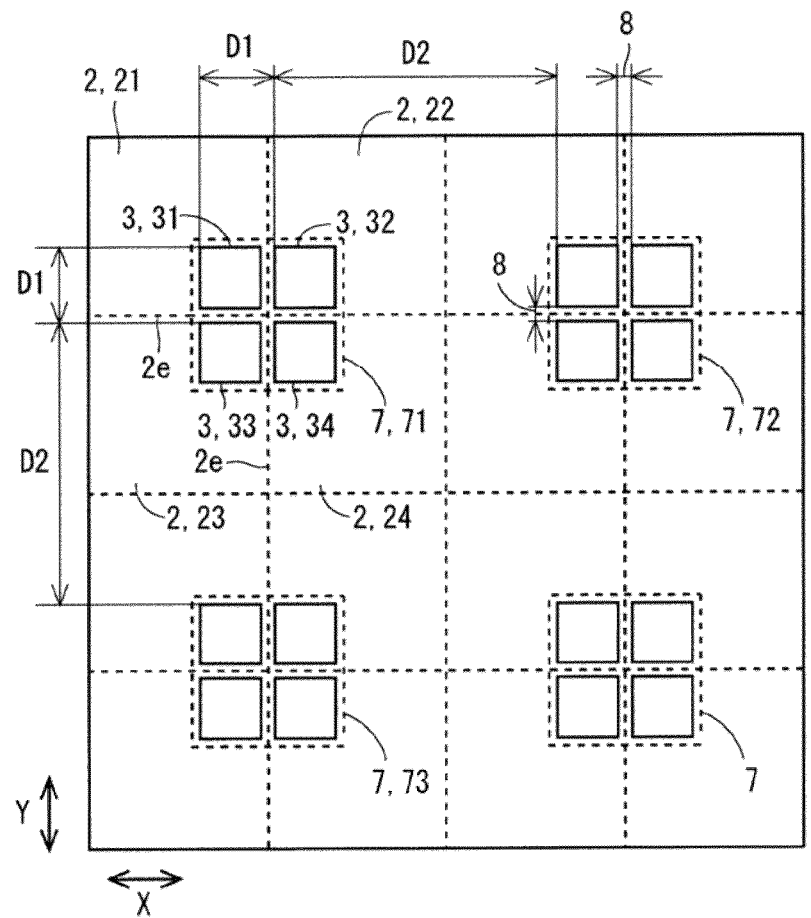
FIG. 41 is a plan view schematically illustrating sixteen light emitting sections included in a backlight of Example 32 of the second embodiment.
Figure 42:
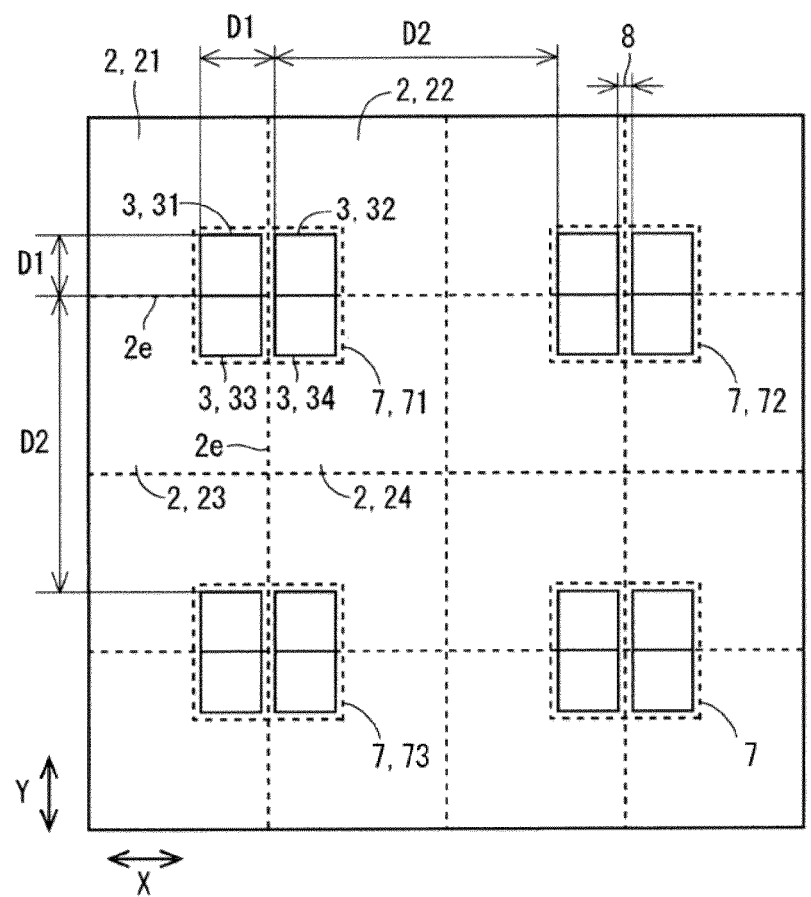
FIG. 42 is a plan view schematically illustrating sixteen light emitting sections included in a backlight of Example 33 of the second embodiment.
Figure 43:
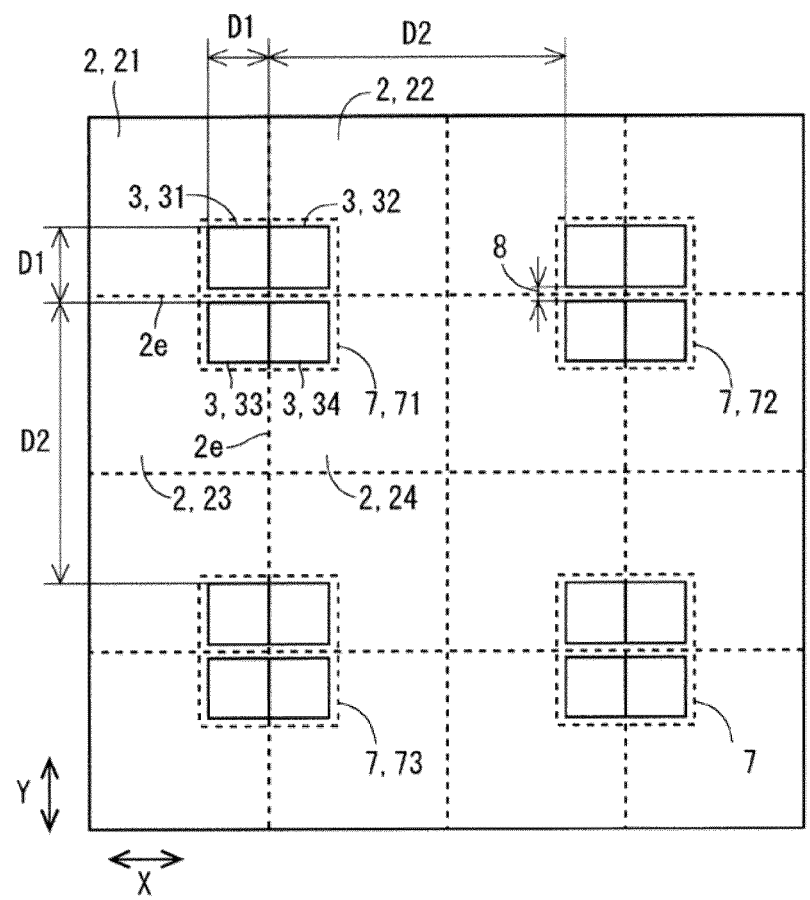
FIG. 43 is a plan view schematically illustrating sixteen light emitting sections included in a backlight of Example 34 of the second embodiment.

FIGS. 41 to 43 are plan views schematically illustrating sixteen light emitting sections included in the backlight of Examples 32 to 34 of the second embodiment, respectively.

The sixteen light emitting sections illustrated in each of FIGS. 41 to 43 are obtained by cutting the backlight 200 of the second embodiment illustrated in FIGS. 33 and 34 at the positions of the cutting lines I-I and J-J.

As illustrated in FIG. 41, Example 32 is different from Example 31 in that adjacent two self-luminous elements 31 and 32 included in the four self-luminous elements 31, 32, 33, and 34 are separated from each other with the gap 8 interposed therebetween. The gap 8 is at the ends 2e of the light emitting sections 21 and 22. The same applies to two self-luminous elements 33 and 34 adjacent to each other, two self-luminous elements 31 and 33 adjacent to each other, and two self-luminous elements 32 and 34 adjacent to each other. According to the gap 8, it is possible to clarify the boundary of the region where each self-luminous element 3 emits light, which is controlled by an image and a video displayed by the LCD including the backlight 200, and it is possible to improve the quality of the image and the video displayed by the LCD. The dimension of the gap 8 is determined according to the design of the backlight 200.

As illustrated in FIG. 42, Example 33 is different from Example 31 in that adjacent two self-luminous elements 31 and 32 included in the four self-luminous elements 31, 32, 33, and 34 are separated from each other with the gap 8 interposed therebetween. The gap 8 is at the ends 2e of the light emitting sections 21 and 22. The same applies to two self-luminous elements 33 and 34 adjacent to each other. According to the gap 8, it is possible to clarify the boundary of the region where each self-luminous element 3 emits light, which is controlled by an image and a video displayed by the LCD including the backlight 200, and it is possible to improve the quality of the image and the video displayed by the LCD. The dimension of the gap 8 is determined according to the design of the backlight 200.

As illustrated in FIG. 43, Example 34 is different from Example 31 in that adjacent two self-luminous elements 31 and 33 included in the four self-luminous elements 31, 32, 33, and 34 are separated from each other with the gap 8 interposed therebetween. The gap 8 is at the ends 2e of the light emitting sections 21 and 23. The same applies to two self-luminous elements 32 and 34 adjacent to each other. According to the gap 8, it is possible to clarify the boundary of the region where each self-luminous element 3 emits light, which is controlled by an image and a video displayed by the LCD including the backlight 200, and it is possible to improve the quality of the image and the video displayed by the LCD. The dimension of the gap 8 is determined according to the design of the backlight 200.

When two or more self-luminous elements 3 are arranged in each light emitting section 2, adjacent two self-luminous elements 3 included in the two or more self-luminous elements 3 may be separated from each other with a gap interposed therebetween. Even with the gap, it is possible to clarify the boundary of the region where each self-luminous element 3 emits light, which is controlled by an image and a video displayed by the LCD including the backlight 200, and it is possible to improve the quality of the image and the video displayed by the LCD. The dimension of the gap is determined according to the design of the backlight 200.

The relationship between the first pitch D1 and the second pitch D2 in Examples 32 to 34, the relationship between the first pitch in the specific direction X of the four self-luminous elements 31, 32, 33, and 34 and the second pitch in the specific direction X of the plurality of stacks 7, and the relationship between the first pitch in the specific direction Y of the four self-luminous elements 31, 32, 33, and 34 and the second pitch in the specific direction Y of the plurality of stacks 7 are the same as those in Example 31.

Also in Examples 32 to 34, between the four light emitting sections 21, 22, 23, and 24 and the four light emitting sections 21, 22, 23, and 24 adjacent to the four light emitting sections 21, 22, 23, and 24, the self-luminous elements 3 that emit light of the same color in each direction of the direction X and the direction Y are arranged at a plurality of pitches D1 and D2 different from each other, whereby the effect of the present disclosure is exhibited. That is, the four self-luminous elements 31, 32, 33, and 34 can be collectively arranged in the four light emitting sections 21, 22, 23, and 24, and the time required to manufacture the backlight 200 can be shortened.

Reference Example

Figure 44:
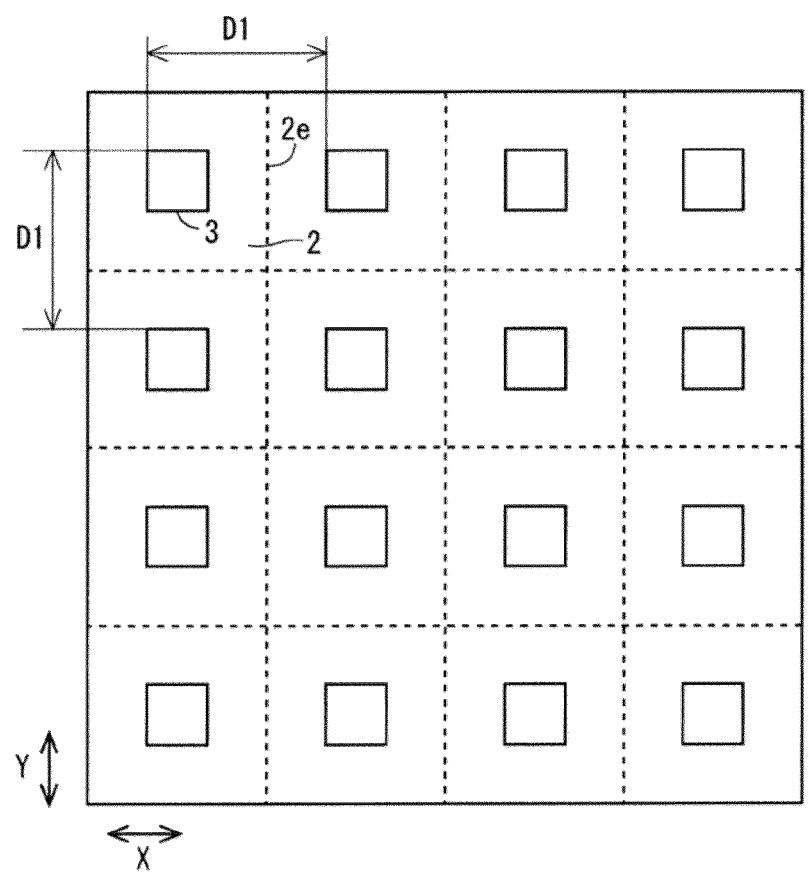
FIG. 44 is a plan view schematically illustrating sixteen light emitting sections included in a backlight of the reference example.

FIG. 44 is a plan view schematically illustrating sixteen light emitting sections included in the backlight of the reference example.

In the backlight of the reference example, as illustrated in FIG. 44, each self-luminous element 3 is arranged in the central portion of each light emitting section 2 regardless of the arrangement, dimensions, and the like of the plurality of self-luminous elements 3, and is not in contact with the end 2c of each light emitting section 2.

In the backlight of the reference example, between the four light emitting sections 2 and the four light emitting sections 2 adjacent to the four light emitting sections 2, the self-luminous elements 3 that emit light of the same color are arranged at one pitch D1 in each of the direction X and the direction Y.

When the backlight of the reference example is manufactured, four picks and places are required in order to arrange the four self-luminous elements 3 arranged in the four light emitting sections 2 on the backplane 5. Therefore, the time required to manufacture the backlight of the reference example becomes long. In addition, the cost required to manufacture the backlight of the reference example increases.

Table 3 shows the number of pitches of self-luminous elements 3 that emit light of different colors in the direction X, the number of pitches of self-luminous elements 3 that emit light of the same color in the direction X, the number of pitches of self-luminous elements 3 that emit light of different colors in the direction Y, and the number of pitches of self-luminous element, 3 that emit light of the same color in the direction Y in the backlight 200 of Examples 31 to 34 and the backlight of the reference example.

TABLE 3

| | Example | Direction Y | | Direction X | |
|---|---|---|---|---|---|
| | | Pitches of LEDs that Emit Light of Different Colors | Pitches of LEDs that Emit Light of Same Color | Pitches of LEDs that Emit Light of Different Colors | Pitches of LEDs that Emit Light of Same Color |
| Backlight of Second Embodiment | 31 | Not Applied | 2 | Not Applied | 2 |
| | 32 | Not Applied | 2 | Not Applied | 2 |
| | 33 | Not Applied | 2 | Not Applied | 2 |
| | 34 | Not Applied | 2 | Not Applied | 2 |
| Backlight of Reference Example | | Not Applied | 1 | Not Applied | 1 |

In the backlight 200 of the reference example, there is only one type of pitch of self-luminous elements 3 that emit light of the same color in the direction X. Furthermore, there is only one type of pitch of self-luminous elements 3 that emit light of the same color in the direction Y.

On the other hand, in the backlight 200 of Examples 31 to 34, there are two types of pitches of self-luminous elements 3 that emit light of the same color in the direction X. Furthermore, there are two types of pitches of self-luminous elements 3 that emit light of the same color in the direction Y.

Examples 35 to 37

Figure 45:
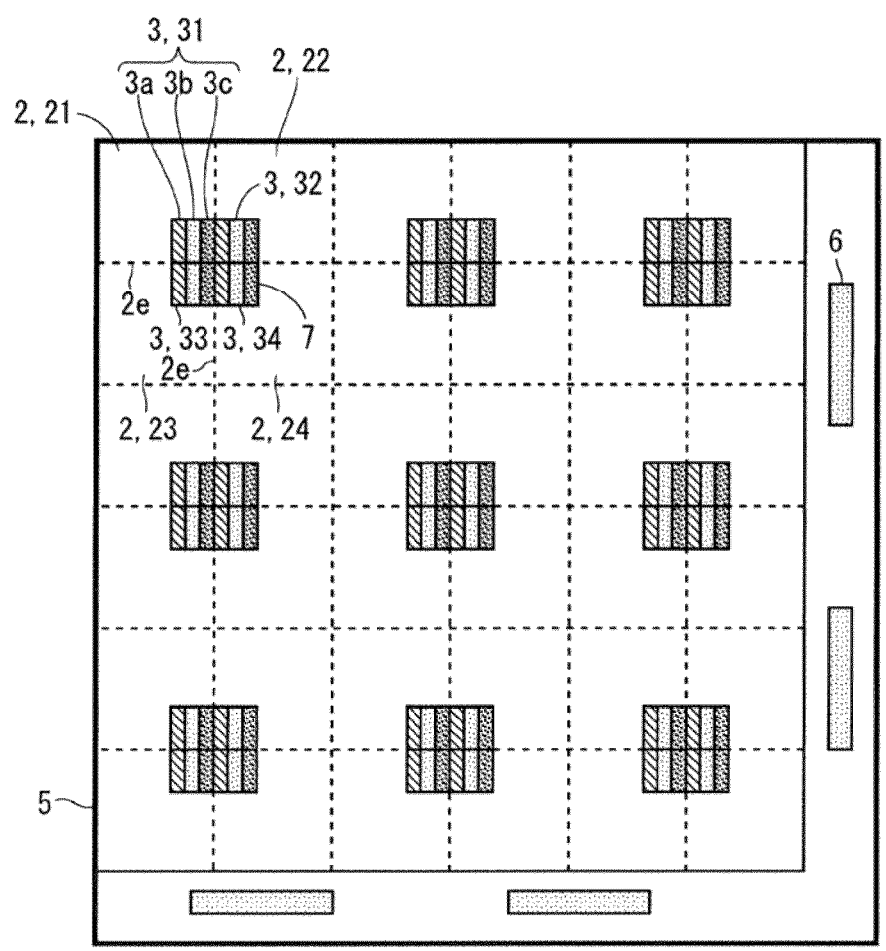
FIG. 45 is a plan view schematically illustrating a backlight of Example 35 of the second embodiment.
Figure 46:
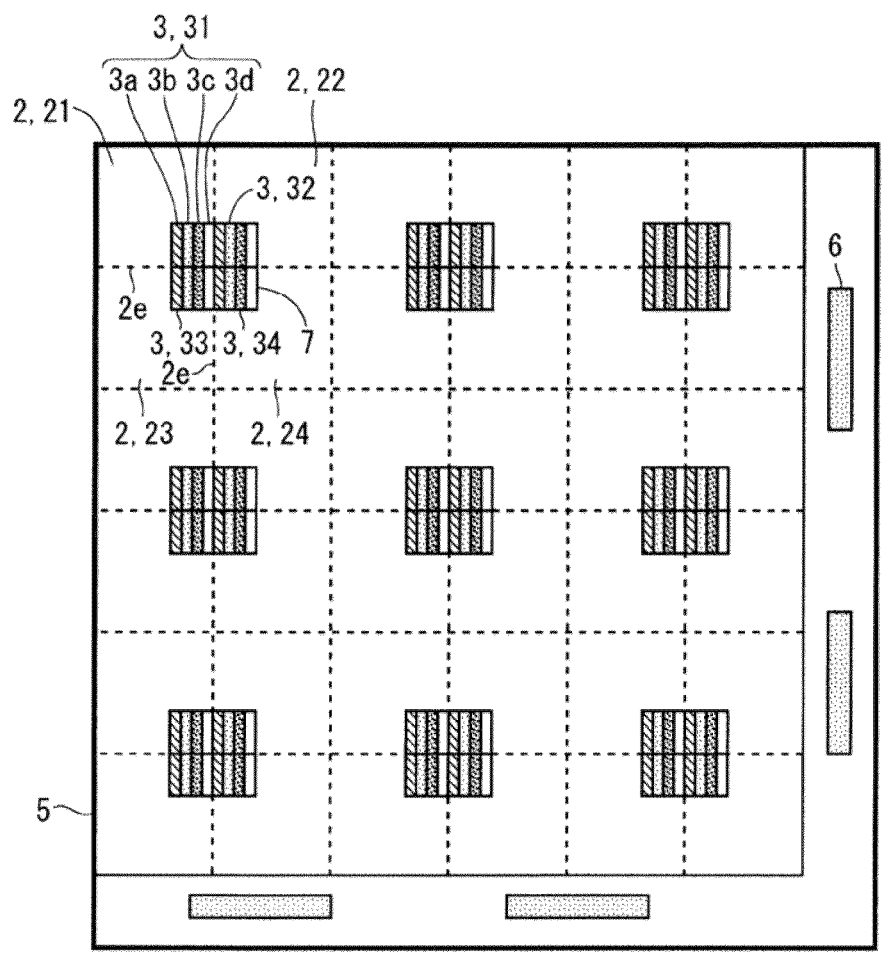
FIG. 46 is a plan view schematically illustrating a backlight of Example 36 of the second embodiment.
Figure 47:
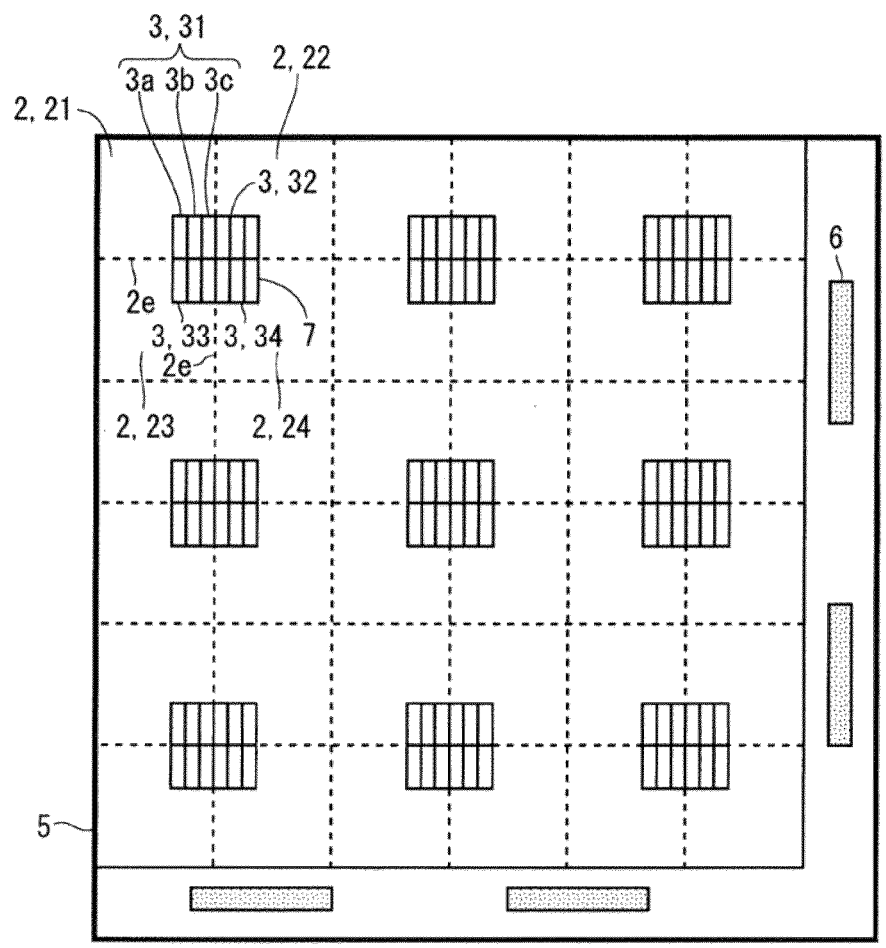
FIG. 47 is a plan view schematically illustrating a backlight of Example 37 of the second embodiment.

FIGS. 45 to 47 are plan views schematically illustrating backlights of Examples 35 to 37 of the second embodiment, respectively.

As illustrated in FIG. 45, Example 35 is different from Example 31 in that three self-luminous elements 3a, 3b, and 3c that emit light of three colors different from each other are arranged in each light emitting section 2. That is, in this example, it is possible to cause white light necessary for the backlight to be emitted or to cause light of a specific color to be emitted using the three self-luminous elements 3a, 3b, and 3c that emit light of three colors different from each other.

As illustrated in FIG. 46, Example 36 is different from Example 31 in that four self-luminous elements 3a, 3b, 3c, and 3d that emit light of four colors different from each other are arranged in each light emitting section 2. That is, in this example, it is possible to cause white light necessary for the backlight to be emitted or to cause light of a specific color to be emitted using the three self-luminous elements 3a, 3b, and 3c that emit light of three colors different from each other.

As illustrated in FIG. 47, Example 37 is different from Example 31 in that three self-luminous elements 3a, 3b, and 3c that emit light of the same color are arranged in each light emitting section 2. That is, in this example, the three self-luminous elements 3a, 3b, and 3c that emit light of the same color are arranged in each light emitting section 2, so that the self-luminous elements in the same light emitting section can be individually controlled.

Note that the embodiments can be freely combined, and the embodiments can be appropriately modified or omitted.

Although the embodiments have been described in detail, the above description is illustrative in all aspects, and the embodiments are not limited thereto. It is understood that numerous modifications not illustrated can be assumed.

EXPLANATION OF REFERENCE SIGNS

100: self-luminous display apparatus
200: backlight
2: display pixel
2: light emitting section
3: subpixel
3: self-luminous element

The invention claimed is:

1. A self-luminous body for a display apparatus comprising:
   a backplane; and
   a plurality of stacks arranged on the backplane;
   wherein each stack of the plurality of stacks includes a plurality of integrated self-luminous elements,
   wherein the plurality of self-luminous elements in each stack of the plurality of stacks include at least two self-luminous elements that are arranged at a first pitch and emit light of the same color,
   wherein the plurality of stacks include a first stack and a second stack adjacent to each other,
   wherein the self-luminous element of the first stack and the self-luminous element of the second stack that emits light of the same color as a color of light emitted by the self-luminous element of the first stack are arranged at a second pitch larger than the first pitch, and
   wherein each of the stacks is arranged over two or more display pixels.

2. The self-luminous body for a display apparatus according to claim 1,
   wherein each of the stacks includes two or more self-luminous element assemblies arranged in the two or more display pixels, and
   wherein the plurality of self-luminous elements include two or more self-luminous elements included in each self-luminous element assembly of the two or more self-luminous element assemblies.

3. The self-luminous body for a display apparatus according to claim 2, wherein adjacent two self-luminous element assemblies included in the two or more self-luminous element assemblies are separated from each other with a gap interposed therebetween.

4. The self-luminous body for a display apparatus according to claim 2, wherein adjacent two self-luminous elements included in the two or more self-luminous elements are separated from each other with a gap interposed therebetween.

5. The self-luminous body for a display apparatus according to claim 2, wherein the two or more self-luminous element assemblies are electrically separated and are not structurally divided.

6. The self-luminous body for a display apparatus according to claim 2, wherein the two or more self-luminous elements are electrically separated and are not structurally divided.

7. The self-luminous body for a display apparatus according to claim 2, wherein the two or more self-luminous elements emit light of two or more colors different from each other.

8. The self-luminous body for a display apparatus according to claim 2, wherein the two or more colors include at least one selected from the group consisting of red, green, blue, and white.

9. The self-luminous body for a display apparatus according to claim 2,
   wherein each self-luminous element of the two or more self-luminous elements has a rectangular planar shape, and
   wherein each of the self-luminous element assemblies has a square planar shape.

10. The self-luminous body for a display apparatus according to claim 2,
    wherein each self-luminous element of the two or more self-luminous elements has a square planar shape, and
    wherein each of the self-luminous element assemblies has a rectangular planar shape.

11. The self-luminous body for a display apparatus according to claim 1, wherein the plurality of self-luminous elements are arranged in the two or more display pixels, respectively.

12. The self-luminous body for a display apparatus according to claim 11, wherein adjacent two self-luminous elements included in the plurality of self-luminous elements are separated from each other with a gap interposed therebetween.

13. The self-luminous body for a display apparatus according to claim 11, wherein the plurality of self-luminous elements are electrically separated and are not structurally divided.

14. The self-luminous body for a display apparatus according to claim 11, wherein the plurality of self-luminous elements emit light of the same color.

15. The self-luminous body for a display apparatus according to claim 14, wherein the same color is white.

16. The self-luminous body for a display apparatus according to claim 1, wherein the plurality of self-luminous elements are diced and integrated for each of the stacks.

17. A self-luminous display apparatus comprising the self-luminous body for a display apparatus according to claim 1.

18. A self-luminous body for a display apparatus comprising:
   a backplane; and
   a plurality of stacks arranged on the backplane;
   wherein each stack of the plurality of stacks includes a plurality of integrated self-luminous elements,
   wherein the plurality of self-luminous elements in each stack of the plurality of stacks include at least two self-luminous elements that are arranged at a first pitch and emit light of the same color,
   wherein the plurality of stacks include a first stack and a second stack adjacent to each other,
   wherein the self-luminous element of the first stack and the self-luminous element of the second stack that emits light of the same color as a color of light emitted by the self-luminous element of the first stack are arranged at a second pitch larger than the first pitch, and
   wherein each of the stacks is arranged over two or more light emitting sections that divide an active area of the plurality of self-luminous elements.

19. The self-luminous body for a display apparatus according to claim 18, wherein adjacent two self-luminous elements included in the plurality of self-luminous elements are separated from each other with a gap interposed therebetween.

20. The self-luminous body for a display apparatus according to claim 18, wherein the plurality of self-luminous elements are electrically separated and are not structurally divided.

21. The self-luminous body for a display apparatus according to claim 18, wherein the plurality of self-luminous elements emit light of the same color.

22. The self-luminous body for a display apparatus according to claim 21, wherein the same color is white.

23. The self-luminous body for a display apparatus according to claim 18, wherein the plurality of self-luminous elements are diced and integrated for each of the stacks.

24. A backlight comprising the self-luminous body for a display apparatus according to claim 18,
   wherein each of the plurality of regions is a light emitting section.

25. A liquid crystal display apparatus comprising:
   the backlight according to claim 24; and
   a liquid crystal panel that modulates light emitted by the backlight.

26. A method for manufacturing a self-luminous body for a display apparatus, the method comprising:
   a) a step of manufacturing a stack including a plurality of integrated self-luminous elements; and
   b) a step of arranging the stack on a backplane and collectively arranging the plurality of self-luminous elements on the backplane to obtain the self-luminous body for a display apparatus according to claim 1.

* * * * *